(12) United States Patent
Sugiyama et al.

(10) Patent No.: US 8,869,696 B2
(45) Date of Patent: Oct. 28, 2014

(54) METHOD FOR ADJUSTING COLOR TONES OF PRINTED MATTER

(75) Inventors: Masataka Sugiyama, Tsukuba (JP); Akihiro Inde, Tsukuba (JP); Junichi Tanaka, Yokohama (JP); Yoshihiko Butsusaka, Tsukuba (JP); Yusuke Tsumura, Tsukuba (JP)

(73) Assignee: Komori Corporation, Tokyo (JP)

( * ) Notice: Subject to any disclaimer, the term of this patent is extended or adjusted under 35 U.S.C. 154(b) by 558 days.

(21) Appl. No.: 12/990,891

(22) PCT Filed: May 28, 2009

(86) PCT No.: PCT/JP2009/059782
§ 371 (c)(1),
(2), (4) Date: Dec. 29, 2010

(87) PCT Pub. No.: WO2009/145260
PCT Pub. Date: Dec. 3, 2009

(65) Prior Publication Data
US 2011/0116853 A1       May 19, 2011

(30) Foreign Application Priority Data
May 28, 2008   (JP) ................................ 2008-138978

(51) Int. Cl.
*G06F 3/12* (2006.01)
*B41F 31/02* (2006.01)
*H04N 1/60* (2006.01)
*B41F 33/16* (2006.01)
*B41F 33/00* (2006.01)

(52) U.S. Cl.
CPC .............. *B41F 31/02* (2013.01); *H04N 1/6011* (2013.01); *B41F 33/0045* (2013.01)

USPC ................................ 101/211; 400/76; 358/1.9

(58) Field of Classification Search
USPC ............................................. 101/211; 400/76
See application file for complete search history.

(56) References Cited

U.S. PATENT DOCUMENTS

2007/0076260 A1*   4/2007   Upton .......................... 358/3.21
2010/0002246 A1*   1/2010   Ozaki et al. .................... 358/1.9

FOREIGN PATENT DOCUMENTS

| EP | 1839863 A2 | 10/2007 |
| EP | 2 039 512 A1 | 3/2009 |
| JP | 2001-347645 A | 12/2001 |
| JP | 2008-114466 A | 5/2008 |
| WO | WO 2008/007746 A1 | 1/2008 |

* cited by examiner

*Primary Examiner* — Leslie J Evanisko
(74) *Attorney, Agent, or Firm* — Birch, Stewart, Kolasch & Birch, LLP

(57) ABSTRACT

A method for adjusting color tones of a printed matter includes: a displaying step of displaying an image of a printed matter on a display apparatus (119) by plate data used when a pattern is printed on a printing plate used in printing performed by a printing press; an adjusting step in which an operator adjusts the color tones of the printed matter while referring to the printed matter displayed on the display apparatus (119); and a reference-image displaying step of displaying a reference image of displaying an image of a printed matter obtained when a supply amount of ink used in the printing is adjusted, for reference. In the adjusting step, the operator adjusts the color tones of the printed matter based on the supply amount of the ink in the printing press while referring to the image of the printed matter displayed in the reference-image displaying step.

2 Claims, 63 Drawing Sheets

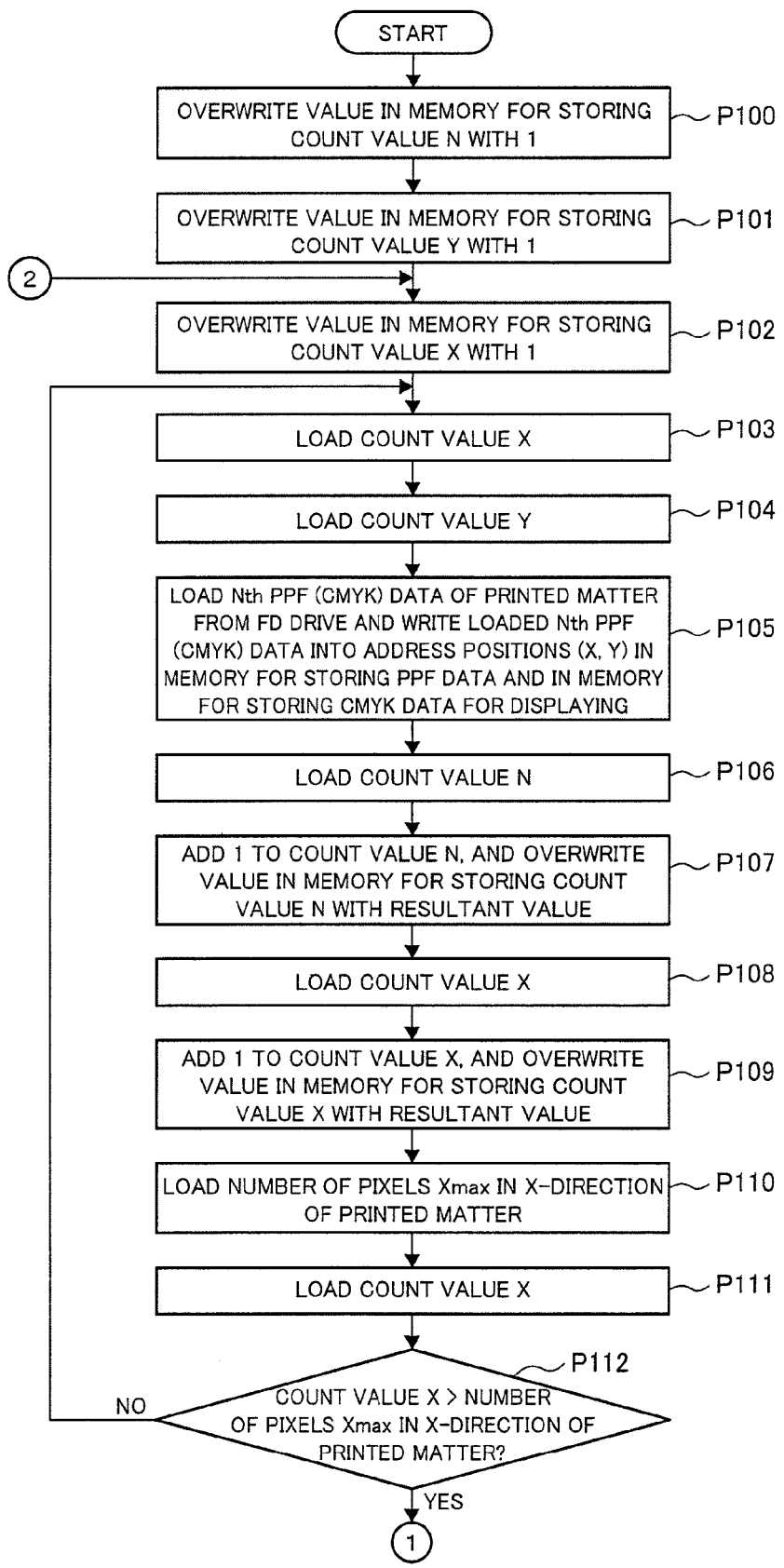

METHOD FOR ADJUSTING COLOR TONES OF PRINTED MATTER

TECHNICAL FIELD

The invention relates to a method for adjusting color tones of a print.

BACKGROUND ART

Color adjustment in an offset printing press has been conventionally performed as follows. A solid color patch printed in a margin of a printed matter is measured using a densitometer, and the color-density value thus measured is compared with the reference color-density value. Then, the ink supply amount is adjusted so that the measured color-density value can be equal to the reference color-density value.

SUMMARY OF THE INVENTION

Problems to be Solved by the Invention

However, the following problem may occur in the case where a solid color patch printed in a margin of a printed matter is measured using a densitometer, the color-density value thus measured is compared with reference color-density value, and then the ink supply amount is adjusted so that the measured color-density value can be equal to the reference color-density value. Specifically, printing with color tones other than the standard ones cannot be performed.

In this case, the operator of the printing press manually adjusts the ink supply amount. However, such adjustment is based on the experience and intuition of the operator, and is a burden for the operator, and is a time-consuming job.

On the other hand, there is another method in which a printed matter to be done by a printing press is displayed on a display apparatus using PPF data, and then color tones are adjusted on the basis of the ink-color display system (Munsell color system). In this method, the operator of the printing press has to give instructions on color-tone adjustment by using a color system which is unfamiliar to the operator. Consequently, the instructions thus given are often unsatisfactory.

In view of the problems described above, an object of the invention is to provide a method for adjusting color tones of a printed matter, which makes the work of adjusting color tones of a printed matter easier.

Means for Solving the Problems

A method for adjusting color tones of a printed matter according to the first invention to solve the above problems comprises: a displaying step of displaying an image of a printed matter on a display apparatus by use of plate data used when a pattern is printed on the printing plate used in printing performed by a printing press; an adjusting step in which an operator adjusts color tones of the printed matter while referring to the printed matter displayed on the display apparatus; and a reference-image displaying step of displaying an image of the printed matter obtained when a supply amount of ink used in the printing is adjusted, for reference, wherein, in the adjusting step, the operator adjusts the color tones of the printed matter on the basis of the supply amount of the ink in the printing press while referring to the image of the printed matter displayed in the reference-image displaying step.

A method for adjusting color tones of a printed matter according to the second invention to solve the above problems is the method for adjusting color tones of a printed matter according to the first invention, wherein, in the reference-image displaying step, an image of a printed matter that is obtained if the supply amount of the ink to be used in the printing is increased and an image of a printed matter that is obtained if the supply amount of the ink is decreased are displayed for reference.

A method for adjusting color tones of a printed matter according to the third invention to solve the above problems is the method for adjusting color tones of a printed matter according to the second invention, wherein, in the reference-image displaying step, an image of the printed matter that is obtained if the supply amount of the ink to be used in the printing is increased by a certain amount and an image of a printed matter that is obtained if the supply amount of ink is decreased by a certain amount are displayed for reference.

A method for adjusting color tones of a printed matter according to the fourth invention to solve the above problems is the method for adjusting color tones of a printed matter according to the third invention, wherein, in the reference-image displaying step, images of the printed matter that are obtained if the supply amounts of cyan, magenta, yellow, and black inks to be used in the printing are increased and images of the printed matter that are obtained if the supply amounts of cyan, magenta, yellow, and black inks are decreased are displayed for reference.

A method for adjusting color tones of a printed matter according to the fifth invention to solve the above problems is the method for adjusting color tones of a printed matter according to the fourth invention, wherein the reference-image displaying step further includes a second reference-image displaying step of displaying an image of the printed matter on the basis of the supply amounts of the inks in the printing press that have been adjusted by the operator.

Effects of the Invention

According to the invention, it is possible to provide a method for adjusting color tones of a printed matter, which makes the work of adjusting color tones of a printed matter easier.

BRIEF DESCRIPTION OF THE DRAWINGS

FIG. 11A is a flowchart illustrating an operational flow of the color-tone adjustment apparatus employing the method for adjusting color tones of a printed matter according to the invention.

DETAILED DESCRIPTION OF THE INVENTION

Figure 1:
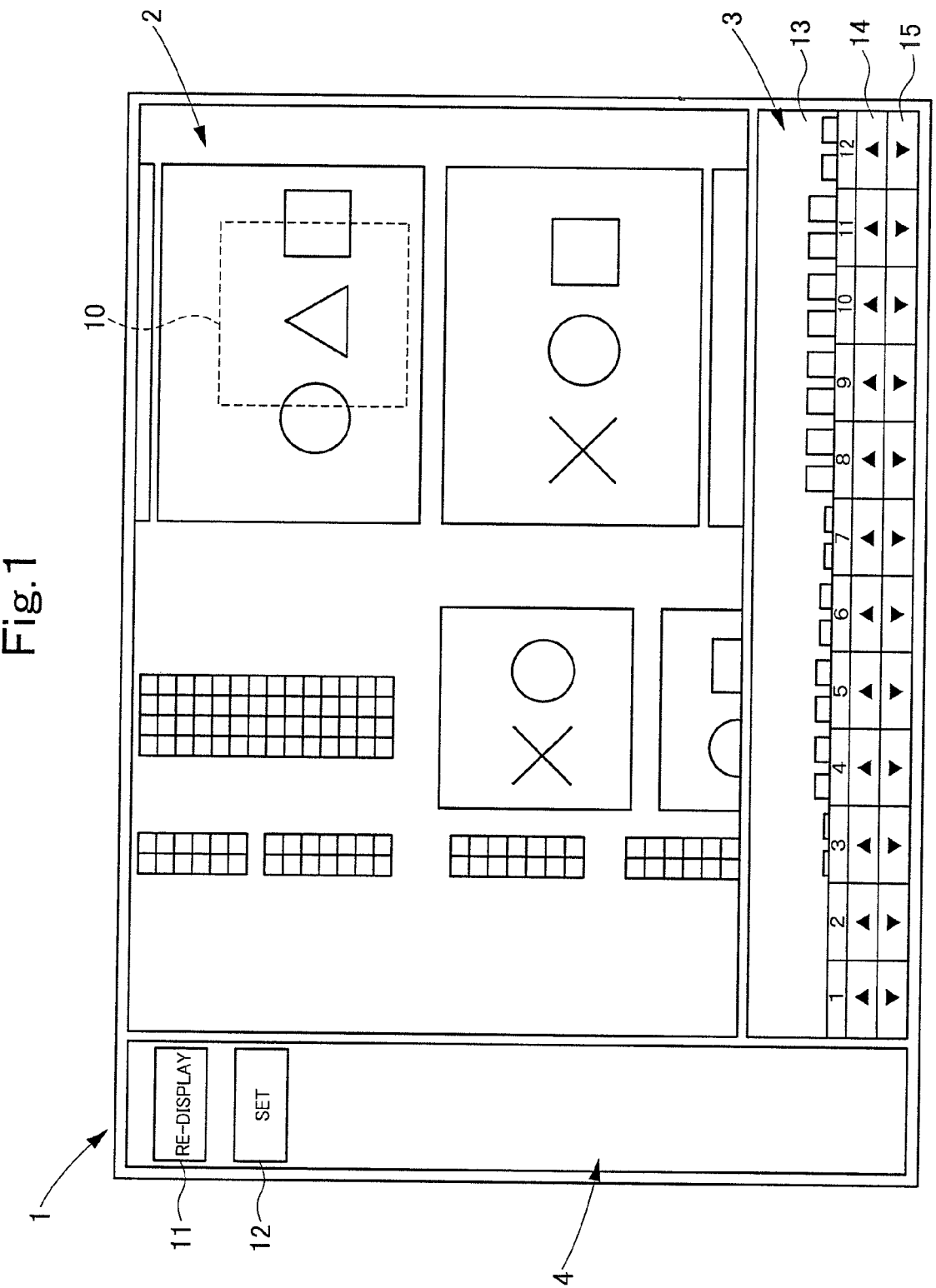
FIG. 1 is a diagram illustrating the onscreen configuration of a color-tone adjustment area designation screen in a method for adjusting color tones of a printed matter according to the invention.

An embodiment of a method for adjusting color tones of a printed matter according to the invention will be described below by referring to the drawings.

The method for adjusting color tones of a printed matter according to the invention can be used for various printing presses equipped with ink-supply amount adjustment apparatuses. In the description that follows, the symbols C, M, Y, and K represent cyan, magenta, yellow, and black, respectively.

Firstly, description will be given of the onscreen configurations of a color-tone adjustment area designation screen and of a color-tone adjustment screen in the method for adjusting color tones of a printed matter according to the invention.

Both the color-tone adjustment area designation screen and the color-tone adjustment screen are displayed on a display apparatus configured to display images. The display apparatus used in this embodiment is, for example, a touch panel, but other ordinary display devices may be used instead. An arithmetic processing unit is used for various purposes, such as: the generation of image data to be displayed on the display apparatus; giving commands for executing various kinds of arithmetic operations and for storing data in a storage device; and the control of peripheral devices. The arithmetic processing unit is equipped with a storage device that is used as the storage for various kinds of data and with various kinds of input devices and output devices.

FIG. 1 shows a color-tone adjustment area designation screen 1. The color-tone adjustment area designation screen 1 includes a color-tone adjustment area designation portion 2, an ink-supply amount adjustment portion 3, and a switch arrangement portion 4. Images are displayed in the color-tone adjustment area designation portion 2 by using (RGB) data of each portion of a printed matter, which is obtained from the PPF (CMYK) data of the printed matter. In the color-tone adjustment area designation portion 2, a cursor 10 is used to designate an area whose color tones are desired to be adjusted. The ink-supply amount adjustment portion 3 adjusts the opening ratio of the blade for each of the ink-fountain keys, and thereby adjusts the supply amounts of inks for the portions corresponding respectively to ink-fountain keys. A re-display switch 11 used for re-display of images described later and a set switch 12 used for setting are arranged in the switch arrangement portion 4. The positions of color-tone adjustment area designation portion 2, the ink-supply amount adjustment portion 3 and the switch arrangement portion 4 may be changed within the color-tone adjustment area designation screen 1 if necessary.

The ink-supply amount adjustment portion 3 includes an ink-supply amount display portion 13, ink-supply amount increasing switches 14 and ink-supply amount decreasing switches 15. The ink-supply amount display portion 13 displays the amount of each ink to be supplied by an ink supplying apparatus. Each of the ink-supply amount increasing switches 14 is used to increase the amount of the corresponding ink to be supplied by increasing the opening ratio of the blade of the corresponding ink-fountain key of the ink supplying apparatus. Each of the ink-supply amount decreasing switches 15 is used to decrease the amount of the corresponding ink to be supplied by decreasing the opening ratio of the blade of the corresponding ink-fountain key of the ink supplying apparatus.

The description of this embodiment is based on an example where the re-display switch 11 and the set switch 12 are arranged in the switch arrangement portion 3, but, if necessary, other switches may be arranged therein.

Figure 2:
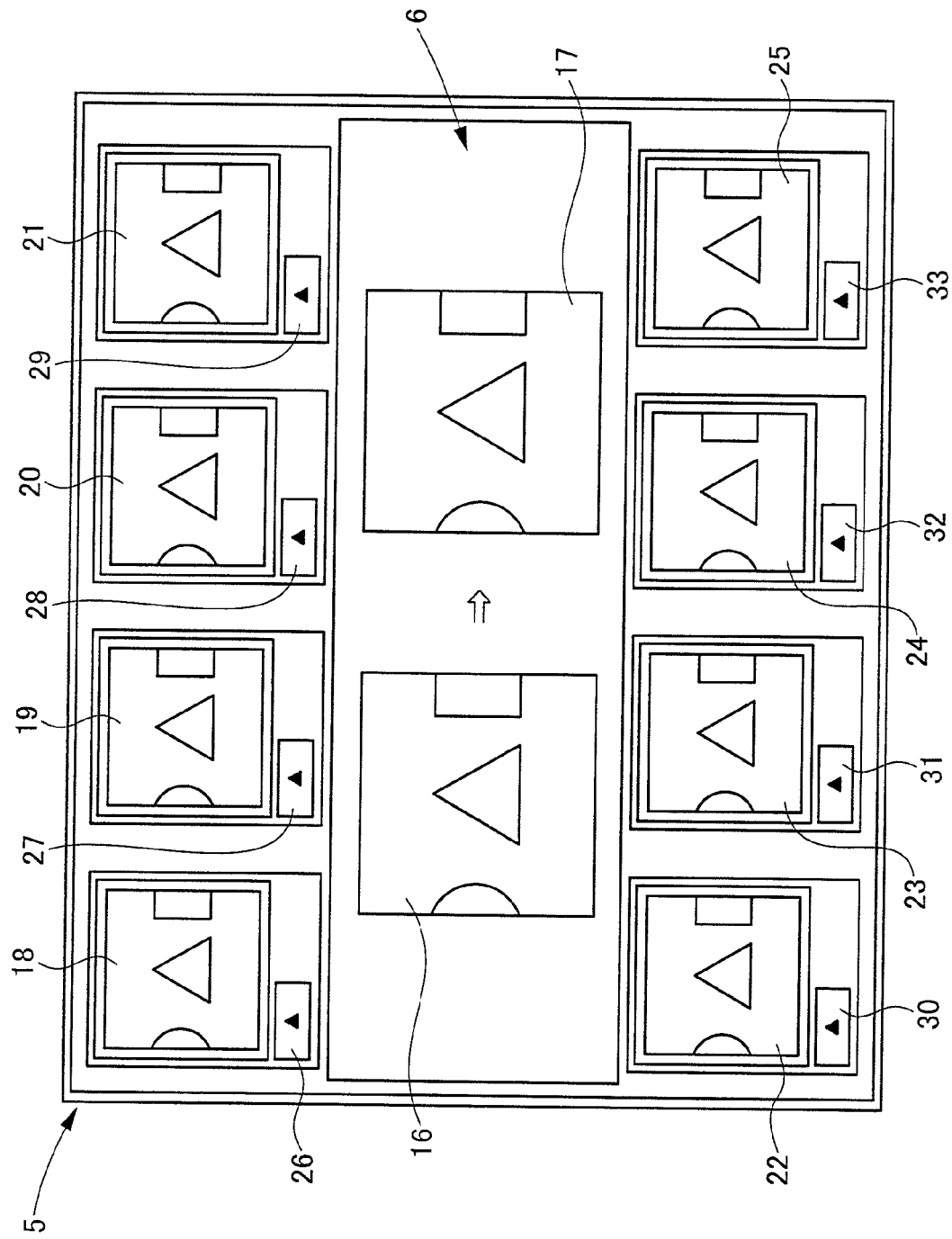
FIG. 2 is a diagram illustrating the onscreen configuration of a color-tone adjustment screen in the method for adjusting color tones of a printed matter according to the invention.

FIG. 2 shows a color-tone adjustment screen 5. The color-tone adjustment screen 5 includes an image-change display portion 6, which includes a current color-tone display portion 16 and an adjusted color-tone display portion 17. The current color-tone display portion 16 displays the current tones of the area designated using the cursor 10 in the color-tone adjustment area designation portion 2 of the color-tone adjustment area designation screen 1. The adjusted color-tone display portion 17 displays the color tones after the color-tone change. The color-tone adjustment screen 5 further includes: a Y-up display portion 18 to display an image with color tones that are expected with an increased supply of the yellow ink; an M-up display portion 19 to display an image with color tones that are expected with an increased supply of the magenta ink; a C-up display portion 20 to display an image with color tones that are expected with an increased supply of the cyan ink; a K-up display portion 21 to display an image with color tones that are expected with an increased supply of the black ink; a Y-down display portion 22 to display an image with color tones that are expected with a decreased supply of the yellow ink; an M-down display portion 23 to display an image with color tones that are expected with a decreased supply of the magenta ink; a C-down display portion 24 to display an image with color tones that are expected with a decreased supply of the cyan ink; and a K-down display portion 25 to display an image with color tones that are expected with a decreased supply of the black ink. The positions of the image-change display portion 6 and of the display portions 18 to 25 may be changed within the color-tone adjustment screen 5 if necessary.

The Y-up display portion 18 includes a Y-up switch 26 to increase the supply of the yellow ink. The M-up display portion 19 includes an M-up switch 27 to increase the supply of the magenta ink. The C-up display portion 20 includes a C-up switch 28 to increase the supply of the cyan ink. The K-up display portion 21 includes a K-up switch 29 to increase the supply of the black ink. The Y-down display portion 22 includes a Y-down switch 30 to decrease the supply of the yellow ink. The M-down display portion 23 includes an M-down switch 31 to decrease the supply of the magenta ink. The C-down display portion 24 includes a C-down switch 32 to decrease the supply of the cyan ink. The K-down display portion 25 includes a K-down switch 33 to decrease the supply of the black ink.

The foregoing description is of the onscreen configurations of the color-tone adjustment area designation screen and of the color-tone adjustment screen in the method for adjusting color tones of a printed matter according to the invention.

Next, description will be given of the operational flow of color-tone adjustment processing for a printed matter performed in the method for adjusting color tones of a printed matter according to the invention.

Figure 3:
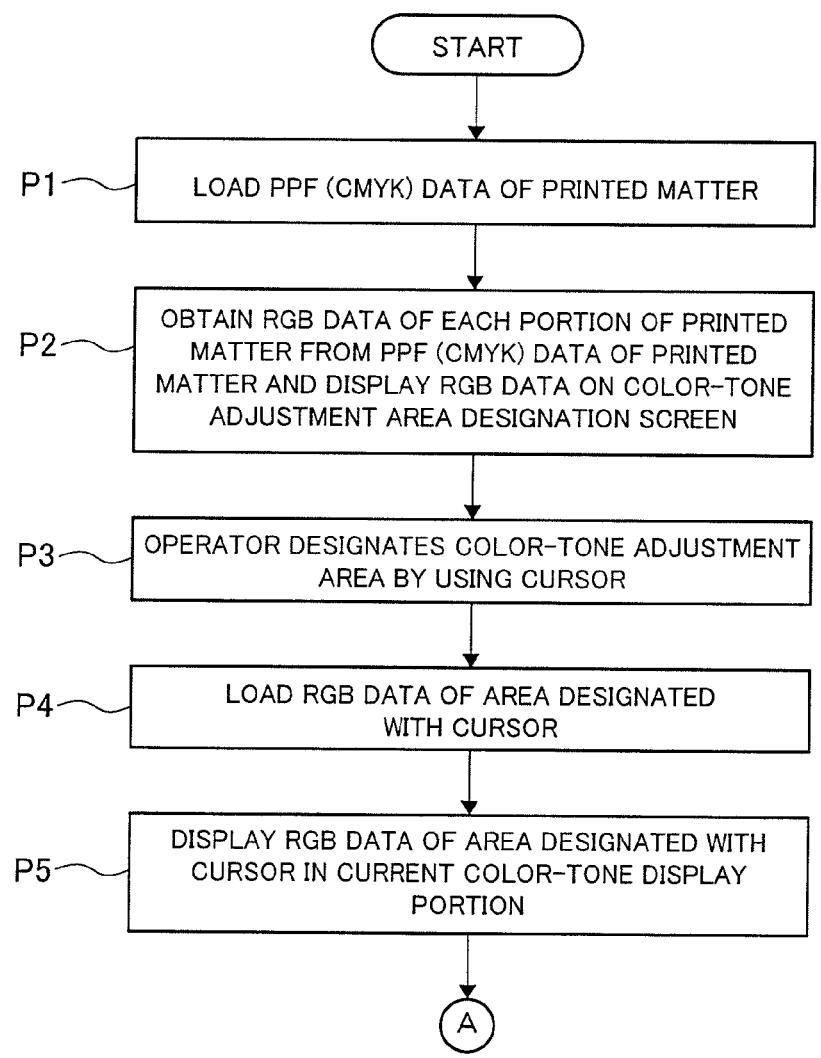
FIG. 3 is a flowchart illustrating an operational flow of the method for adjusting color tones of a printed matter according to the invention.

As FIG. 3 shows, at step P1, the arithmetic processing unit loads the PPF (CMYK) data of the printed matter. After the process of step P1 is completed, the arithmetic processing unit executes the process of step P2.

At step P2, the arithmetic processing unit obtains the (RGB) data of each portion of the printed matter from the PPF (CMYK) data of the printed matter, and displays the (RGB) data thus obtained in the color-tone adjustment area designation portion 2 of the color-tone adjustment area designation screen 1. After the process of step P2 is completed, the arithmetic processing unit executes the process of step P3.

At step P3, the operator designates, by use of the cursor 10, an area to be subjected to color-tone adjustment. After the process of step P3 is completed, the arithmetic processing unit executes the process of step P4.

At step P4, the arithmetic processing unit loads the (RGB) data of the area designated by use of the cursor 10. After the process of step P4 is completed, the arithmetic processing unit executes the process of step P5.

At step P5, the arithmetic processing unit displays, in the current color-tone display portion 16, the (RGB) data of the area thus designated by use of the cursor 10. After the process of step P5 is completed, the arithmetic processing unit executes the process of step P6.

Figure 4:
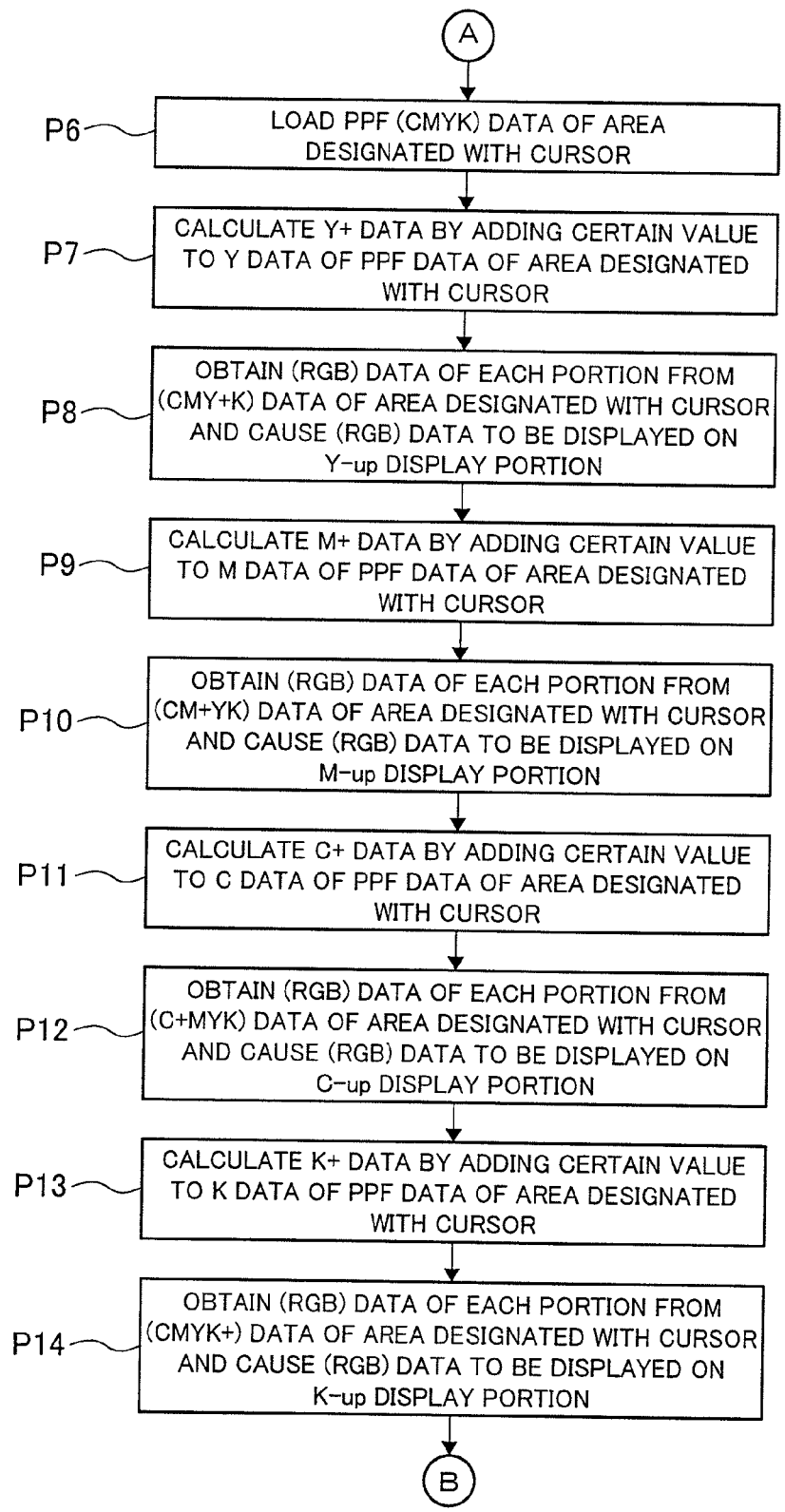
FIG. 4 is a flowchart illustrating an operational flow subsequent to that of FIG. 3.

As FIG. 4 shows, at step P6, the arithmetic processing unit loads the PPF (CMYK) data of the area designated by use of the cursor 10. After the process of step P6 is completed, the arithmetic processing unit executes the process of step P7.

At step P7, the arithmetic processing unit calculates Y+ data by adding a certain value to each piece of Y data of the PPF data of the area designated by use of the cursor 10. After the process of step P7 is completed, the arithmetic processing unit executes the process of step P8.

At step P8, the arithmetic processing unit obtains (RGB) data of each portion from the (CMY+K) data of the area designated by use of the cursor 10, and then causes the (RGB) data to be displayed in the Y-up display portion 18. After the process of step P8 is completed, the arithmetic processing unit executes the process of step P9.

At step P9, the arithmetic processing unit calculates M+ data by adding a certain value to the M data of the PPF data of the area designated by use of the cursor 10. After the process of step P9 is completed, the arithmetic processing unit executes the process of step P10.

At step P10, the arithmetic processing unit obtains (RGB) data of each portion from the (CM+YK) data of the area designated by use of the cursor 10, and then causes the (RGB) data to be displayed in the M-up display portion 19. After the process of step P10 is completed, the arithmetic processing unit executes the process of step P11.

At step P11, the arithmetic processing unit calculates C+ data by adding a certain value to the C data of the PPF data of the area designated by use of the cursor 10. After the process of step P11 is completed, the arithmetic processing unit executes the process of step P12.

At step P12, the arithmetic processing unit obtains (RGB) data of each portion from the (C+MYK) data of the area designated by use of the cursor 10, and then causes the (RGB) data to be displayed in the C-up display portion 20. After the process of step P12 is completed, the arithmetic processing unit executes the process of step P13.

At step P13, the arithmetic processing unit calculates K+ data by adding a certain value to the K data of the PPF data of the area designated by use of the cursor 10. After the process of step P13 is completed, the arithmetic processing unit executes the process of step P14.

At step P14, the arithmetic processing unit obtains (RGB) data of each portion from the (CMYK+) data of the area designated by use of the cursor 10, and then causes the (RGB) data to be displayed in the K-up display portion 21. After the process of step P14 is completed, the arithmetic processing unit executes the process of step P15.

Figure 5:
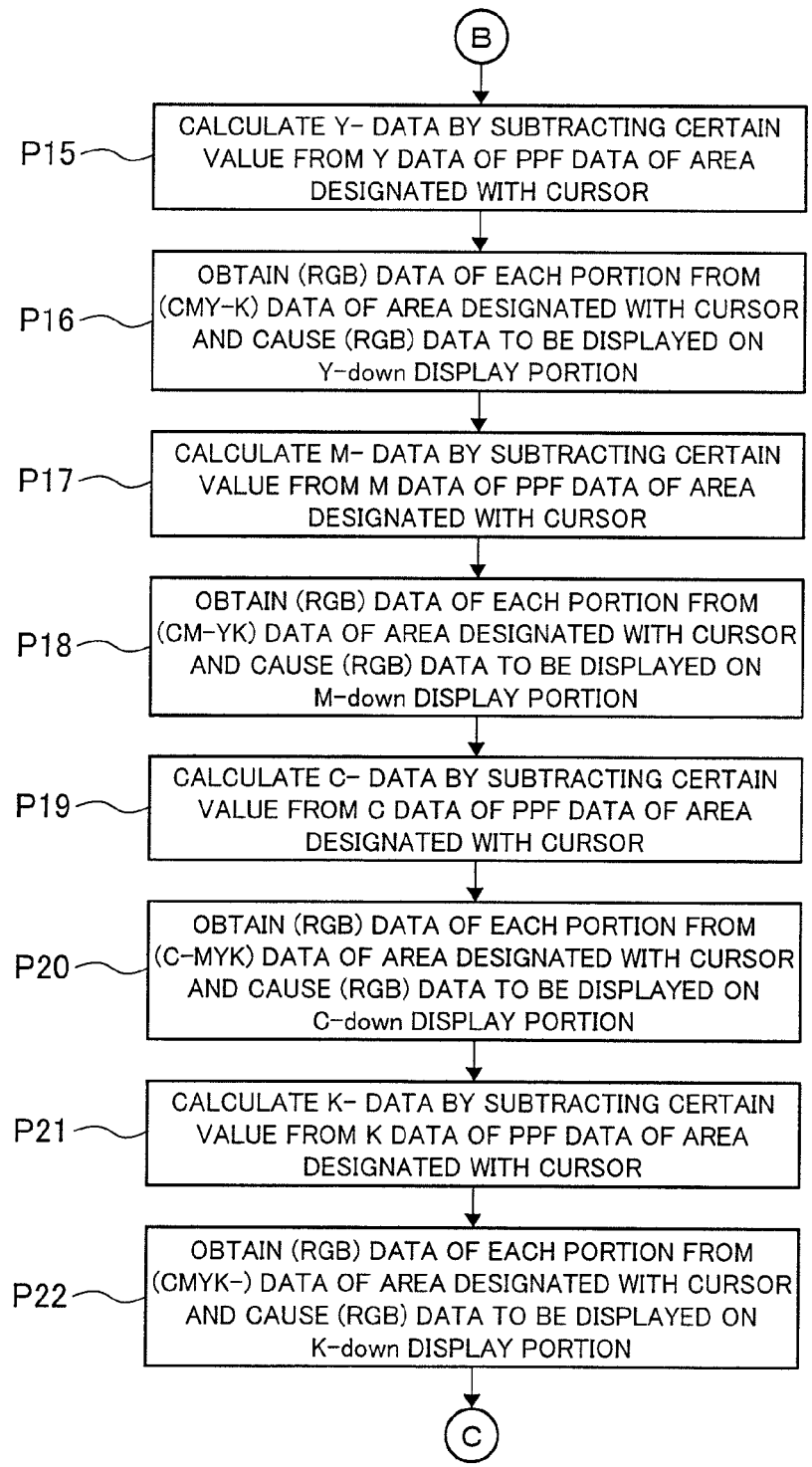
FIG. 5 is a flowchart illustrating an operational flow subsequent to that of FIG. 4.

As FIG. 5 shows, at step P15, the arithmetic processing unit calculates Y− data by subtracting a certain value from Y data of the PPF data of the area designated by use of the cursor 10. After the process of step P15 is completed, the arithmetic processing unit executes the process of step P16.

At step P16, the arithmetic processing unit obtains (RGB) data of each portion from the (CMY−K) data of the area designated by use of the cursor 10, and then causes the (RGB) data to be displayed in the Y-down display portion 22. After the process of step P16 is completed, the arithmetic processing unit executes the process of step P17.

At step P17, the arithmetic processing unit calculates M− data by subtracting a certain value from the M data of the PPF data of the area designated by use of the cursor 10. After the process of step P17 is completed, the arithmetic processing unit executes the process of step P18.

At step P18, the arithmetic processing unit obtains RGB data of each portion from the (CM−YK) data of the area designated by use of the cursor 10, and then causes the RGB data to be displayed in the M-down display portion 23. After the process of step P18 is completed, the arithmetic processing unit executes the process of step P19.

At step P19, the arithmetic processing unit calculates C− data by subtracting a certain value from C data of the PPF data of the area designated by use of the cursor 10. After the process of step P19 is completed, the arithmetic processing unit executes the process of step P20.

At step P20, the arithmetic processing unit obtains (RGB) data of each portion from the (C−MYK) data of the area designated by use of the cursor, and then causes the (RGB) data to be displayed in the C-down display portion 24. After the process of step P20 is completed, the arithmetic processing unit executes the process of step P21.

At step P21, the arithmetic processing unit calculates K− data by subtracting a certain value from K data of the PPF data of the area designated by use of the cursor 10. After the process of step P21 is completed, the arithmetic processing unit executes the process of step P22.

At step P22, the arithmetic processing unit obtains RGB data of each portion from the (CMYK−) data of the area designated by use of the cursor, and then causes the RGB data to be displayed in the K-down display portion 25. After the process of step P22 is completed, the arithmetic processing unit executes the process of step P23.

Figure 6:
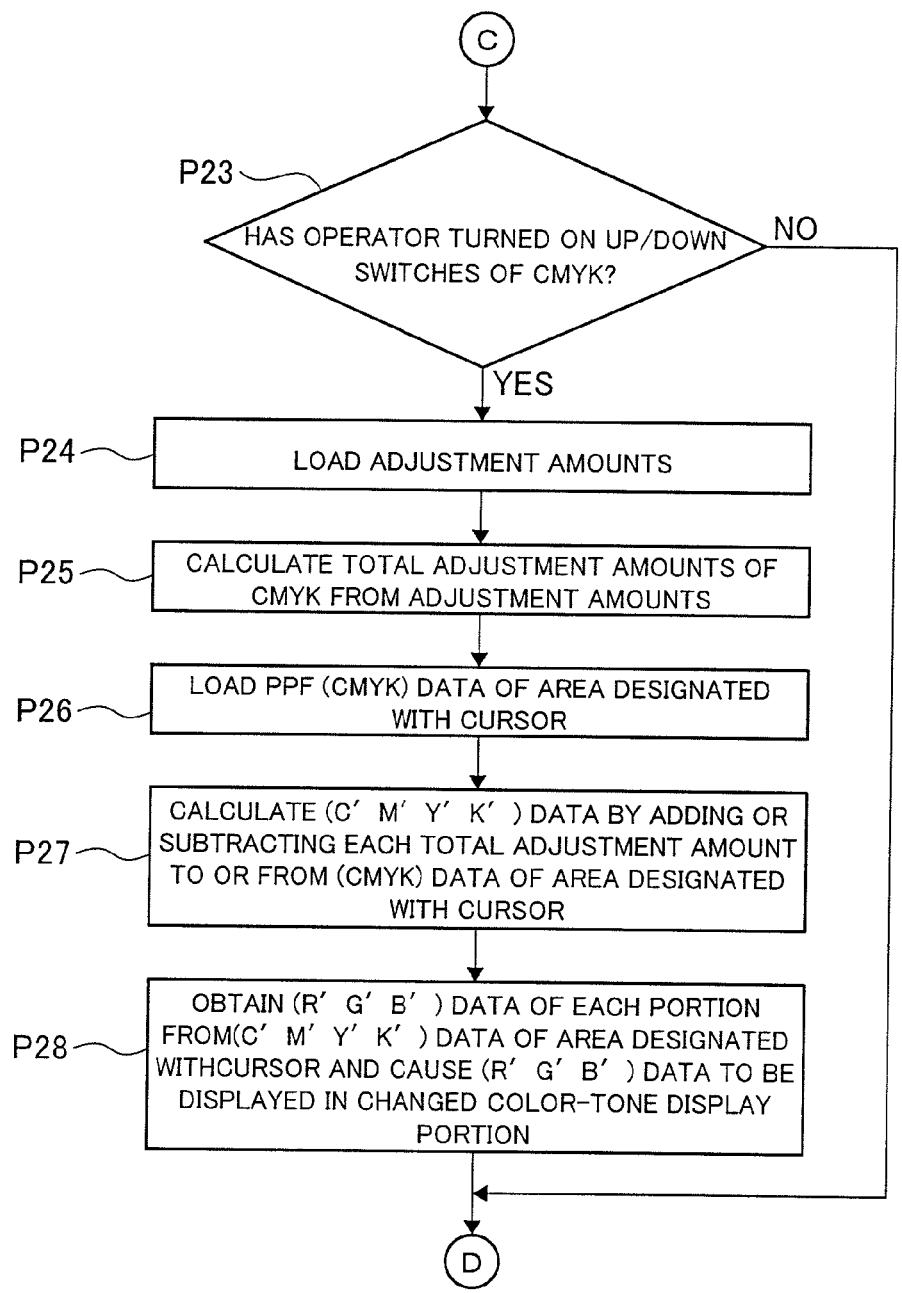
FIG. 6 is a flowchart illustrating an operational flow subsequent to that of FIG. 5.

As FIG. 6 shows, at step P23, the arithmetic processing unit determines whether the operator has turned on each of the C-, M-, Y-, and K-up switches 26 to 29 and each of the C-, M-, Y-, and K-down switches 30 to 33. For each of the C-, M-, Y-, and K-up switches 26 to 29 that has been turned on and for each of the C-, M-, Y-, and K-down switches 30 to 33 that has been turned on, the arithmetic processing unit executes the process of step P24. When any of the C-, M-, Y-, and K-up switches 26 to 29 and the C-, M-, Y-, and K-down switches 30 to 33 has not been turned on, the arithmetic processing unit executes the process of step P29.

At step P24, the arithmetic processing unit loads the amount of adjustment specified by use of the up-switches 26 to 29 and the down-switches 30 to 33. After the process of step P24 is completed, the arithmetic processing unit executes the process of step P25.

At step P25, the arithmetic processing unit calculates, from the amounts of adjustment, the total amount of adjustment for each of the CMYK. After the process of step P25 is completed, the arithmetic processing unit executes the process of step P26.

At step P26, the arithmetic processing unit loads the PPF (CMYK) data of the area designated by use of the cursor 10. After the process of step P26 is completed, the arithmetic processing unit executes the process of step P27.

At step P27, the arithmetic processing unit calculates (C'M'Y'K') data by either adding or subtracting each of the total amounts of adjustment to or from the (CMYK) data of the area designated by use of the cursor 10. After the process of step P27 is completed, the arithmetic processing unit executes the process of step P28.

At step P28, the arithmetic processing unit obtains (R'G'B') data of each portion from the (C'M'Y'K') data of the area designated by use of the cursor 10, and causes the (R'G'B') data to be displayed in the changed color-tone display portion 17. After the process of step P28 is completed, the arithmetic processing unit executes the process of step P29.

Figure 7:
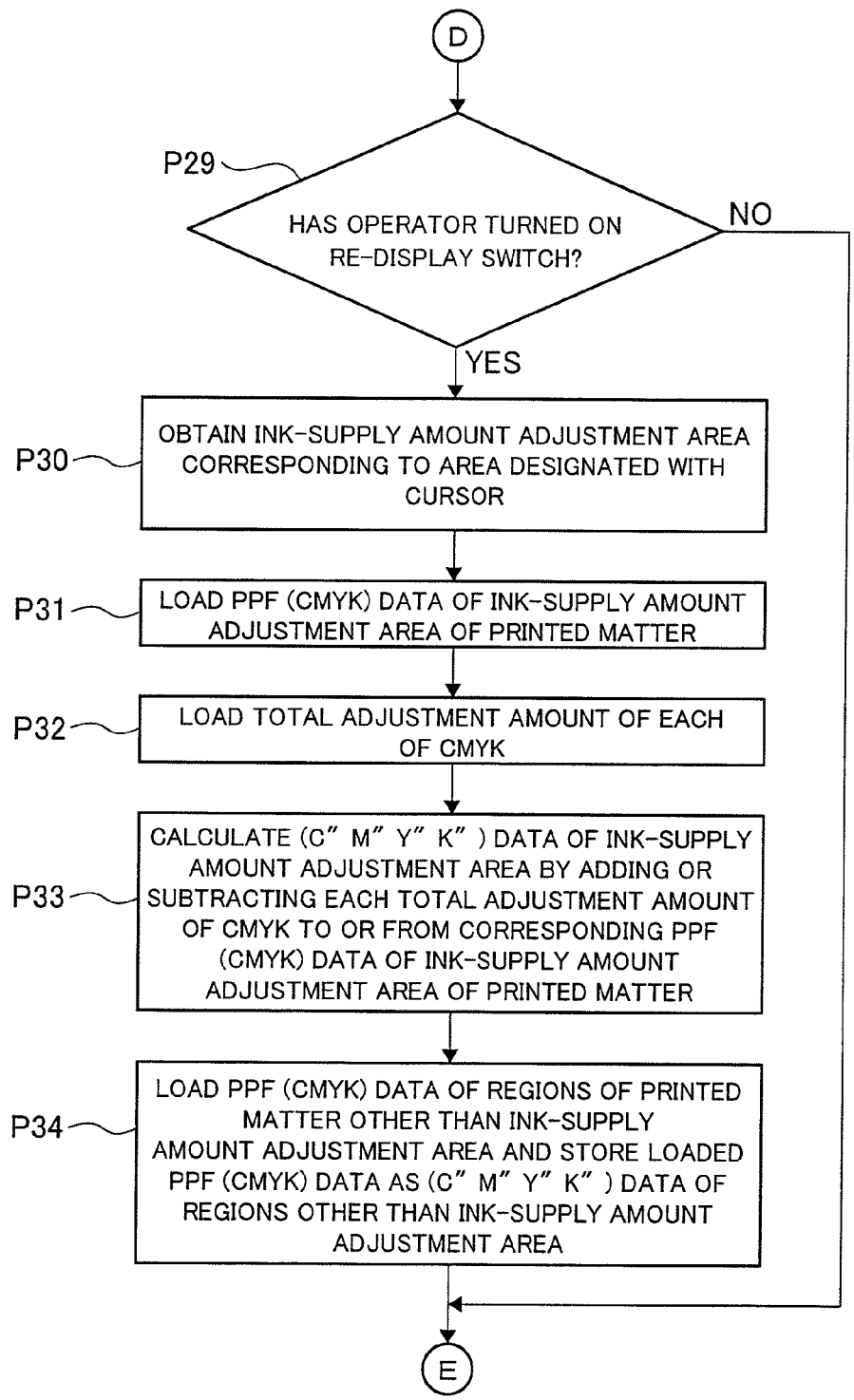
FIG. 7 is a flowchart illustrating an operational flow subsequent to that of FIG. 6.

As FIG. 7 shows, at step P29, the arithmetic processing unit determines whether the operator has turned the re-display switch 11 on. If the re-display switch 11 is turned on, the arithmetic processing unit executes the process of step P30. If the re-display switch 11 is not turned on, the arithmetic processing unit executes the process of step P35.

At step P30, the arithmetic processing unit obtains the ink-supply amount adjustment area that corresponds to the area designated by use of the cursor 10. After the process of step P30 is completed, the arithmetic processing unit executes the process of step P31.

At step P31, the arithmetic processing unit loads the PPF (CMYK) data of the ink-supply amount adjustment area of the printed matter. After the process of step P31 is completed, the arithmetic processing unit executes the process of step P32.

At step P32, the arithmetic processing unit loads the total amount of adjustment for each of the CMYK. After the process of step P32 is completed, the arithmetic processing unit executes the process of step P33.

At step P33, the arithmetic processing unit calculates (C"M"Y"K") data of the ink-supply amount adjustment area by either adding or subtracting the total amount of adjustment for each of the CMYK to or from the PPF (CMYK) data of the ink-supply amount adjustment area of the printed matter. After the process of step P33 is completed, the arithmetic processing unit executes the process of step P34.

At step P34, the arithmetic processing unit loads the PPF (CMYK) data of the areas of the printed matter other than the ink-supply amount adjustment area. The loaded PPF (CMYK) data is stored in the storage apparatus as (C"M"Y"K") data of the areas of the printed matter other than the ink-supply amount adjustment area. After the process of step P34 is completed, the arithmetic processing unit executes the process of step P35.

Figure 8:
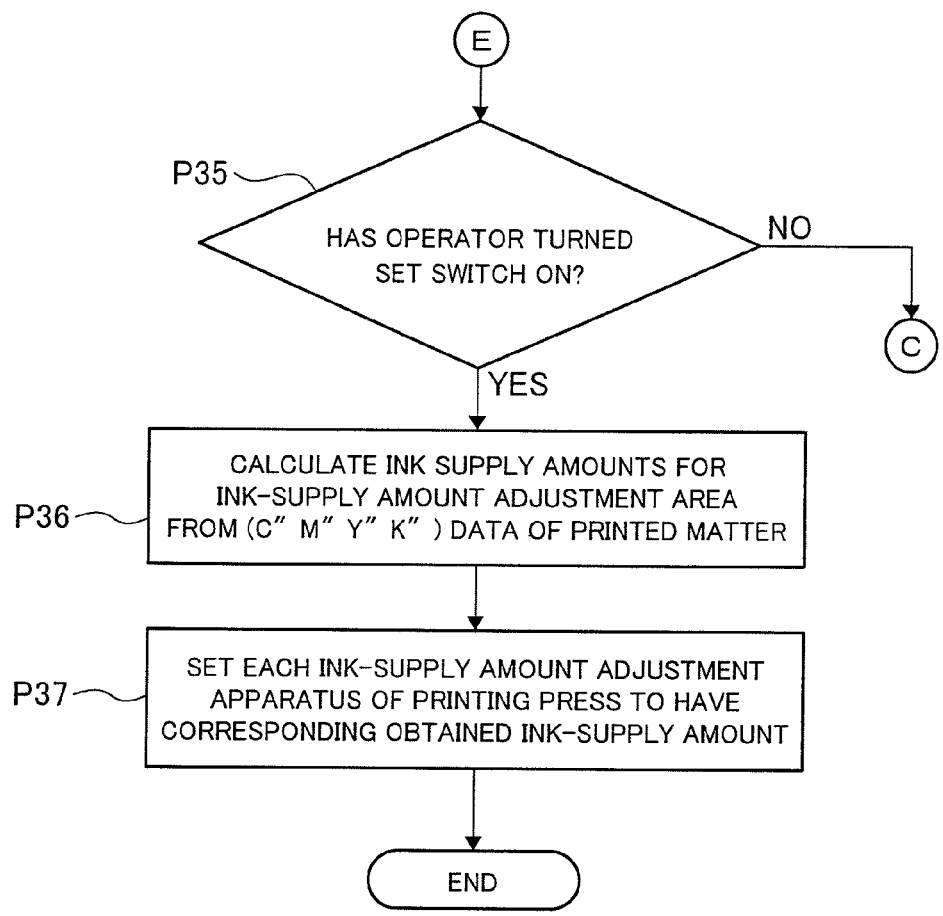
FIG. 8 is a flowchart illustrating an operational flow subsequent to that of FIG. 7.

As FIG. 8 shows, at step P35, the arithmetic processing unit determines whether the operator has turned the set switch 12 on. If the set switch 12 is turned on, the arithmetic processing unit executes the process of step P36. If the set switch 12 is not turned on, the arithmetic processing unit executes the process of step P25.

At step P36, the arithmetic processing unit calculates the ink supply amounts for the ink-supply amount adjustment area from the (C"M"Y"K") data of the printed matter. After the process of step P36 is completed, the arithmetic processing unit executes the process of step P37.

At step P37, the arithmetic processing unit sets each of the ink-supply amount adjustment apparatuses of the printing press to have the corresponding obtained ink supply amount. After the process of step P34 is completed, the arithmetic processing unit completes the color-tone adjustment processing for the printed matter.

The description has been given above of the operational flow of the color-tone adjustment processing for a printed matter performed in the method for adjusting color tones of a printed matter according to the invention.

The embodiment of the method for adjusting color tones of a printed matter according to the invention will be described in detail below.

Firstly, description will be given of the apparatus configurations of the color-tone adjustment apparatus employing the method for adjusting color tones of a printed matter according to the invention and peripheral apparatuses thereof.

Figure 9A:
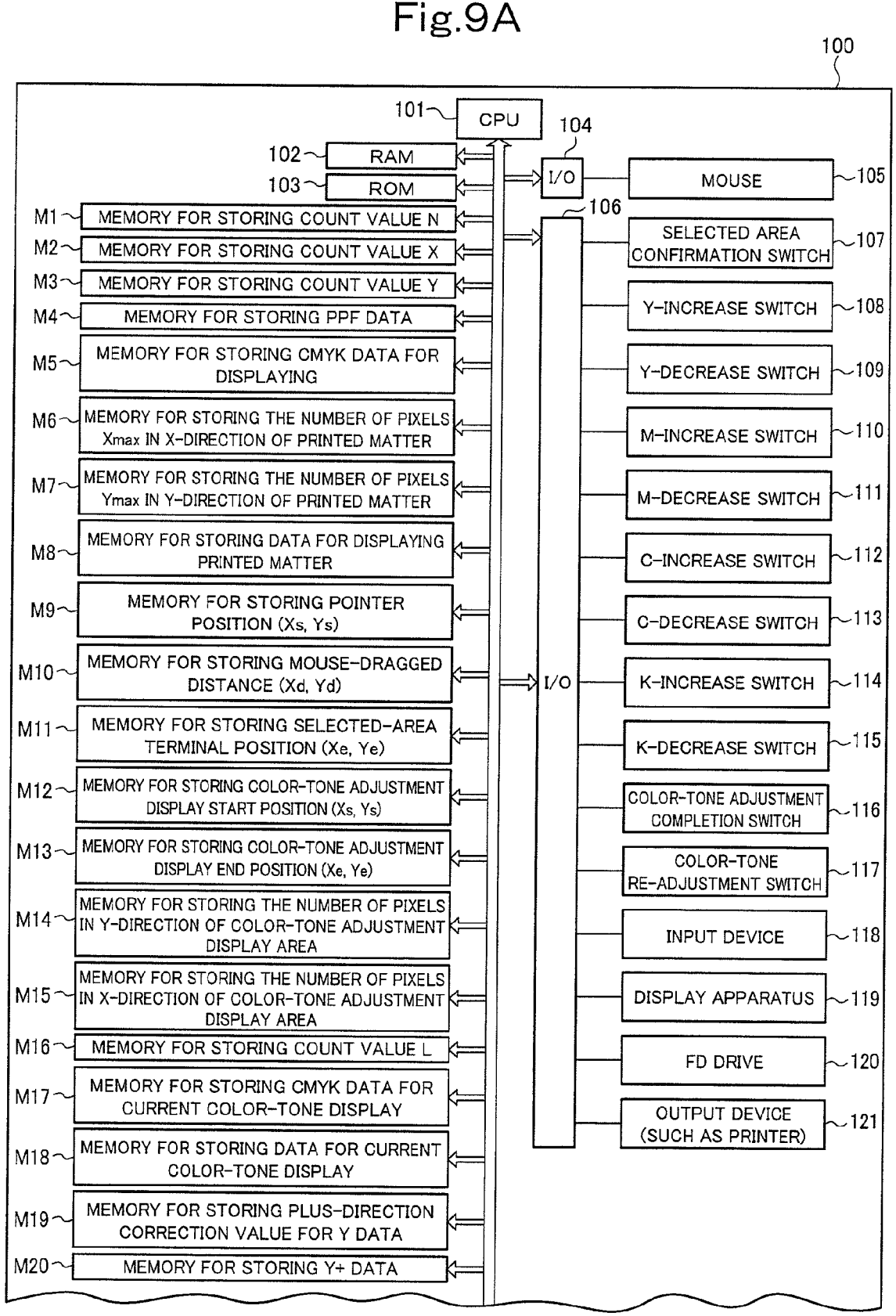
FIG. 9A is a block diagram illustrating the hardware configuration of a color-tone adjustment apparatus employing the method for adjusting color tones of a printed matter according to the invention.
Figure 9B:
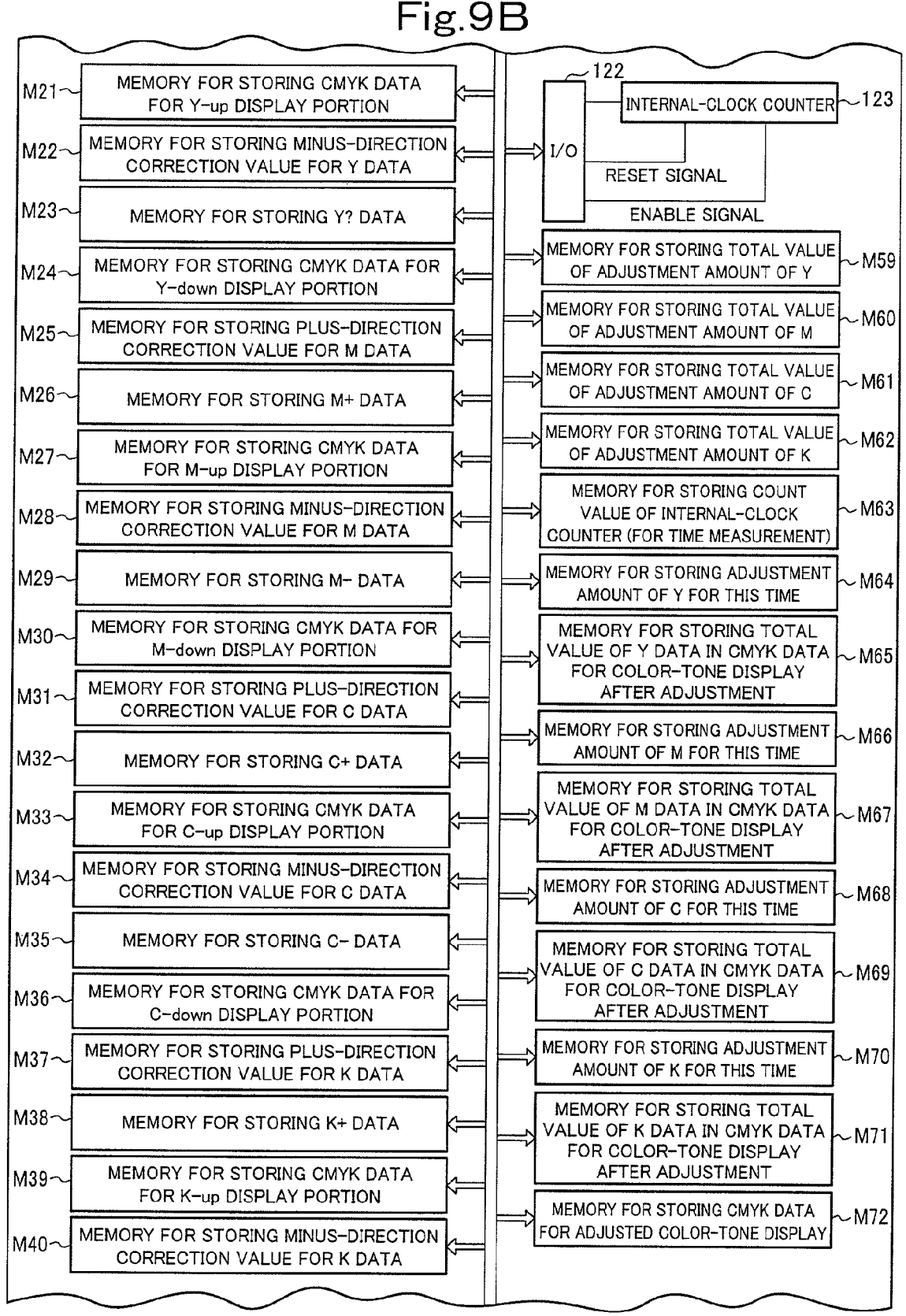
FIG. 9B is a block diagram illustrating the hardware configuration which continues from FIG. 9A.
Figure 9C:
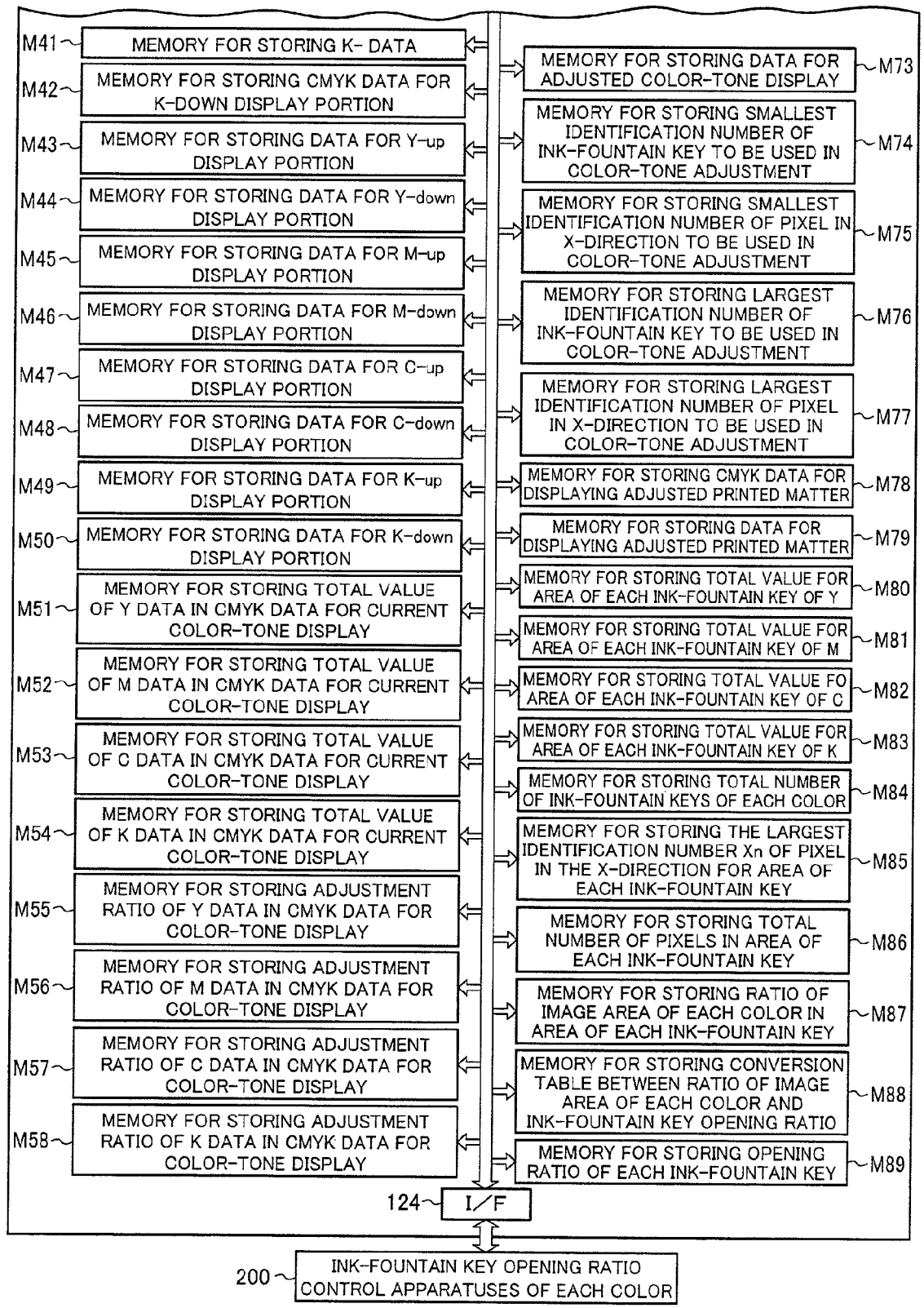
FIG. 9C is a block diagram illustrating the hardware configuration which continues from FIG. 9B.

As shown in FIGS. 9A to 9C, a color-tone adjustment apparatus 100 employing the method for adjusting color tones for a printed matter according to the invention includes a CPU 101, a RAM 102, a ROM 103, input-output (I/O) devices 104, 106, and 122, and an interface (I/F) 124, which are connected to one another by a bus.

The color-tone adjustment apparatus 100 also includes a mouse 105 connected via the I/O 104.

The color-tone adjustment apparatus 100 also includes the following devices that are connected via the I/O 106: a selected area confirmation switch 107; a Y-increase switch 108; a Y-decrease switch 109; an M-increase switch 110; an M-decrease switch 111; a C-increase switch 112; a C-decrease switch 113; a K-increase switch 114; a K-decrease switch 115; a color-tone adjustment completion switch 116; a color-tone re-adjustment switch 117; an input device 118; a display apparatus 119; an FD drive 120; and an output device 121 such as a printer.

The color-tone adjustment apparatus 100 also includes an internal-clock counter 123 connected via the I/O 122.

The color-tone adjustment apparatus 100 is connected to ink-fountain key opening ratio control apparatuses 200 of each color via the I/F 124.

The color-tone adjustment apparatus 100 also includes the following memories that are connected to the bus: a memory M1 for storing count value N; a memory M2 for storing count value X; a memory M3 for storing count value Y; a memory M4 for storing PPF data; a memory M5 for storing CMYK data for displaying; a memory M6 for storing the number of pixels Xmax in the X-direction of a printed matter; a memory M7 for storing the number of pixels Ymax in the Y-direction of a printed matter; a memory M8 for storing data for displaying a printed matter; a memory M9 for storing pointer position (Xs, Ys); a memory M10 for storing mouse-dragged distance (Xd, Yd); a memory M11 for storing selected-area terminal position (Xe, Ye); a memory M12 for storing color-tone adjustment display start position (Xs, Ys); a memory M13 for storing color-tone adjustment display end position (Xe, Ye); a memory M14 for storing the number of pixels in the Y-direction of color-tone adjustment display area; a memory M15 for storing the number of pixels in the X-direction of color-tone adjustment display area; a memory M16 for storing count value L; a memory M17 for storing CMYK data for current color-tone display; a memory M18 for storing data for current color-tone display; a memory M19 for storing plus-direction correction value for Y data; a memory M20 for storing Y+ data; a memory M21 for storing CMYK data for Y-up display portion; a memory M22 for storing minus-direction correction value for Y data; a memory M23 for storing Y− data; a memory M24 for storing CMYK data for Y-down display portion; a memory 1425 for storing plus-direction correction value for M data; a memory M26 for storing M+ data; a memory M27 for storing CMYK data for M-up display portion; a memory M28 for storing minus-direction correction value for M data; a memory M29 for storing M− data; a memory M30 for storing CMYK data for M-down display portion; a memory M31 for storing plus-direction correction value for C data; a memory M32 for storing C+ data; a memory M33 for storing CMYK data for C-up display portion; a memory M34 for storing minus-direction correction value for C data; a memory M35 for storing C− data; a memory M36 for storing CMYK data for C-down display portion; a memory M37 for storing plus-direction correction value for K data; a memory M38 for storing K+ data; a memory M39 for storing CMYK data for K-up display portion; a memory M40 for storing minus-direction correction value for K data; a memory M41 for storing K− data; a memory M42 for storing CMYK data for K-down display portion; a memory M43 for storing data for Y-up display portion; a memory M44 for storing data for Y-down display portion; a memory M45 for storing data for M-up display portion; a memory M46 for storing data for M-down display portion; a memory M47 for storing data for C-up display portion; a memory M48 for storing data for C-down display portion; a memory M49 for storing data for K-up display portion; a memory M50 for storing data for K-down display portion; a memory M51 for storing total value of Y data in CMYK data for current color-tone display; a memory M52 for storing total value of M data in CMYK data for current color-tone display; a memory M53 for storing total value of C data in CMYK data for current color-tone display; a memory M54 for storing total value of K data in CMYK data for current color-tone display; a memory M55 for storing adjustment ratio of Y data in CMYK data for color-tone display; a memory M56 for storing adjustment ratio of M data in CMYK data for color-tone display; a memory M57 for storing adjustment ratio of C data in CMYK data for color-tone display; a memory M58 for storing adjustment ratio of K data in CMYK data for color-tone display; a memory M59 for storing total value of adjustment amount of Y; a memory M60 for storing total value of adjustment amount of M; a memory M61 for storing total value of adjustment amount of C; a memory M62 for storing total value of adjustment amount of K; a memory M63 for storing count value of internal-clock counter for time measurement; a memory M64 for storing adjustment amount of Y for this time; a memory M65 for storing total value of Y data in CMYK data for color-tone display after adjustment; a memory M66 for storing adjustment amount of M for this time; a memory M67 for storing total value of M data in CMYK data for color-tone display after adjustment; a memory M68 for storing adjustment amount of C for this time; a memory M69 for storing total value of C data in CMYK data for color-tone display after adjustment; a memory M70 for storing adjustment amount of K for this time; a memory M71 for storing total value of K data in CMYK data for color-tone display after adjustment; a memory M72 for storing CMYK data for adjusted color-tone display; a memory M73 for storing data for adjusted color-tone display; a memory M74 for storing the smallest identification number of ink-fountain key to be used in color-tone adjustment; a memory M75 for storing the smallest identification number of pixel in the X-direction to be used in color-tone adjustment; a memory M76 for storing the largest identification number of ink-fountain key to be used in color-tone adjustment; a memory M77 for storing the largest identification number of pixel in the X-direction to be used in color-tone adjustment; a memory M78 for storing CMYK data for displaying an adjusted printed matter; a memory M79 for storing data for displaying an adjusted printed matter; a memory M80 for storing total value for area of each ink-fountain key of Y; a memory M81 for storing total value for area of each ink-fountain key of M; a memory M82 for storing total value for area of each ink-fountain key of C; a memory M83 for storing total value for area of each ink-fountain key of K; a memory M84 for storing total number of ink-fountain keys of each color; a memory M85 for storing the largest identification number Xn of pixel in the X-direction for area of each ink-fountain key; a memory M86 for storing total number of pixels in area of each ink-fountain key; a memory M87 for storing image-area ratio in area of each of the ink-fountain keys of each color; a memory M88 for storing conversion table between image-area ratio of each color and ink-fountain key opening ratio; a memory M89 for storing opening ratio of each ink-fountain key.

Figure 10:
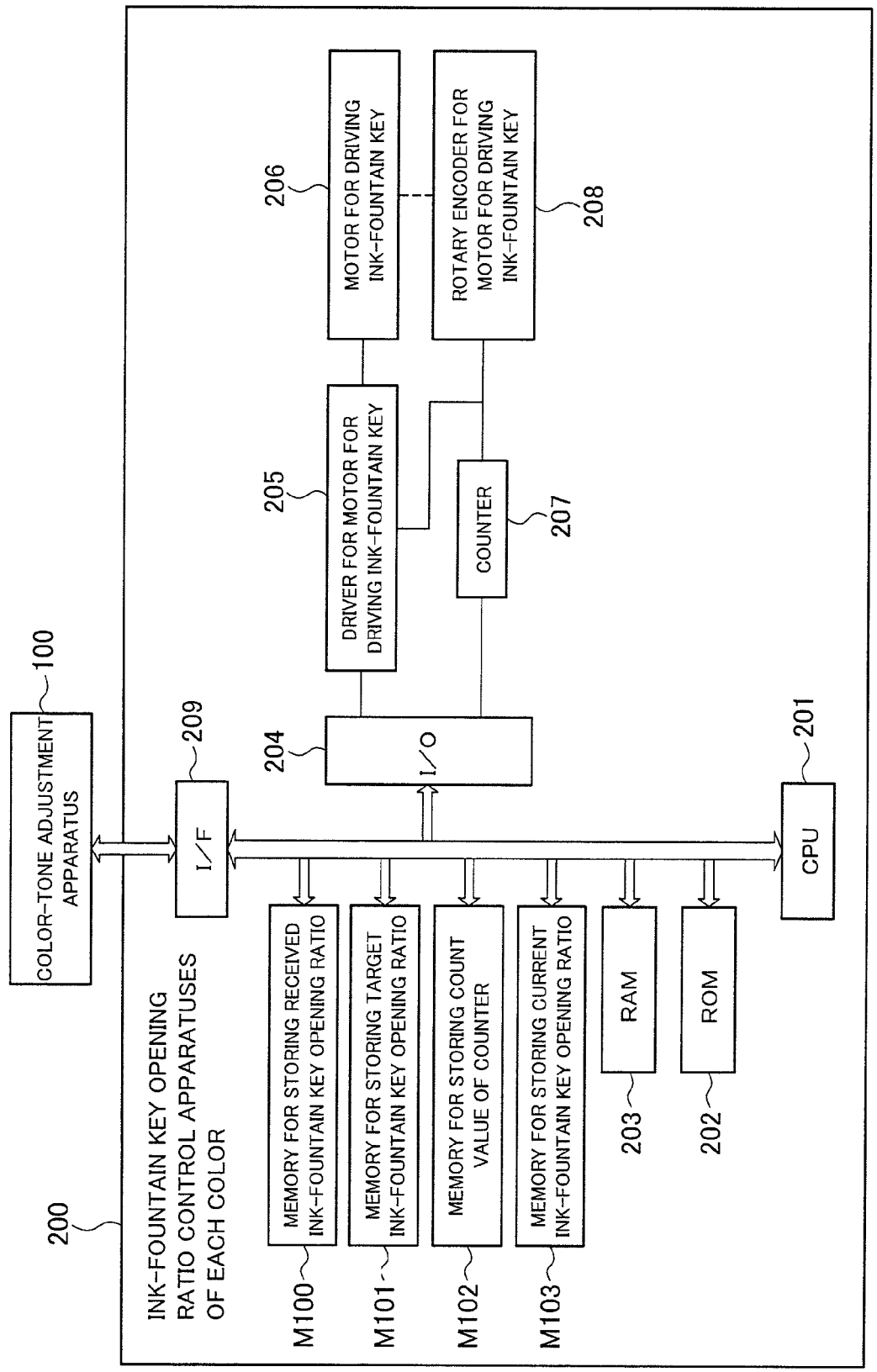
FIG. 10 is a block diagram illustrating the hardware configuration of an ink-fountain key opening ratio control apparatus of each color, which is a peripheral device of the color-tone adjustment apparatus employing the method for adjusting color tones of a printed matter according to the invention.

As shown in FIG. 10, each of the ink-fountain key opening ratio control apparatuses 200 of each color includes a CPU 201, a ROM 202, a RAM 203, an I/O 204, and an I/F 209, which are connected to the one another by a bus.

Each of the ink-fountain key opening ratio control apparatuses 200 of each color also includes a driver 205 for a motor for driving ink-fountain key that is connected via the I/O 204. A motor 206 for driving ink-fountain key is connected to the driver 205 for a motor for driving ink-fountain key.

Each of the ink-fountain key opening ratio control apparatuses 200 of each color also includes a counter 207 that is connected via the I/O 204. A rotary encoder 208 for a motor for driving ink-fountain key is connected to the counter 207.

Each of the ink-fountain key opening ratio control apparatuses 200 of each color is connected to the color-tone adjustment apparatus 100 via the I/F 209.

Each of the ink-fountain key opening ratio control apparatuses 200 of each color also includes the following memories that are connected to the bus: a memory M100 for storing received ink-fountain key opening ratio; a memory M101 for storing target ink-fountain key opening ratio; a memory M102 for storing count value of counter; a memory M103 for storing current ink-fountain key opening ratio.

The description has been given above of the apparatus configurations of the color-tone adjustment apparatus employing the method for adjusting color tones of a printed matter according to the invention and the peripheral devices thereof.

Next, detailed description will be given of the operational flow of the color-tone adjustment apparatus 100 employing the method for adjusting color tones of a printed matter according to the invention.

Figure 11B:
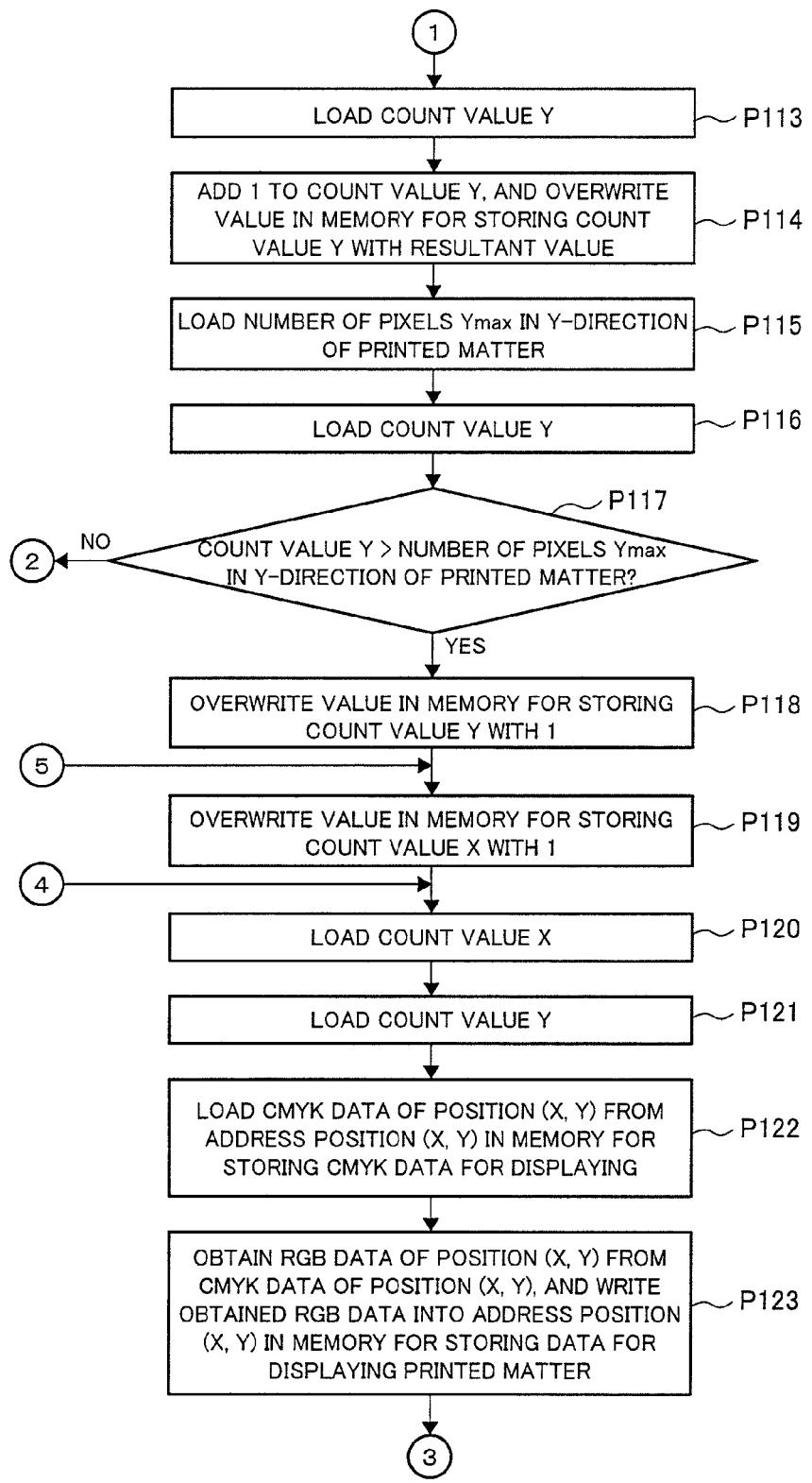
FIG. 11B is a flowchart illustrating an operational flow subsequent to that of FIG. 11A.
Figure 11C:
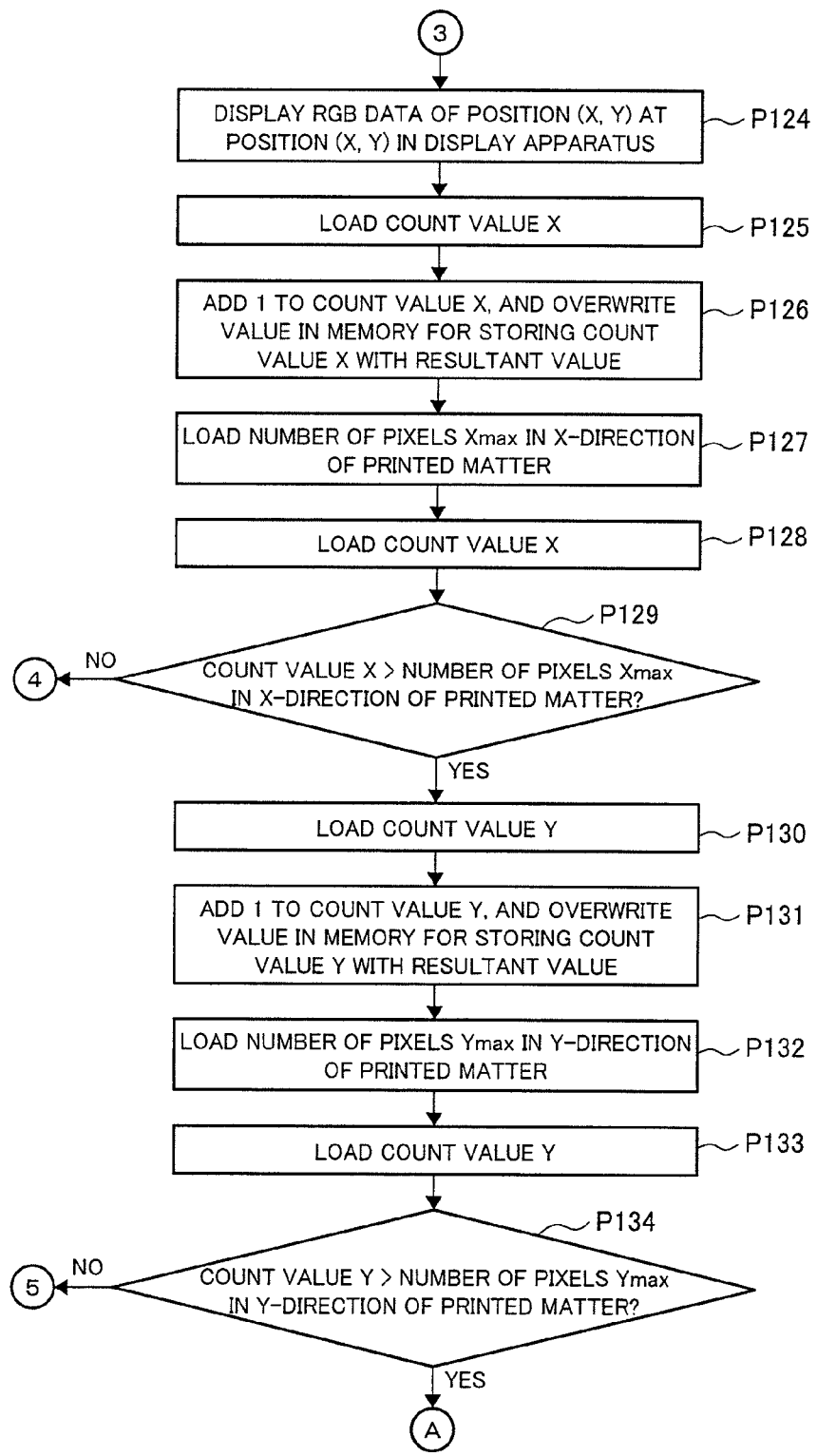
FIG. 11C is a flowchart illustrating an operational flow subsequent to that of FIG. 11B.
Figure 12A:
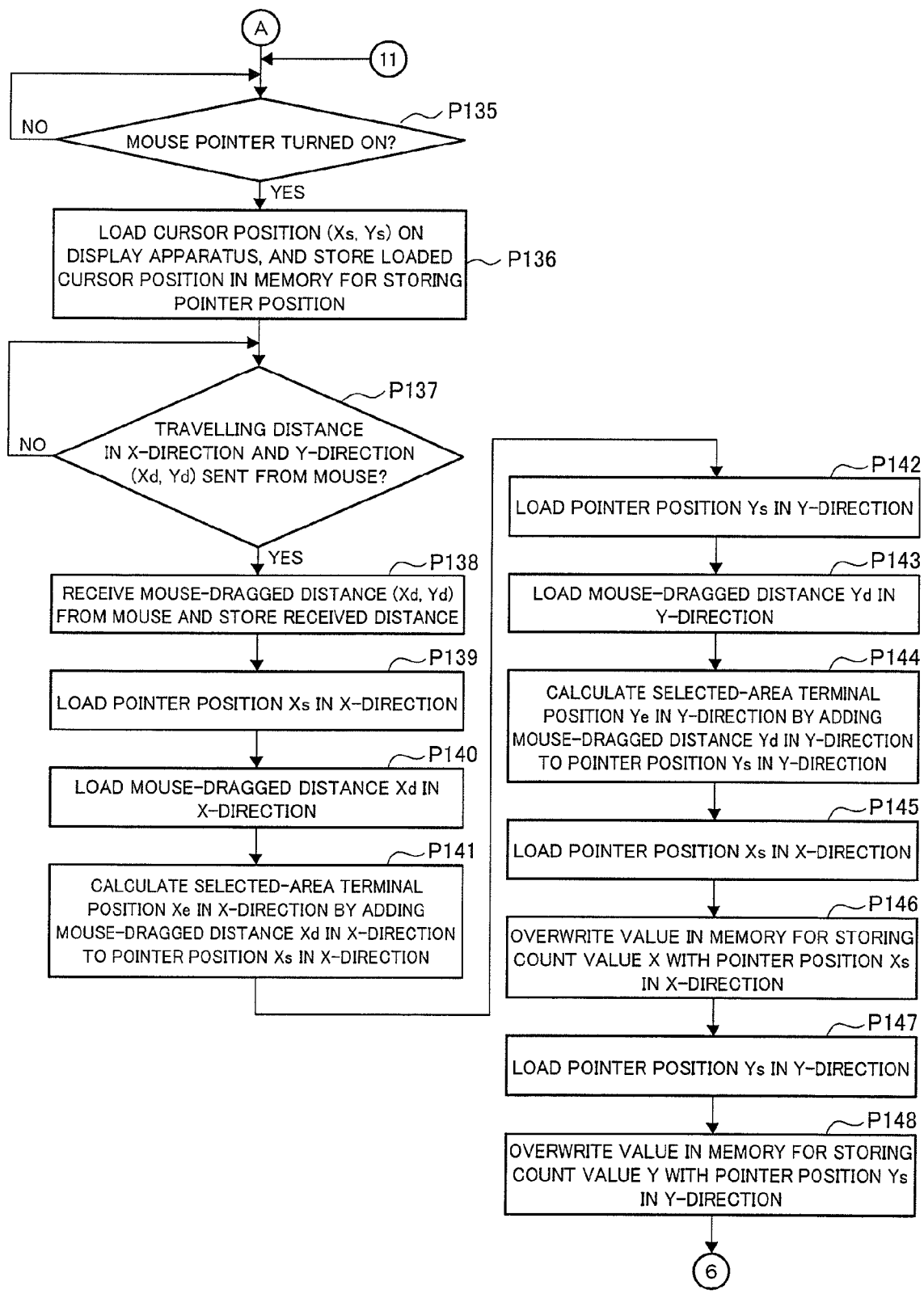
FIG. 12A is a flowchart illustrating an operational flow subsequent to that of FIG. 11C.
Figure 12B:
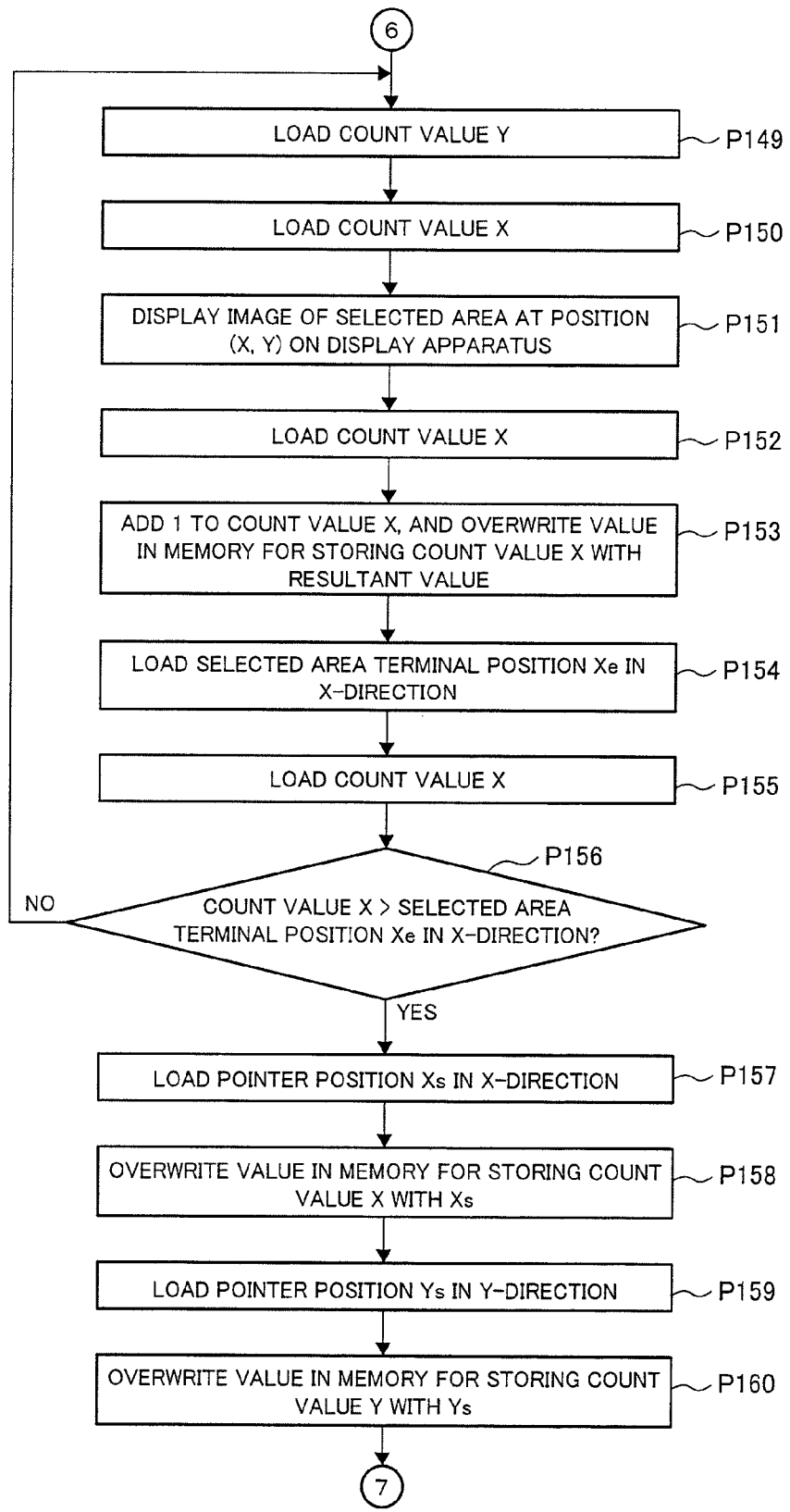
FIG. 12B is a flowchart illustrating an operational flow subsequent to that of FIG. 12A.
Figure 12C:
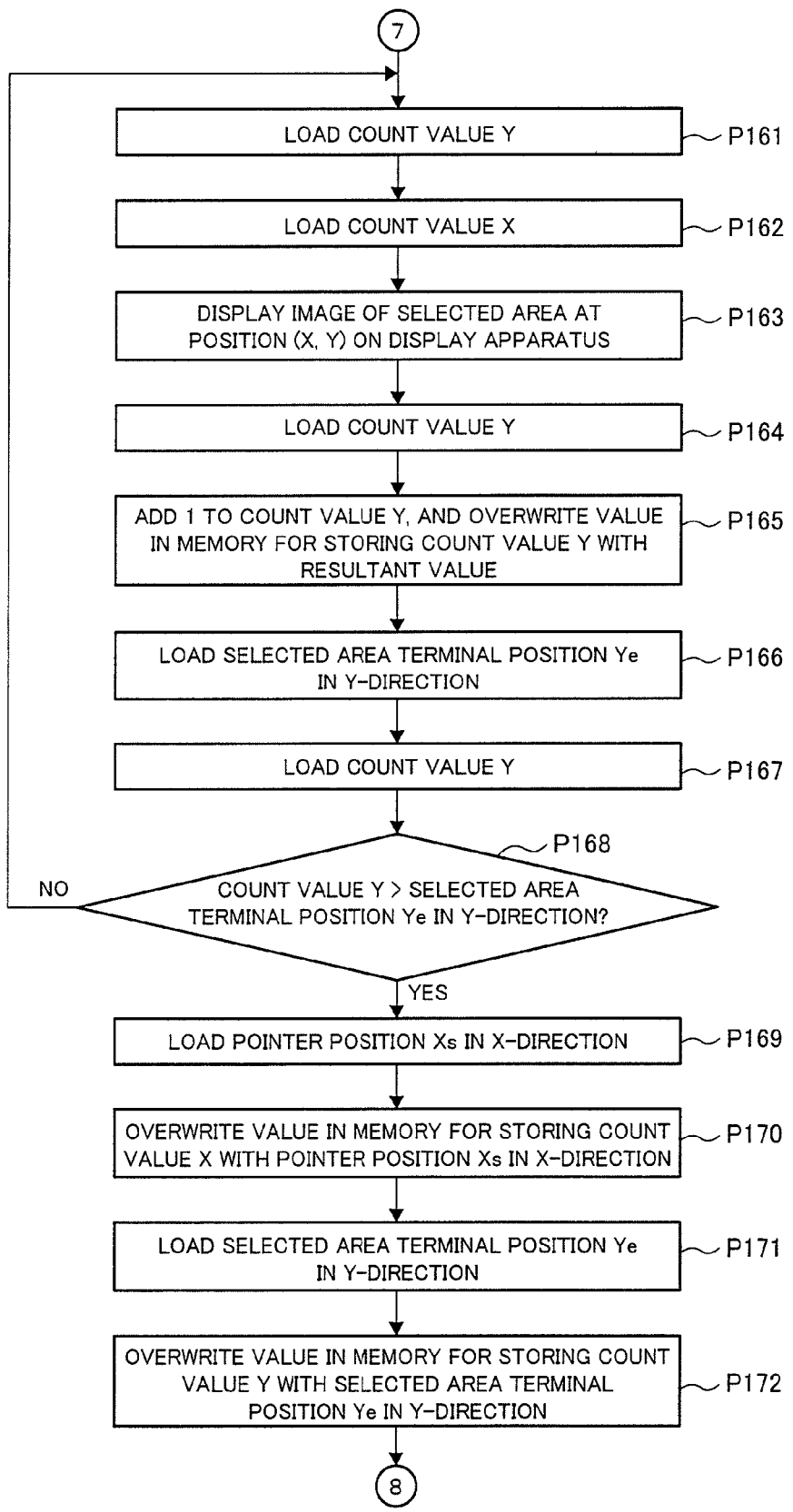
FIG. 12C is a flowchart illustrating an operational flow subsequent to that of FIG. 12B.
Figure 12D:
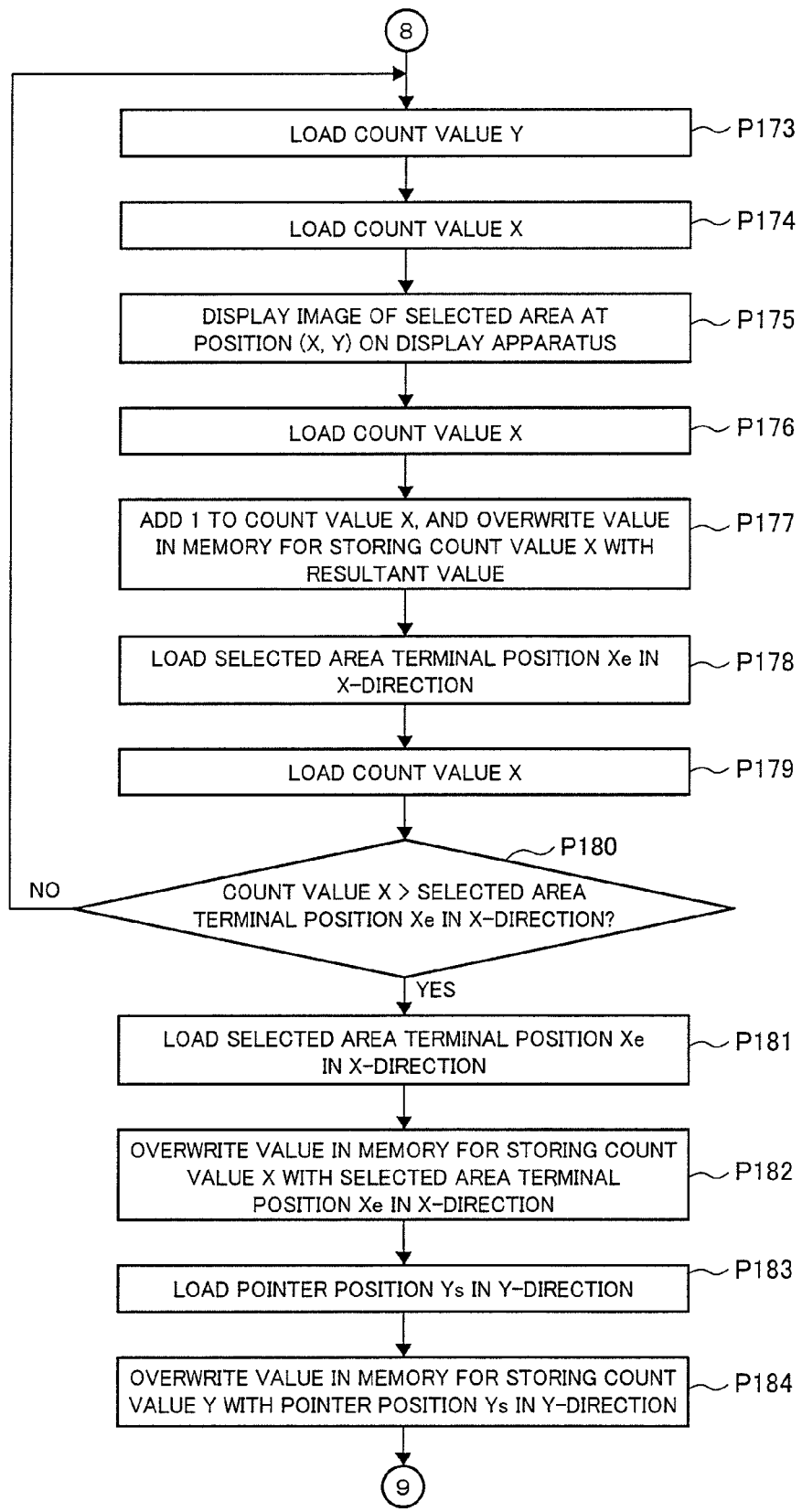
FIG. 12D is a flowchart illustrating an operational flow subsequent to that of FIG. 12C.
Figure 12E:
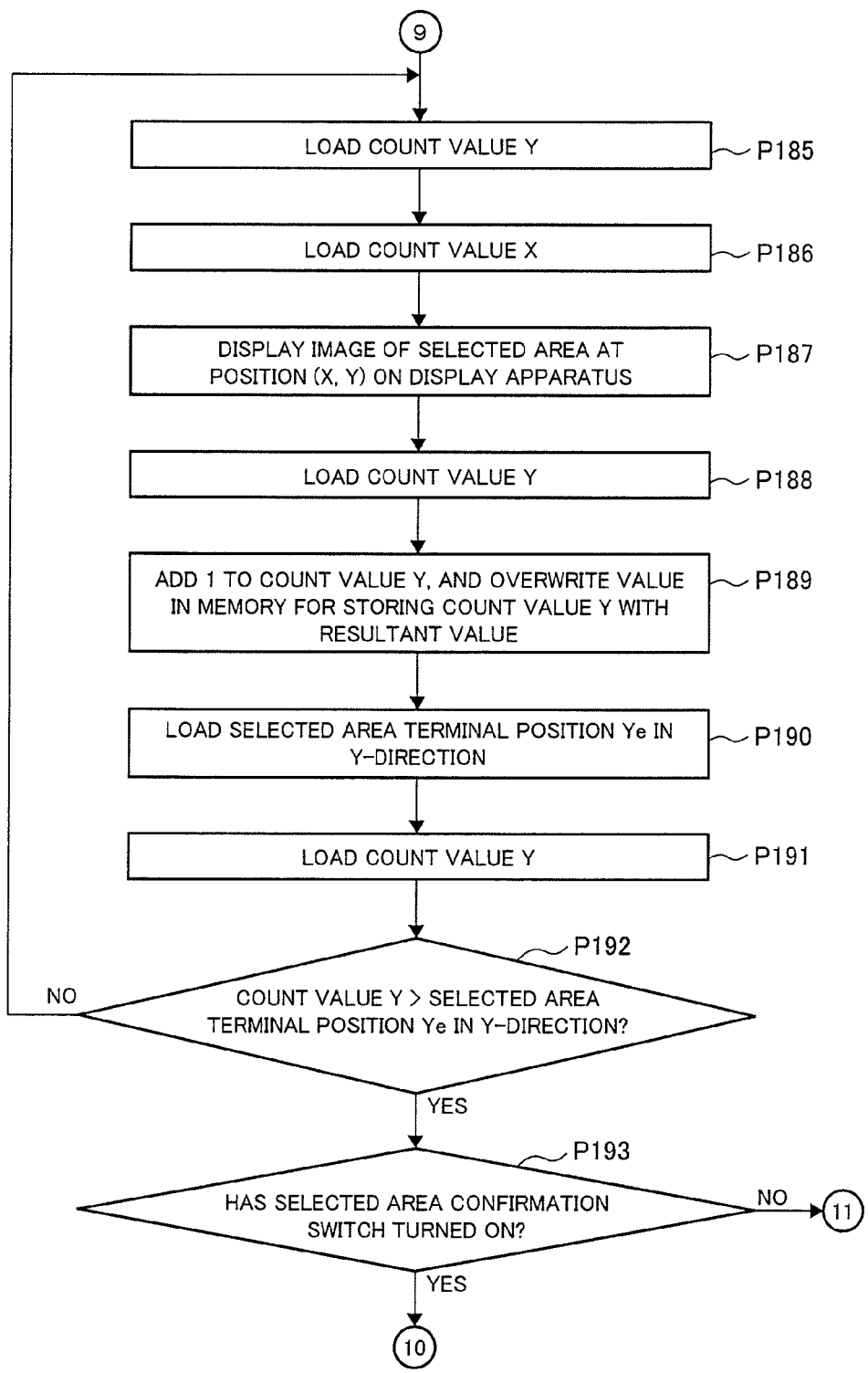
FIG. 12E is a flowchart illustrating an operational flow subsequent to that of FIG. 12D.
Figure 12F:
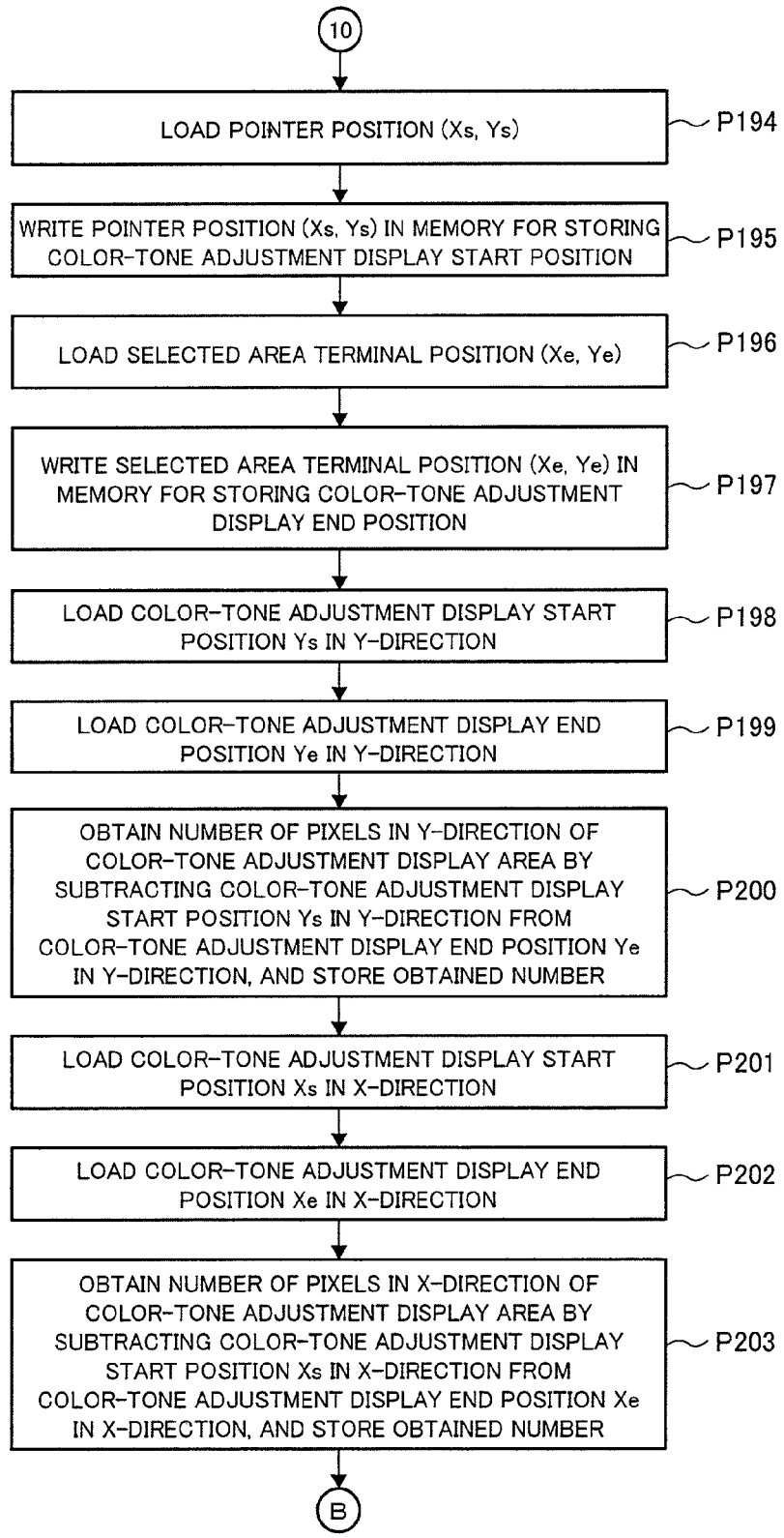
FIG. 12F is a flowchart illustrating an operational flow subsequent to that of FIG. 12E.
Figure 13A:
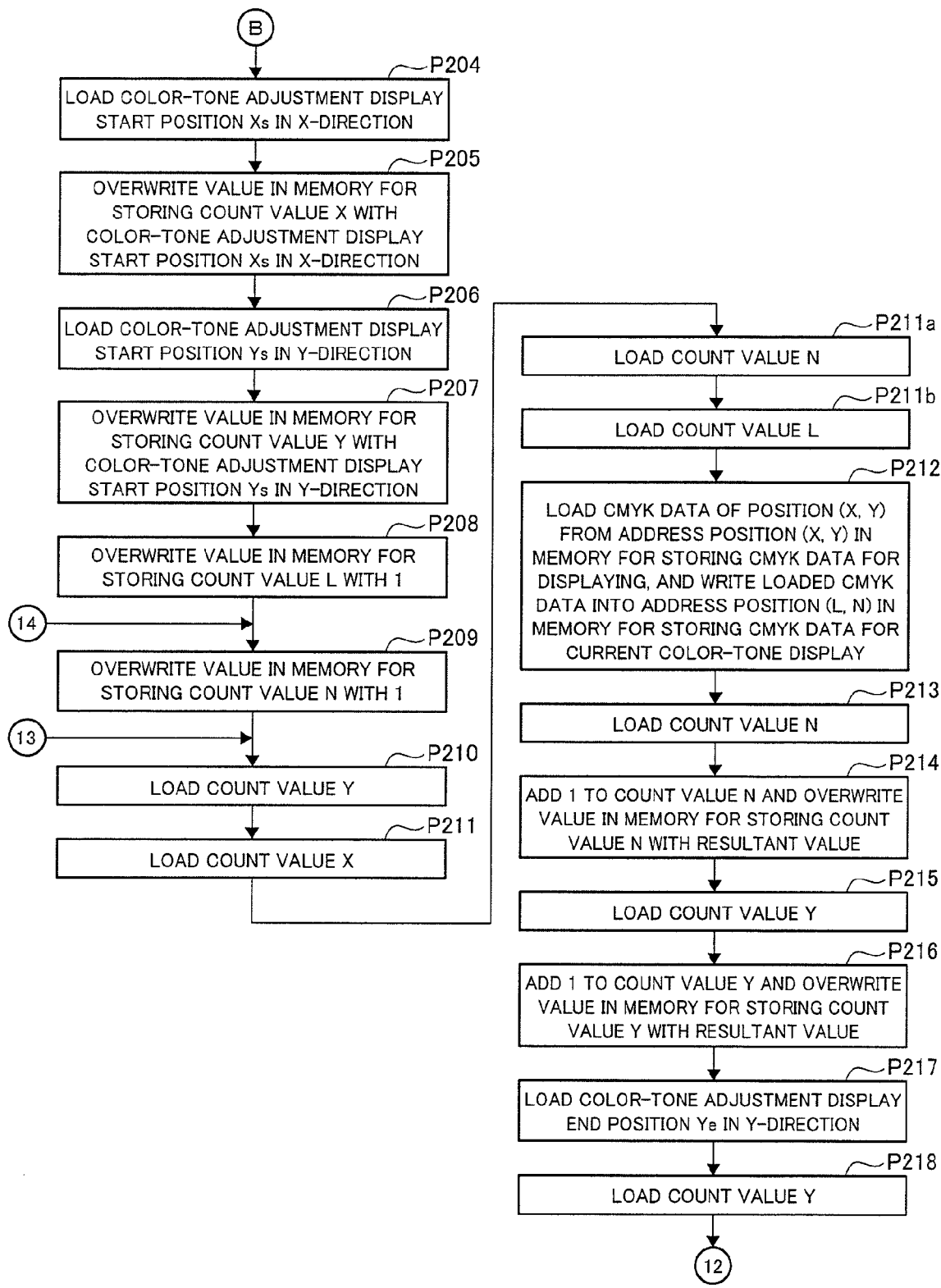
FIG. 13A is a flowchart illustrating an operational flow subsequent to that of FIG. 12F.
Figure 13B:
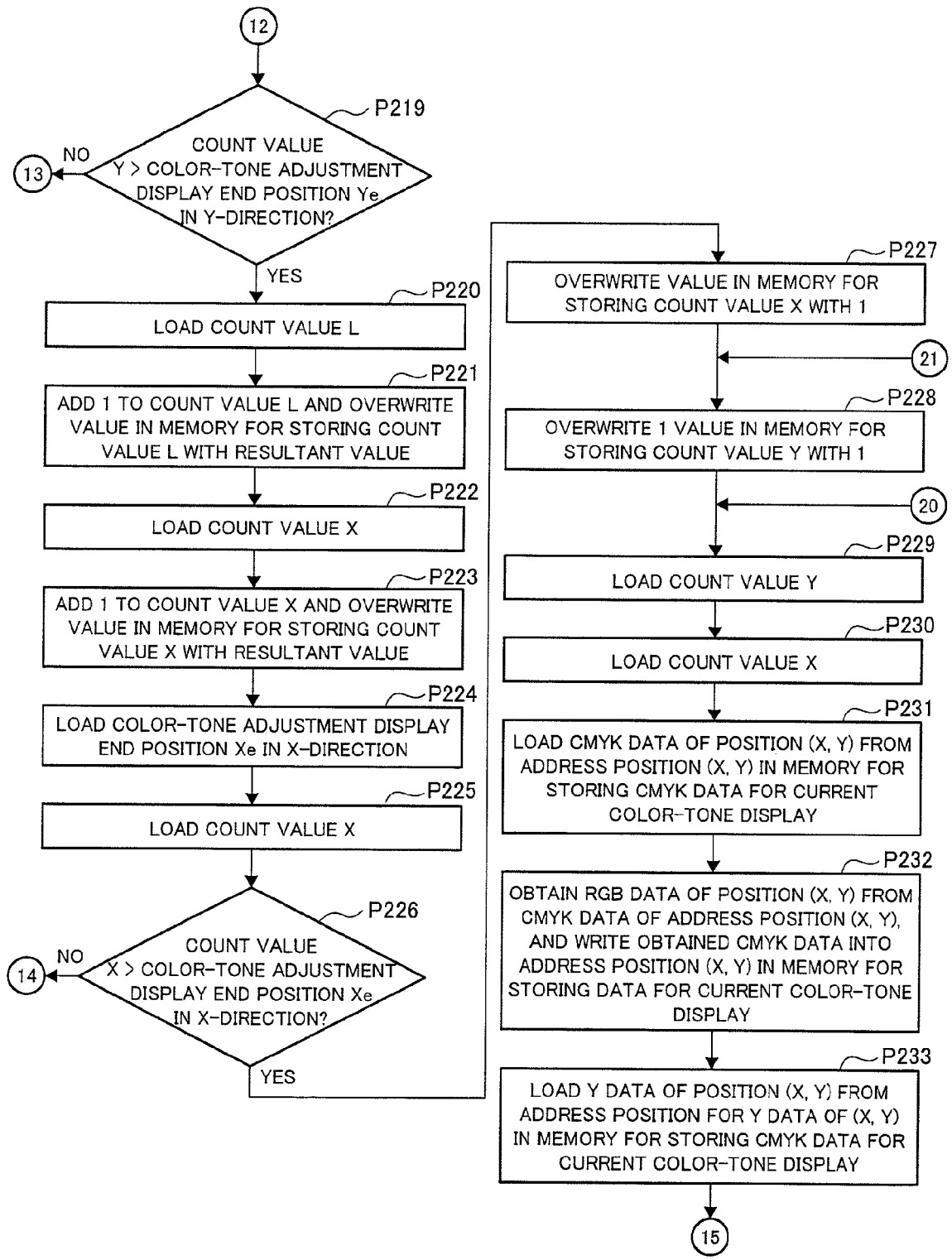
FIG. 13B is a flowchart illustrating an operational flow subsequent to that of FIG. 13A.
Figure 13C:
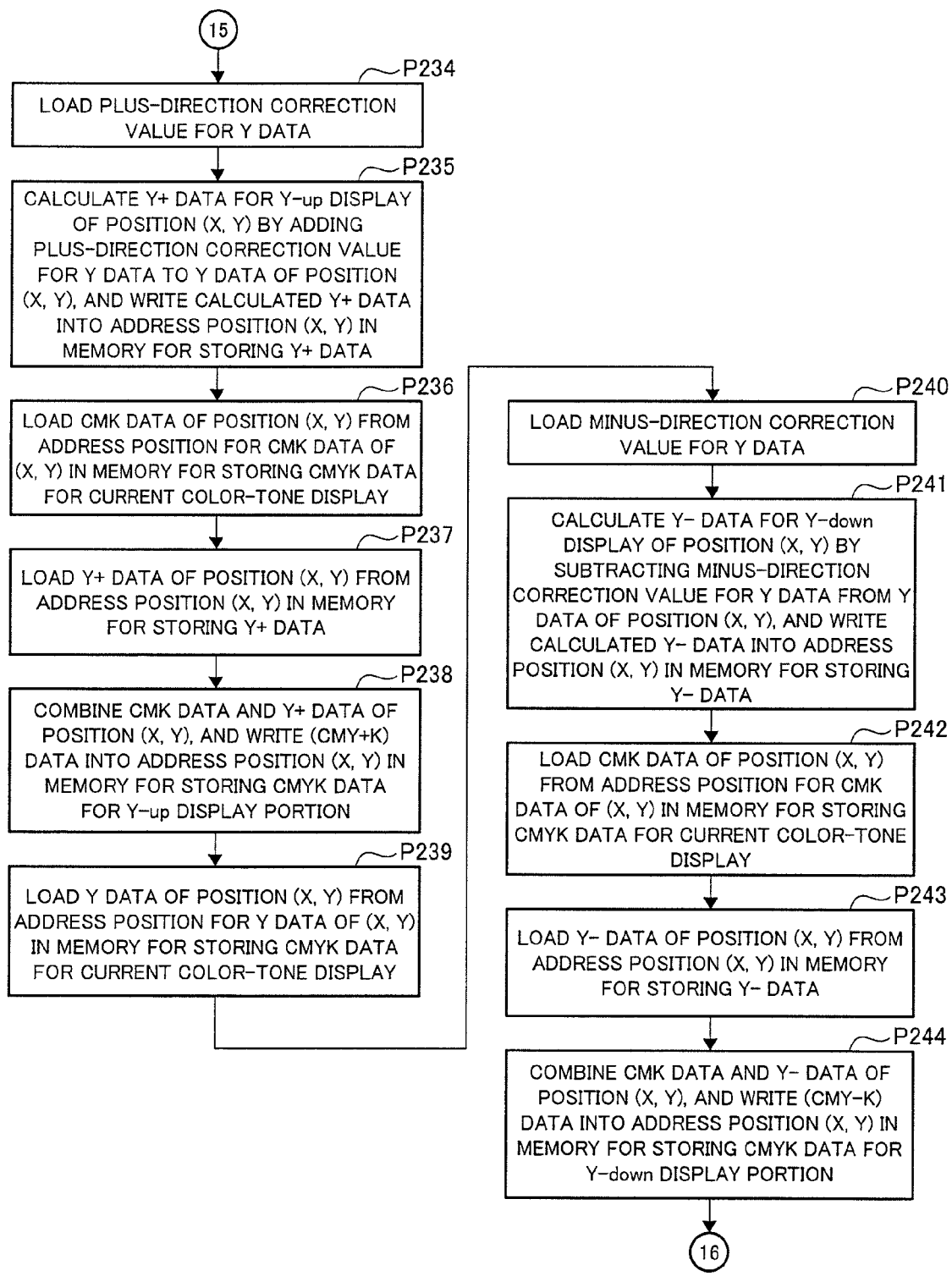
FIG. 13C is a flowchart illustrating an operational flow subsequent to that of FIG. 13B.
Figure 13D:
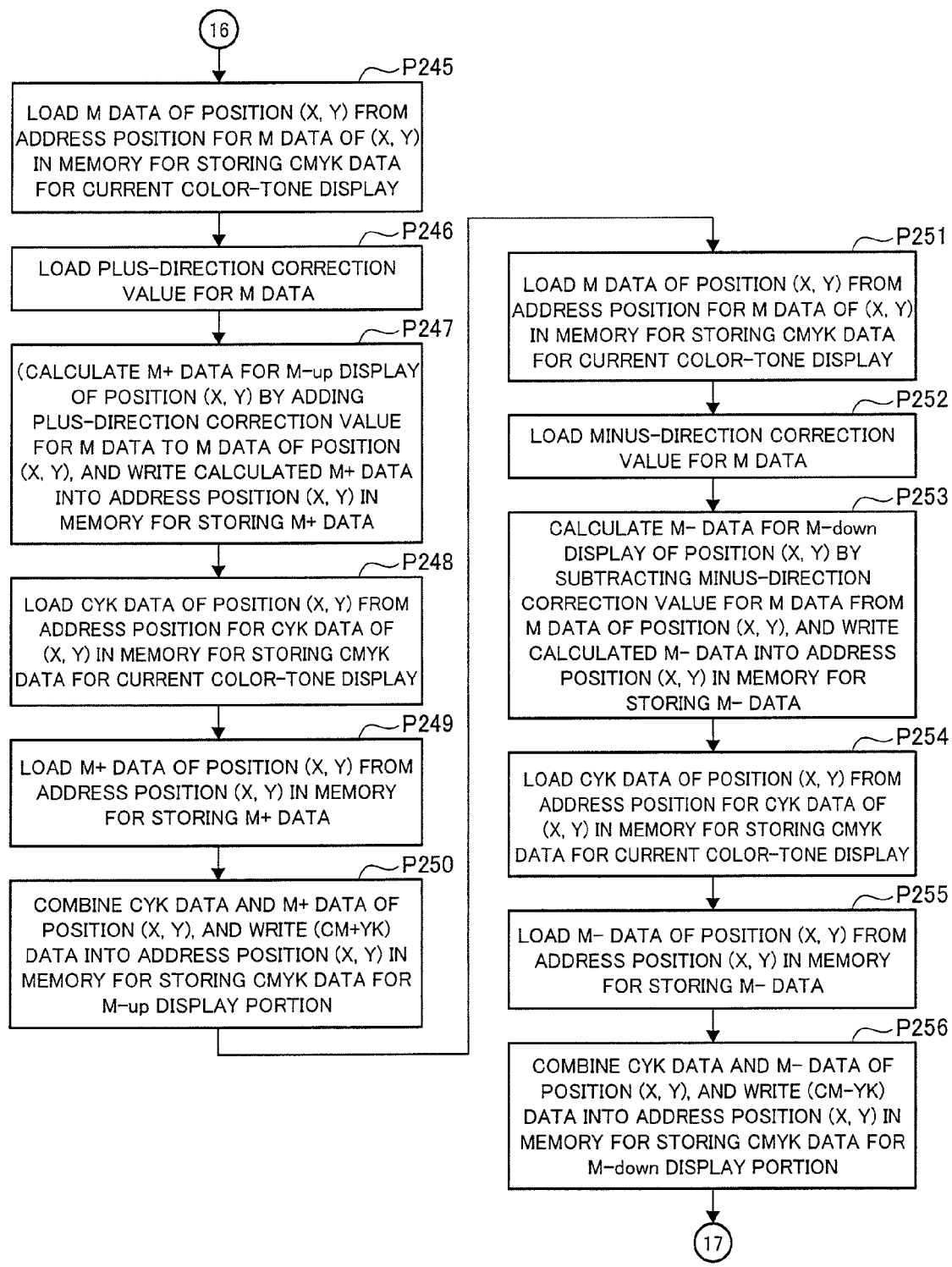
FIG. 13D is a flowchart illustrating an operational flow subsequent to that of FIG. 13C.
Figure 13E:
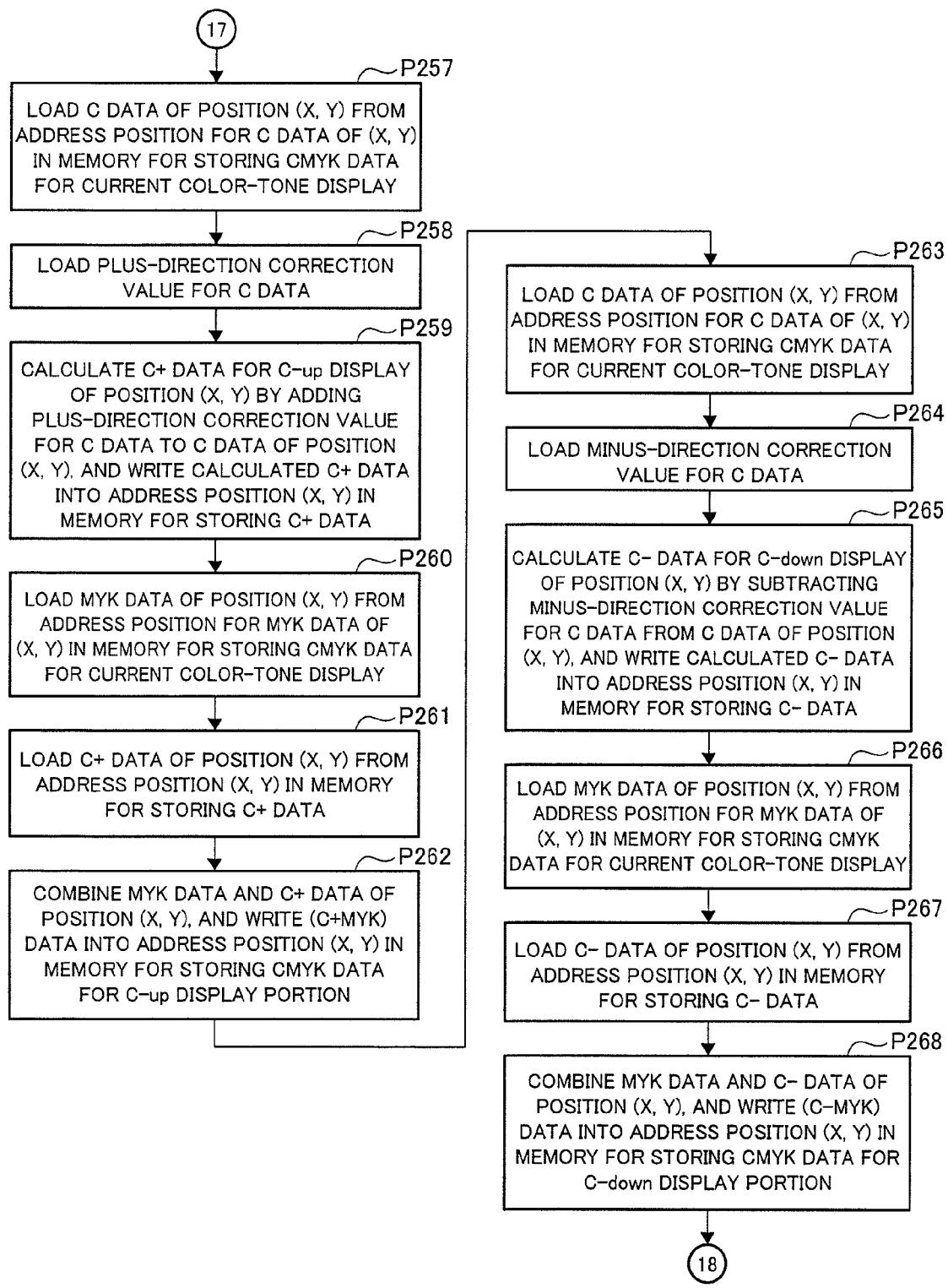
FIG. 13E is a flowchart illustrating an operational flow subsequent to that of FIG. 13D.
Figure 13F:
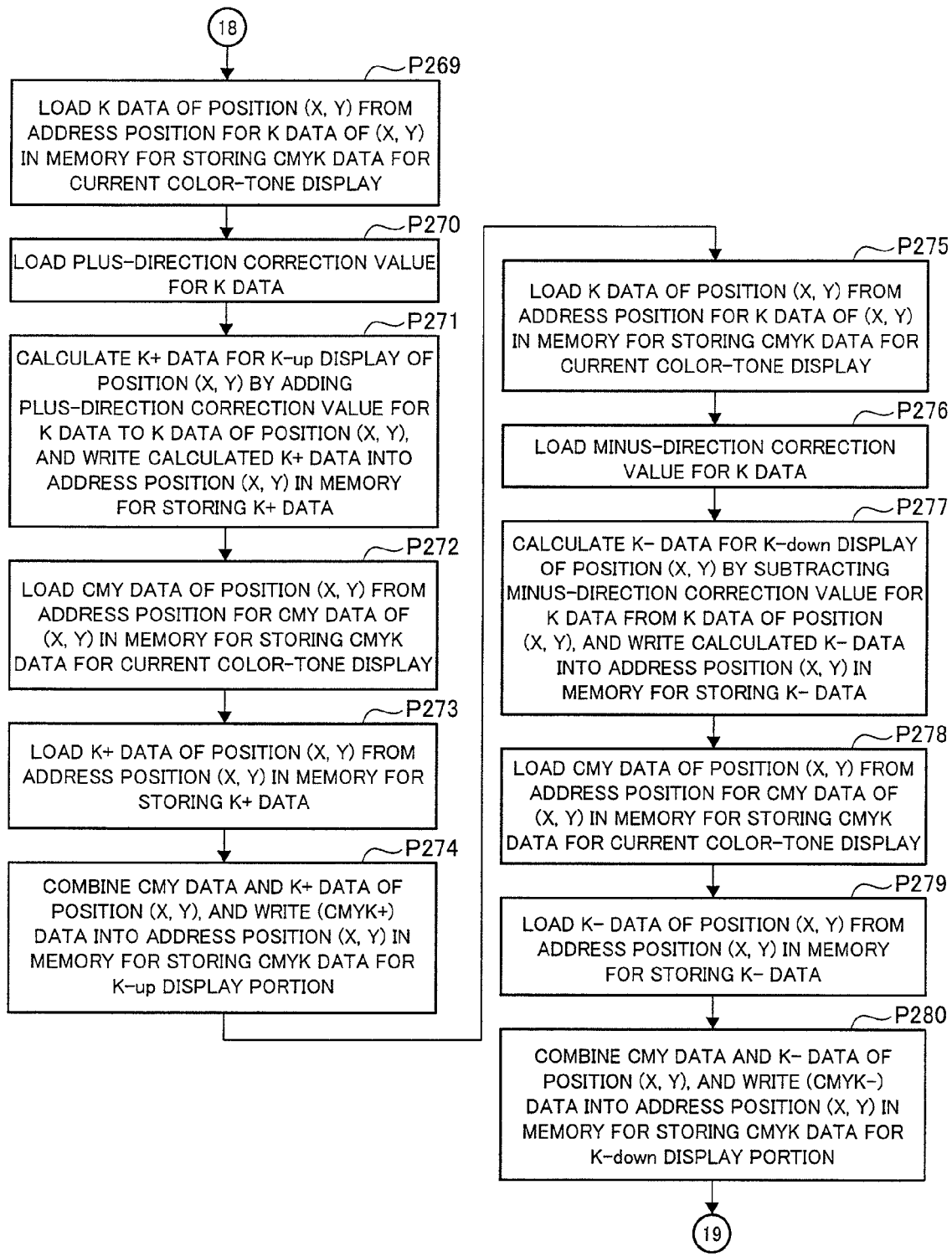
FIG. 13F is a flowchart illustrating an operational flow subsequent to that of FIG. 13E.
Figure 13G:
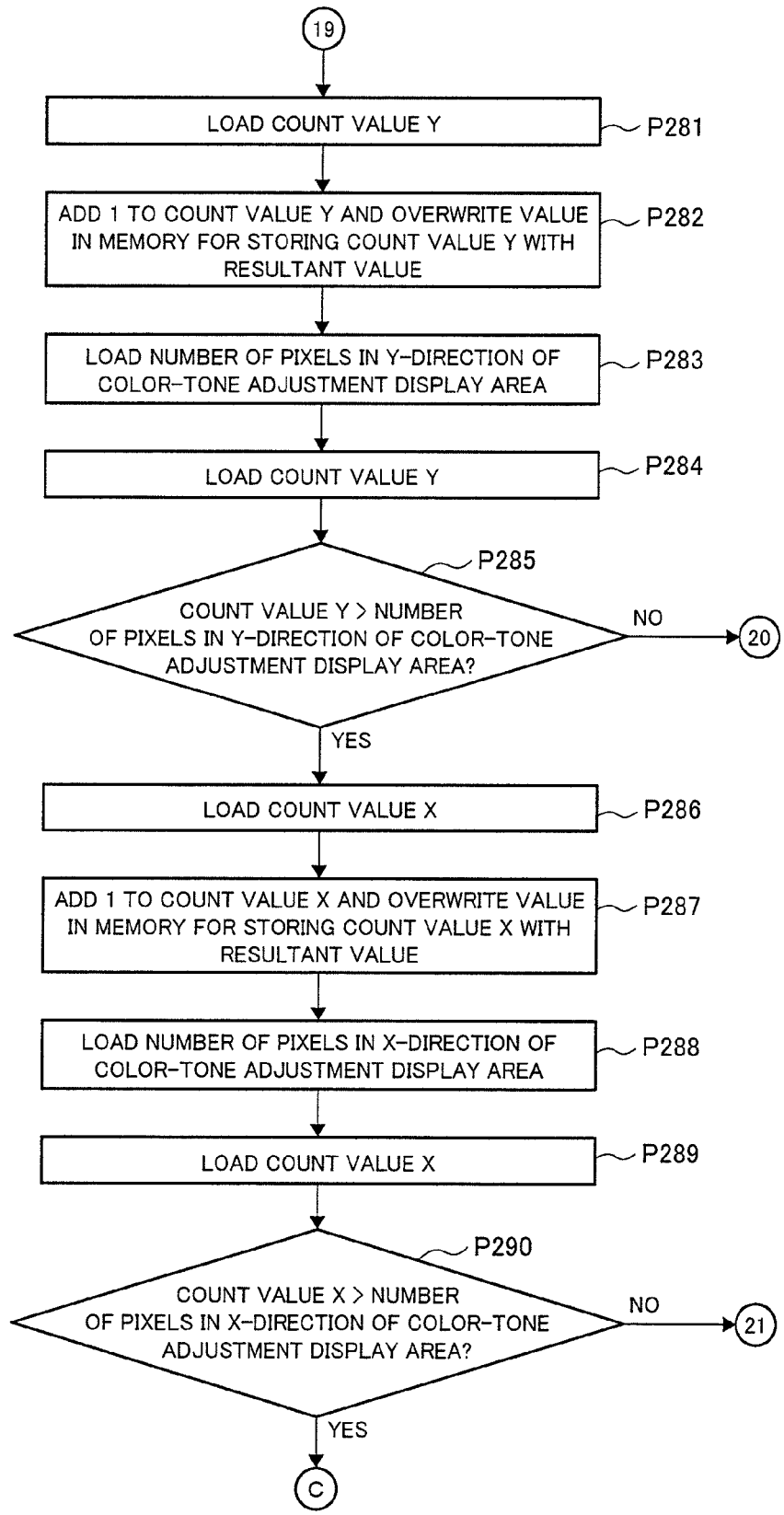
FIG. 13G is a flowchart illustrating an operational flow subsequent to that of FIG. 13F.
Figure 14A:
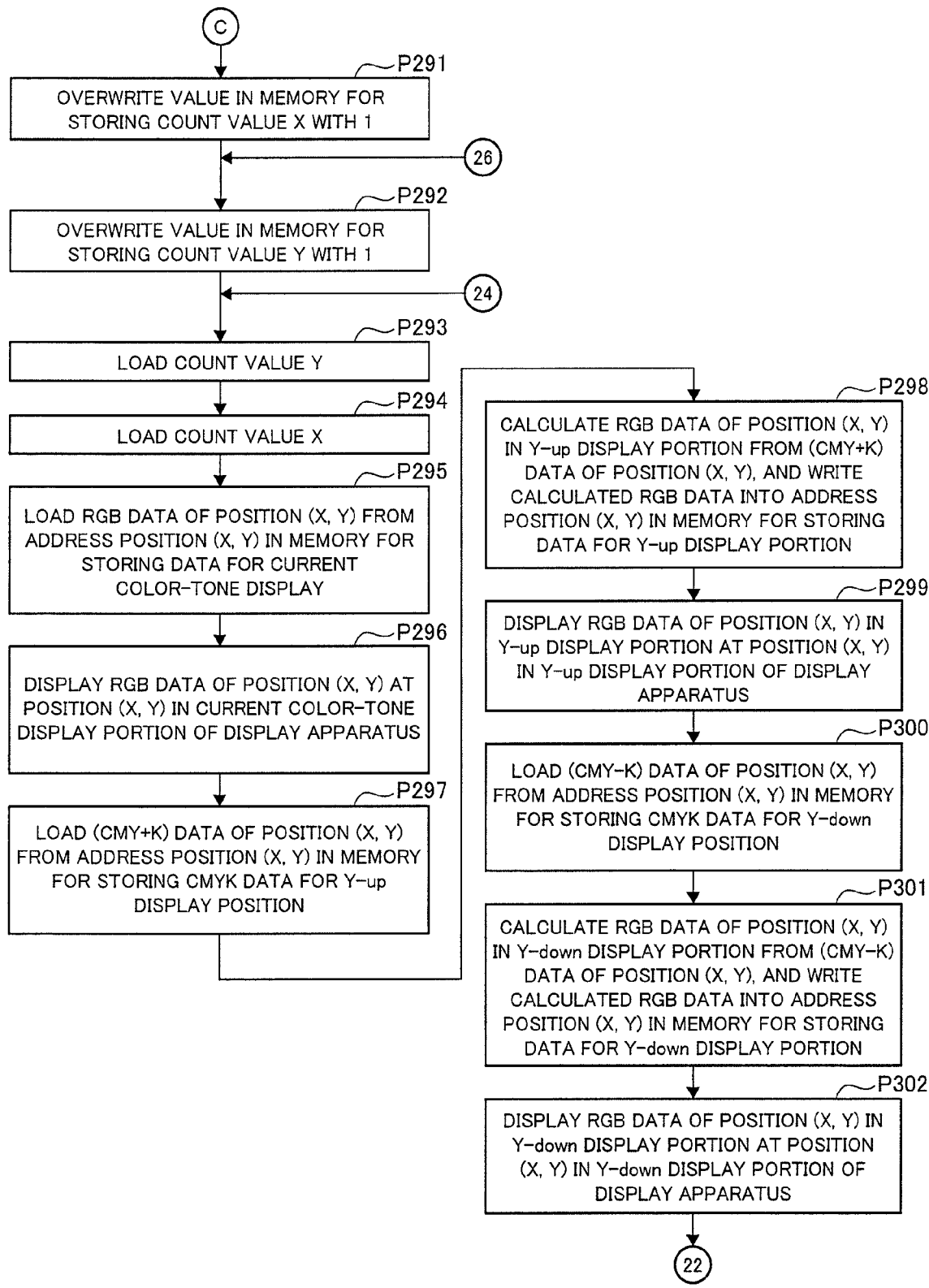
FIG. 14A is a flowchart illustrating an operational flow subsequent to that of in FIG. 13G.
Figure 14B:
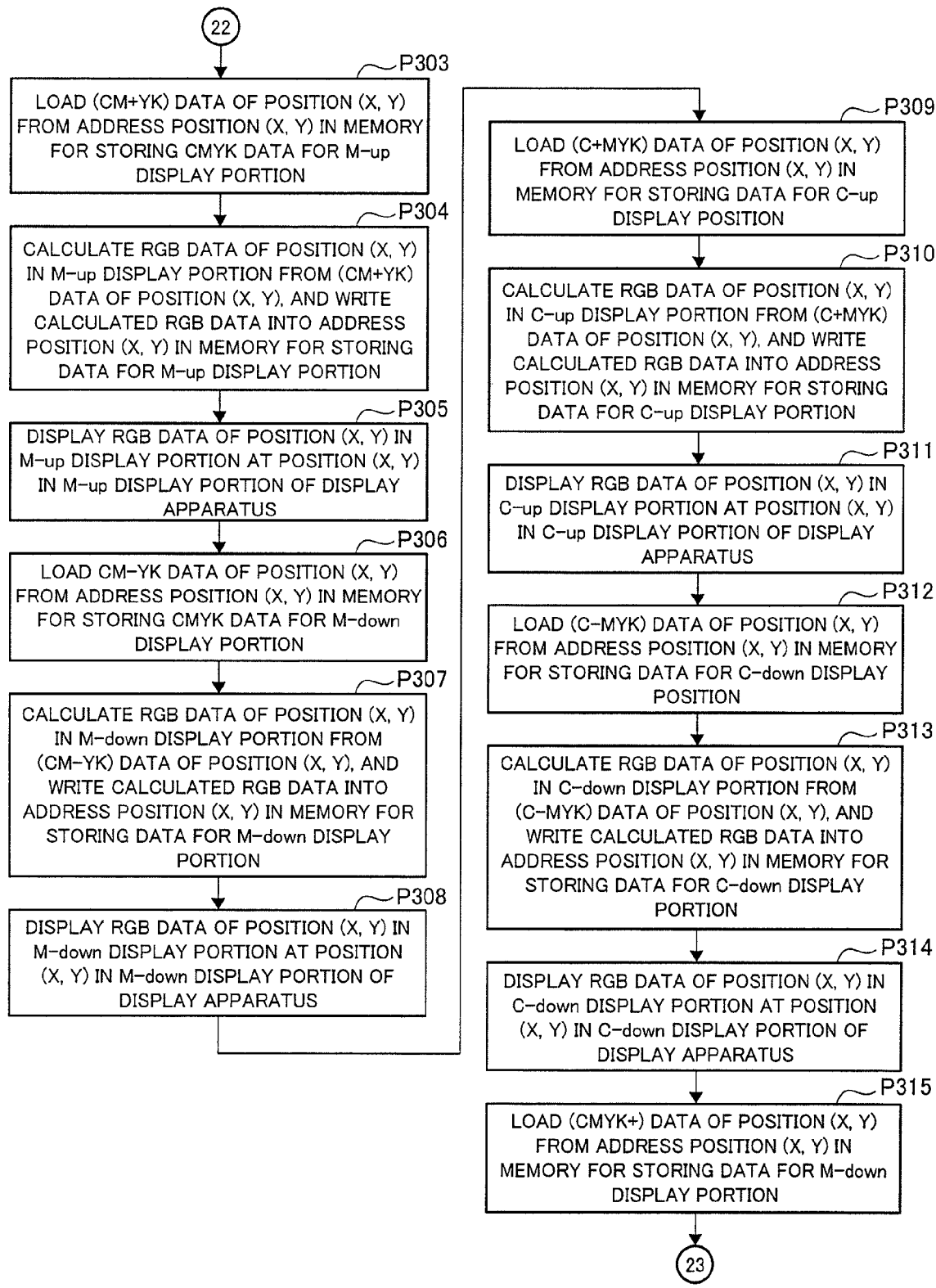
FIG. 14B is a flowchart illustrating an operational flow subsequent to that of FIG. 14A.
Figure 14C:
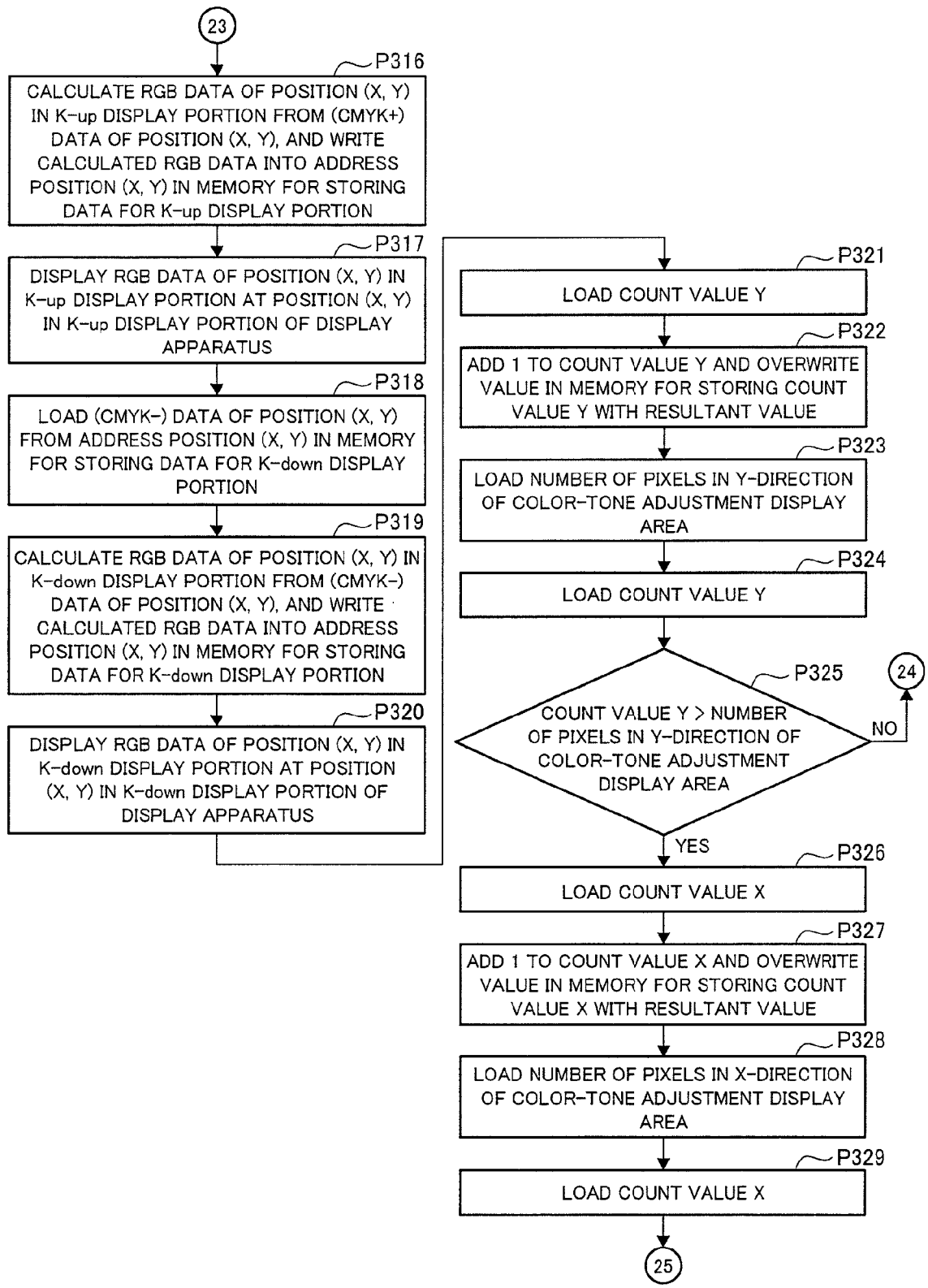
FIG. 14C is a flowchart illustrating an operational flow subsequent to that of FIG. 14B.
Figure 14D:
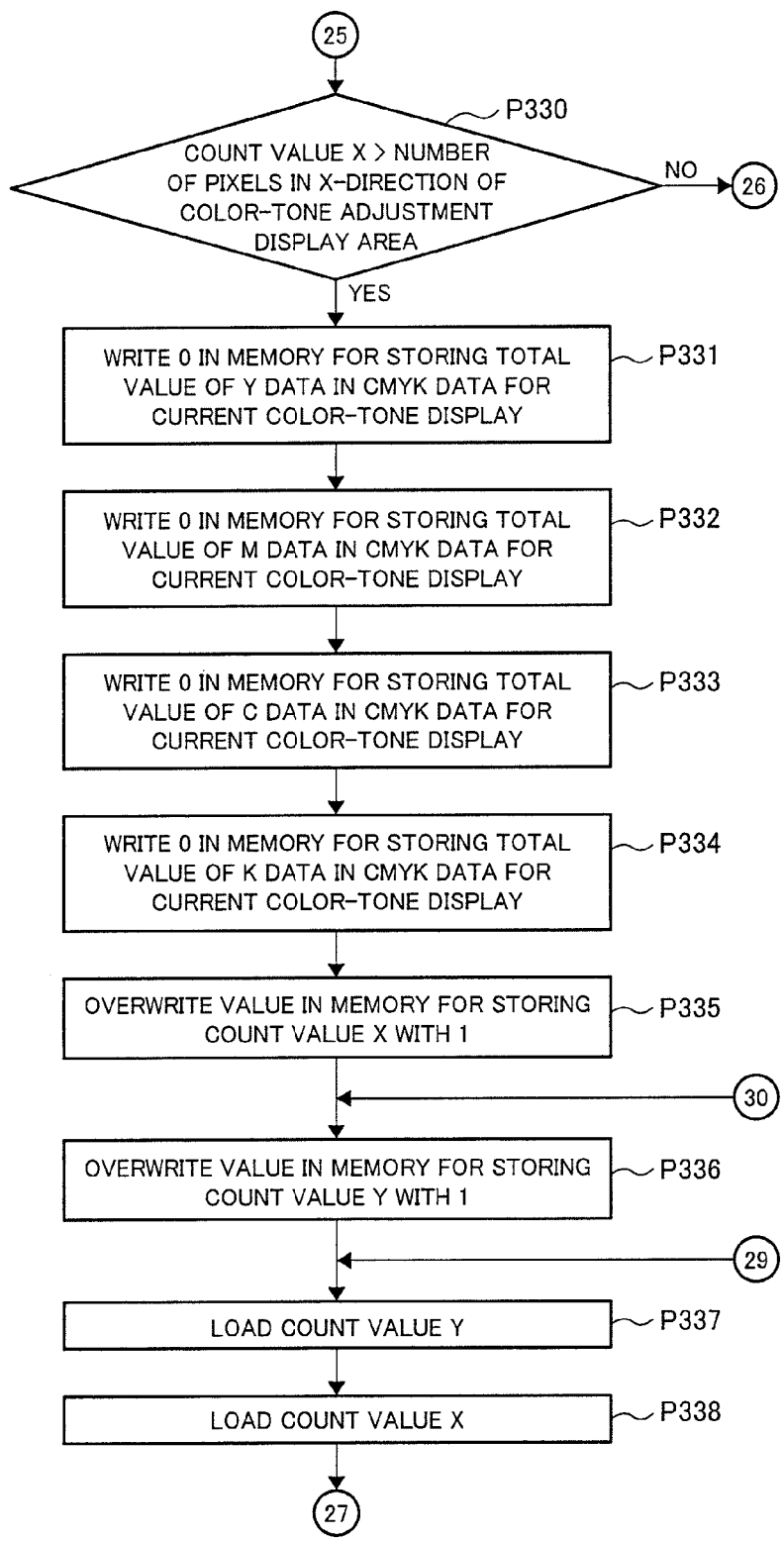
FIG. 14D is a flowchart illustrating an operational flow subsequent to that of FIG. 14C.
Figure 14E:
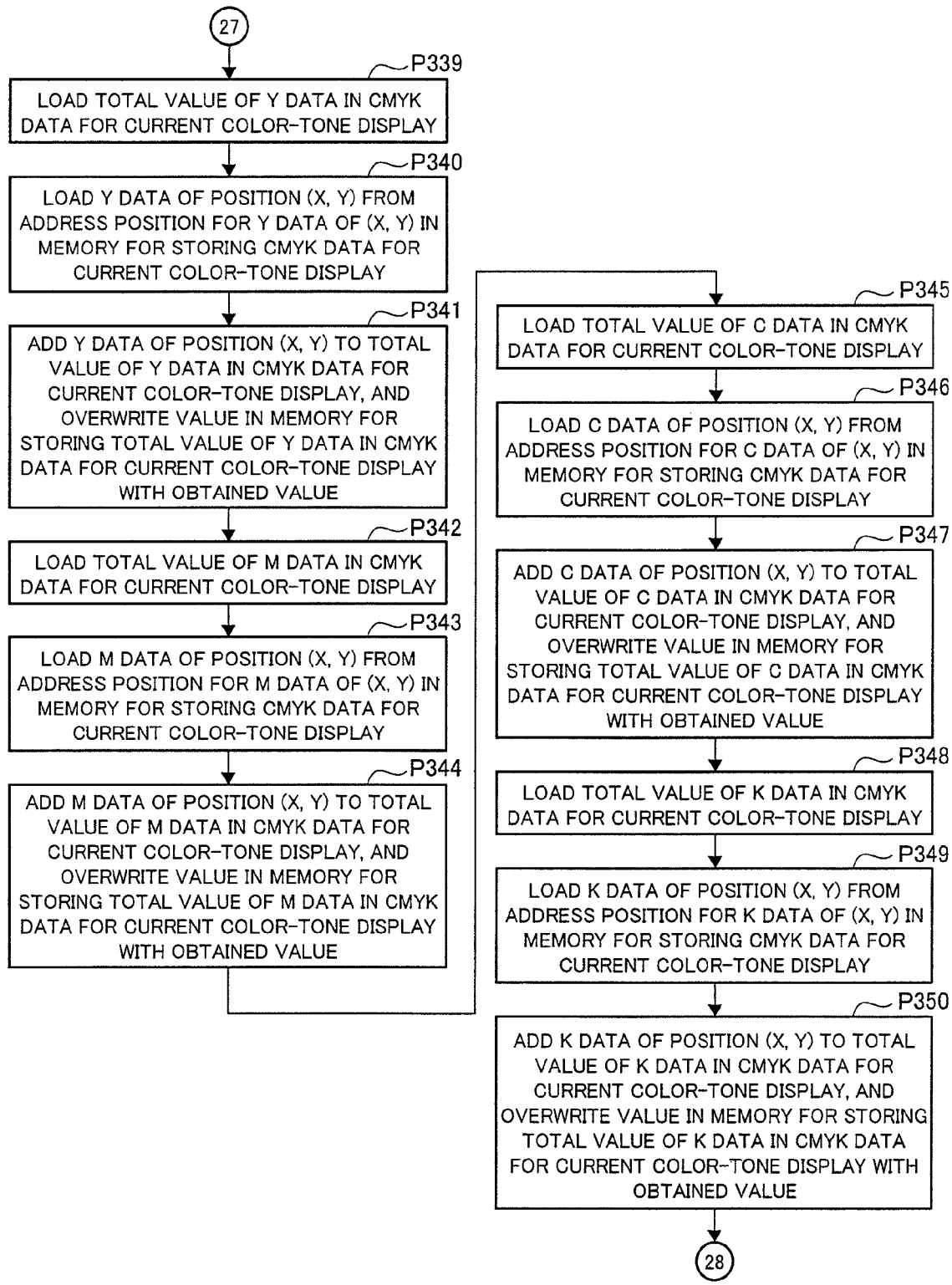
FIG. 14E is a flowchart illustrating an operational flow subsequent to that of FIG. 14D.
Figure 14F:
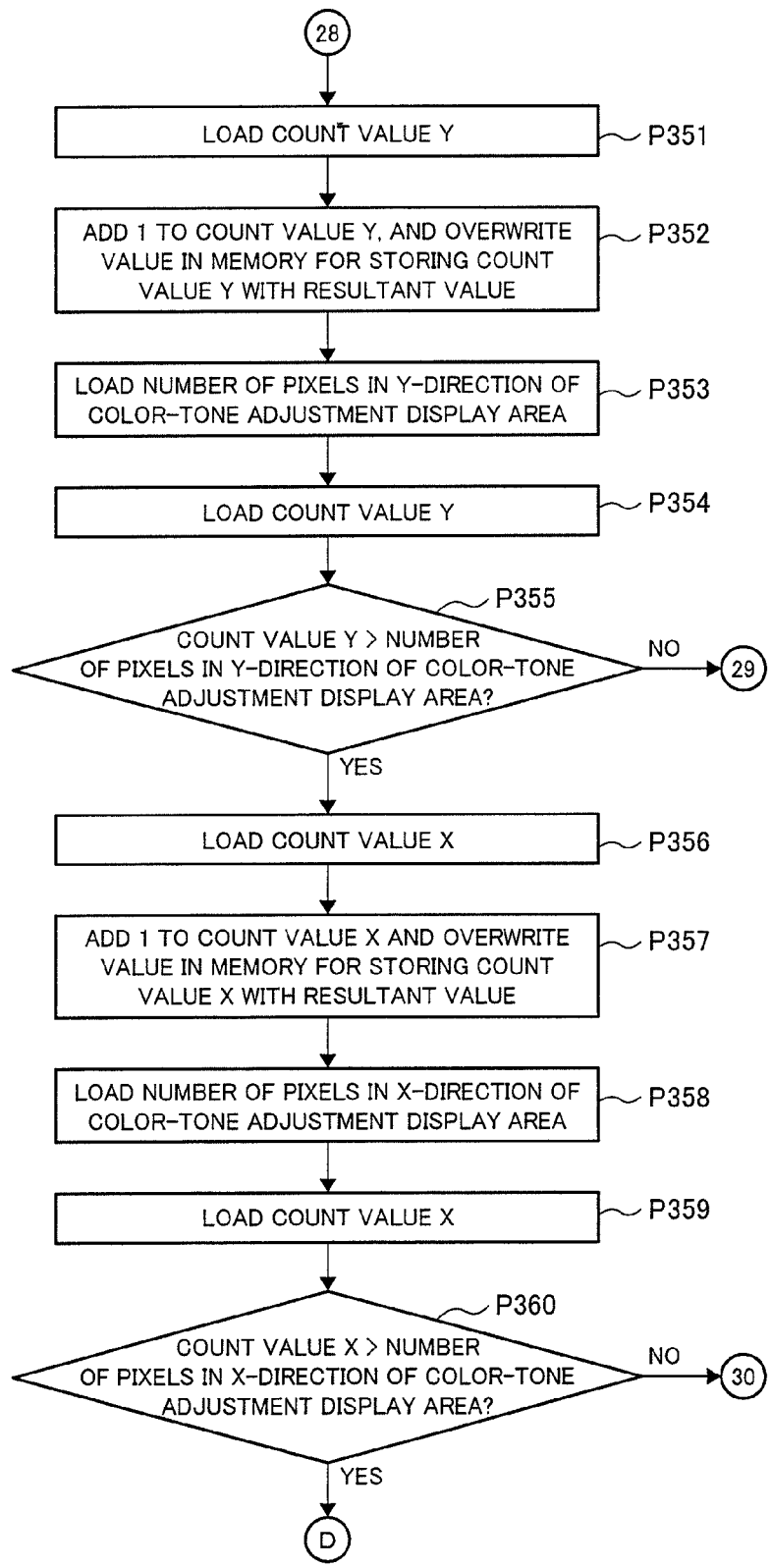
FIG. 14F is a flowchart illustrating an operational flow subsequent to that of FIG. 14E.
Figure 15A:
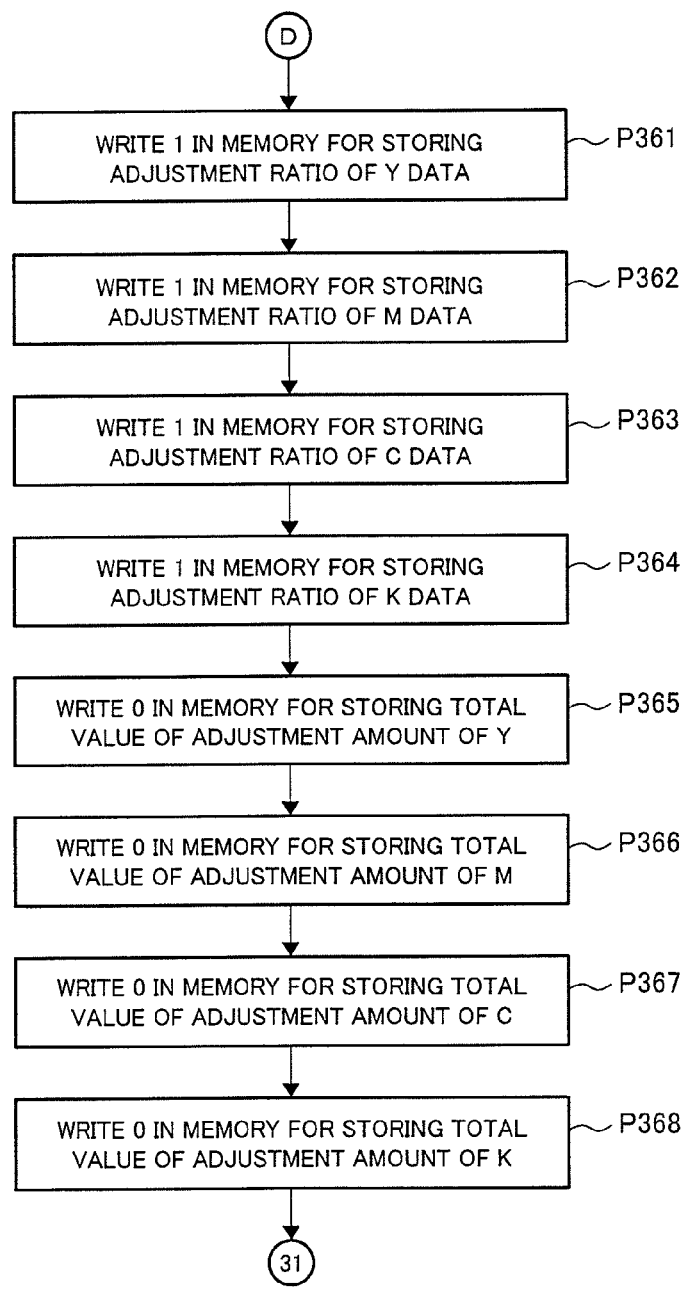
FIG. 15A is a flowchart illustrating an operational flow subsequent to that of FIG. 14F.
Figure 15B:
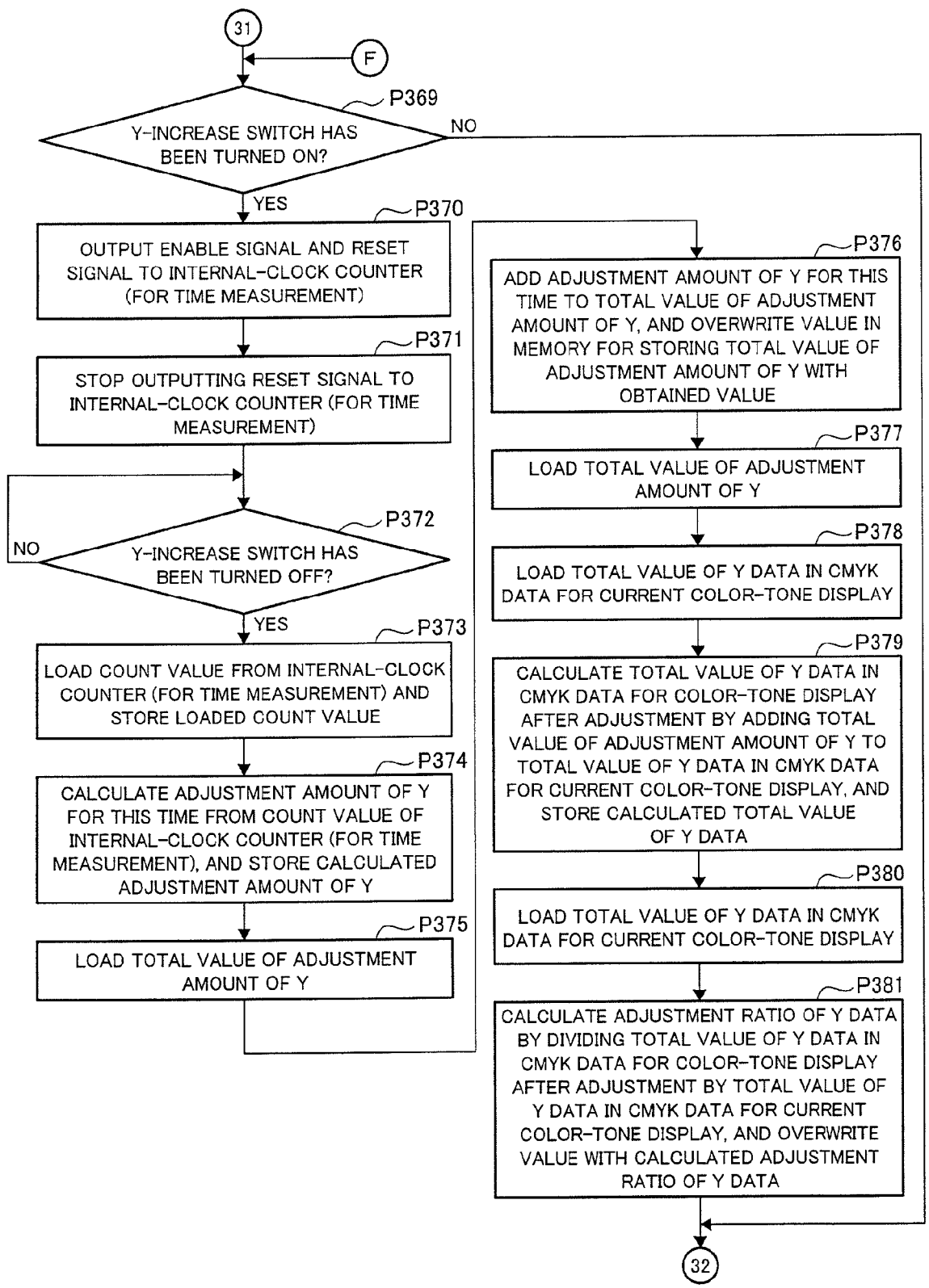
FIG. 15B is a flowchart illustrating an operational flow subsequent to that of FIG. 15A.
Figure 15C:
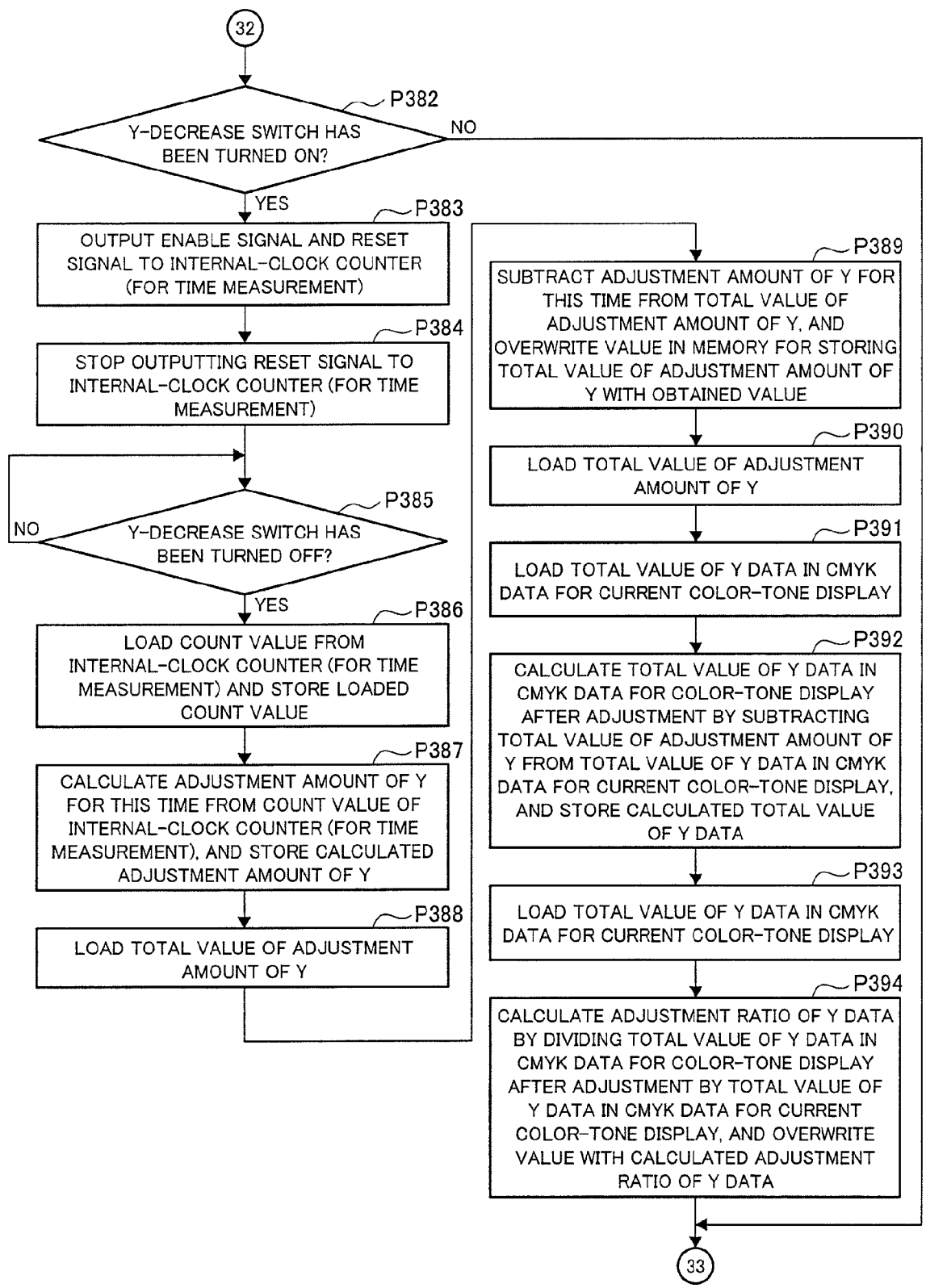
FIG. 15C is a flowchart illustrating an operational flow subsequent to that of FIG. 15B.
Figure 15D:
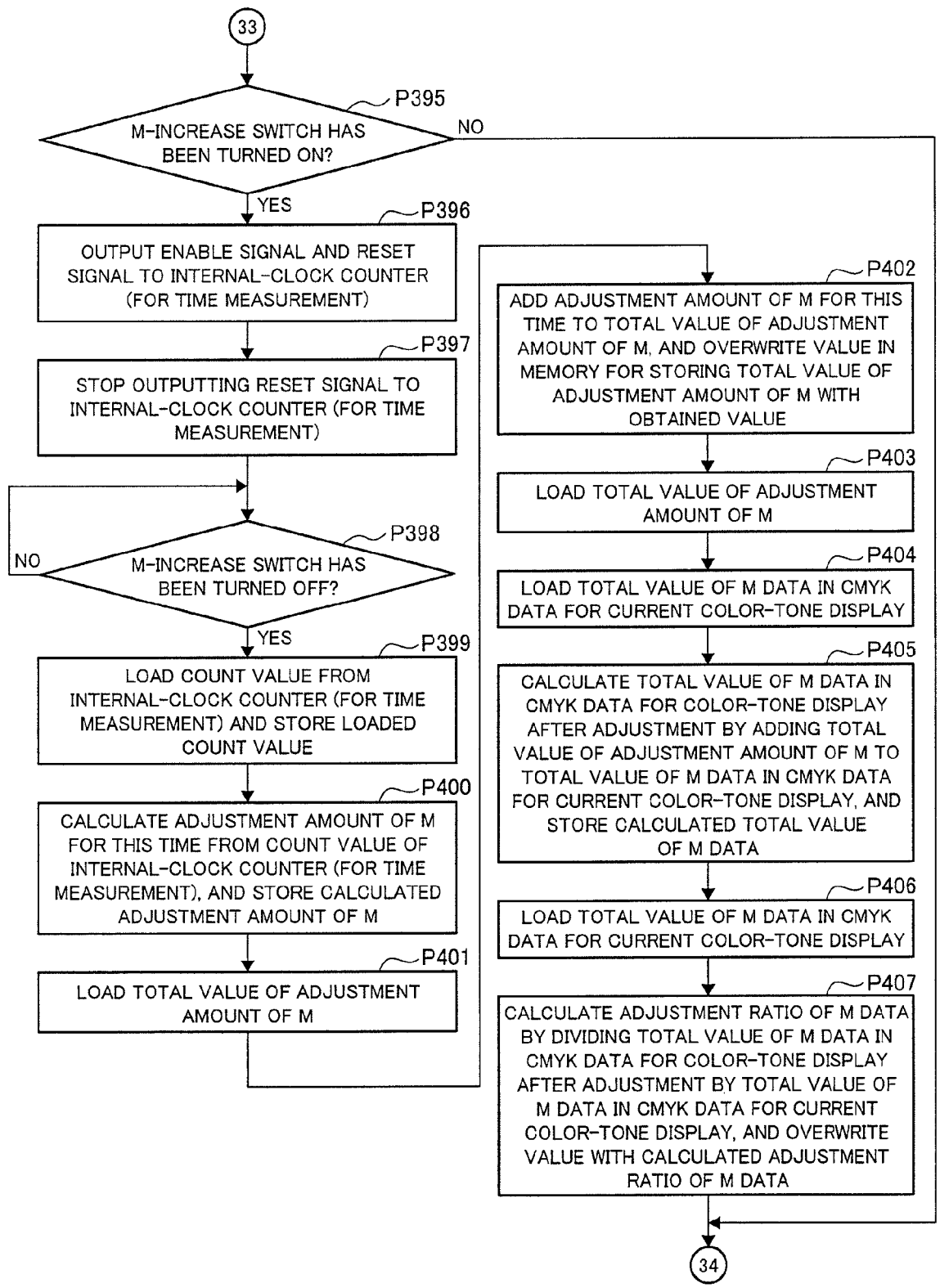
FIG. 15D is a flowchart illustrating an operational flow subsequent to that of FIG. 15C.
Figure 15E:
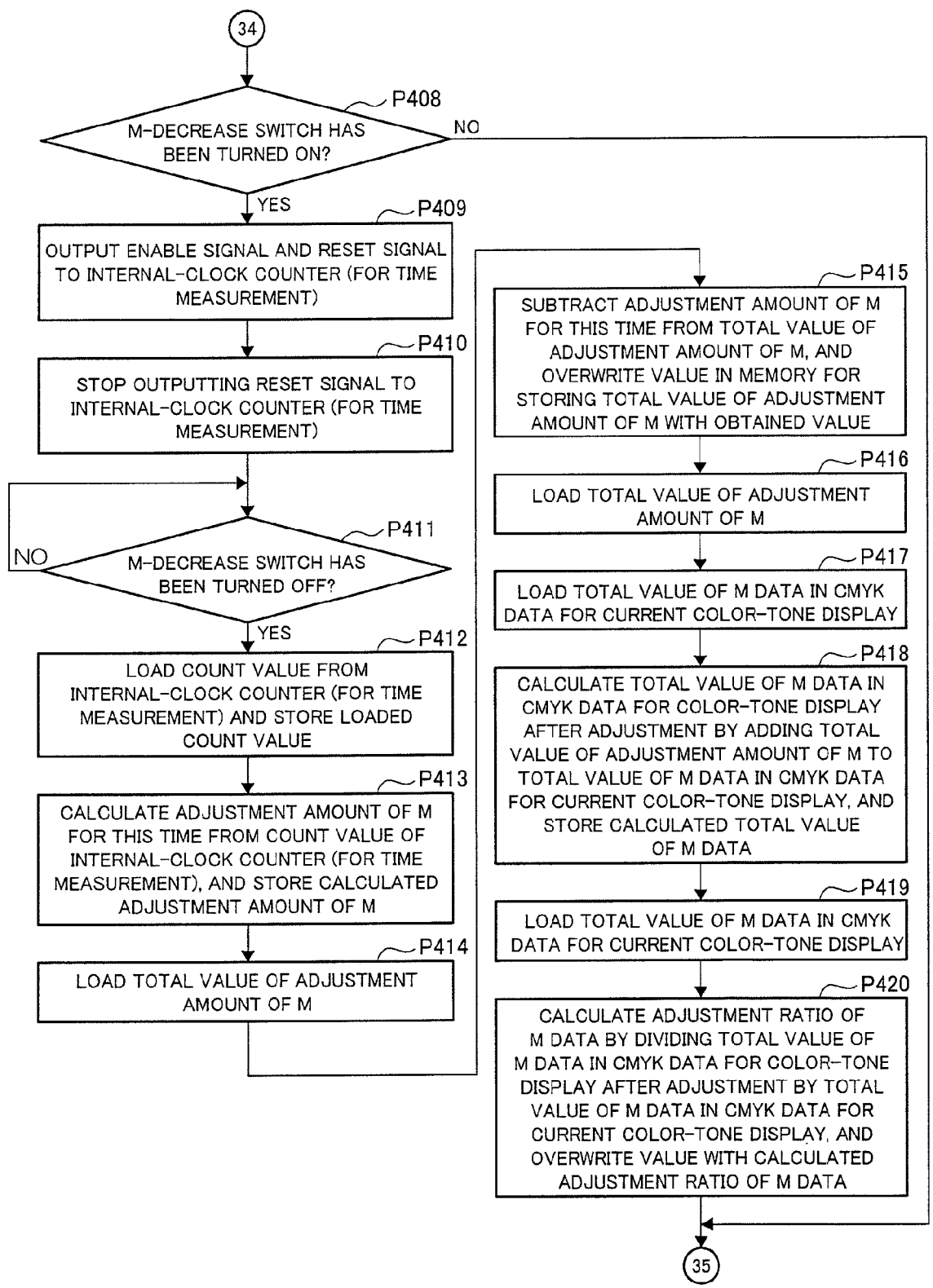
FIG. 15E is a flowchart illustrating an operational flow subsequent to that of FIG. 15D.
Figure 15F:
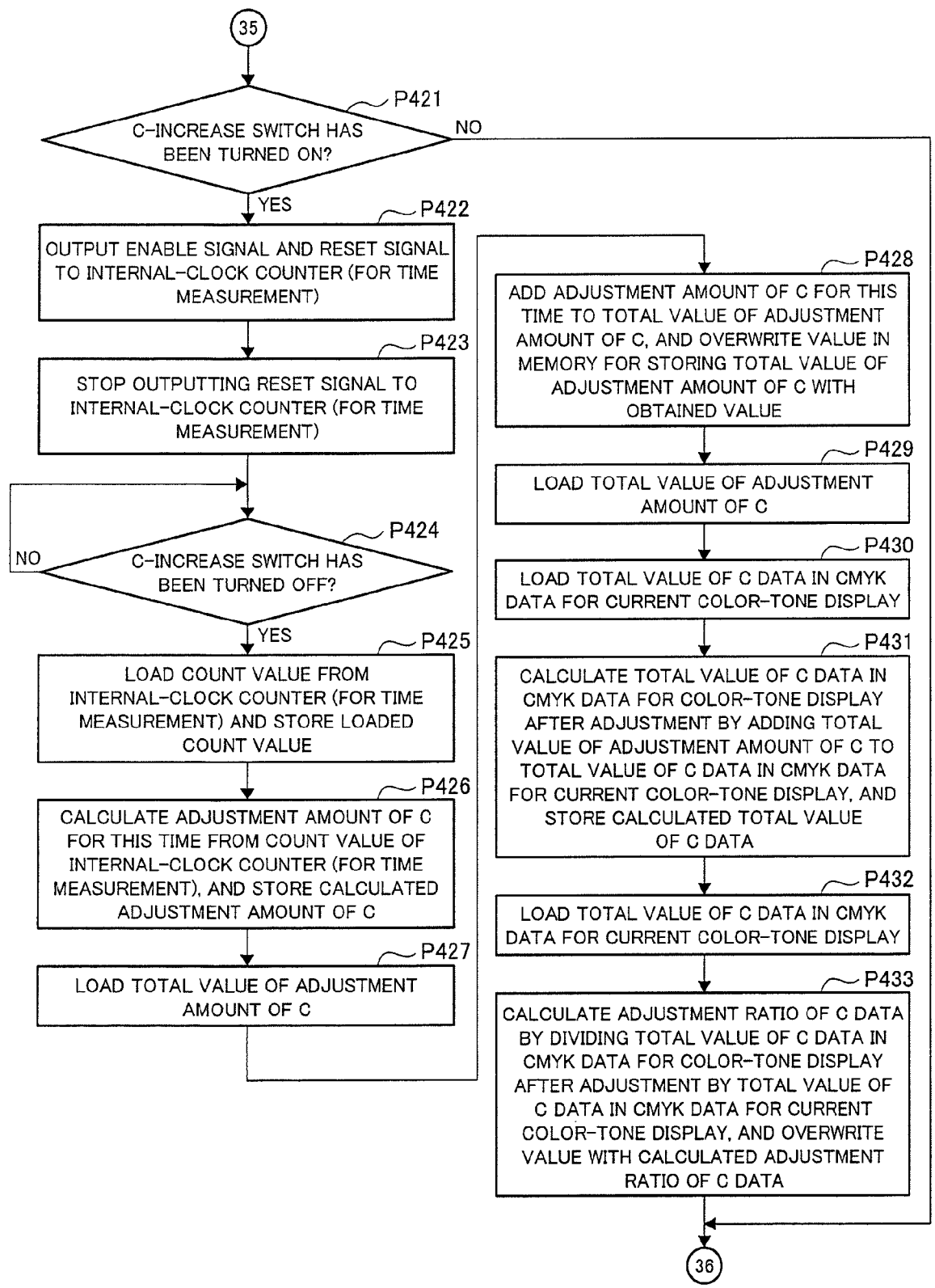
FIG. 15F is a flowchart illustrating an operational flow subsequent to that of FIG. 15E.
Figure 15G:
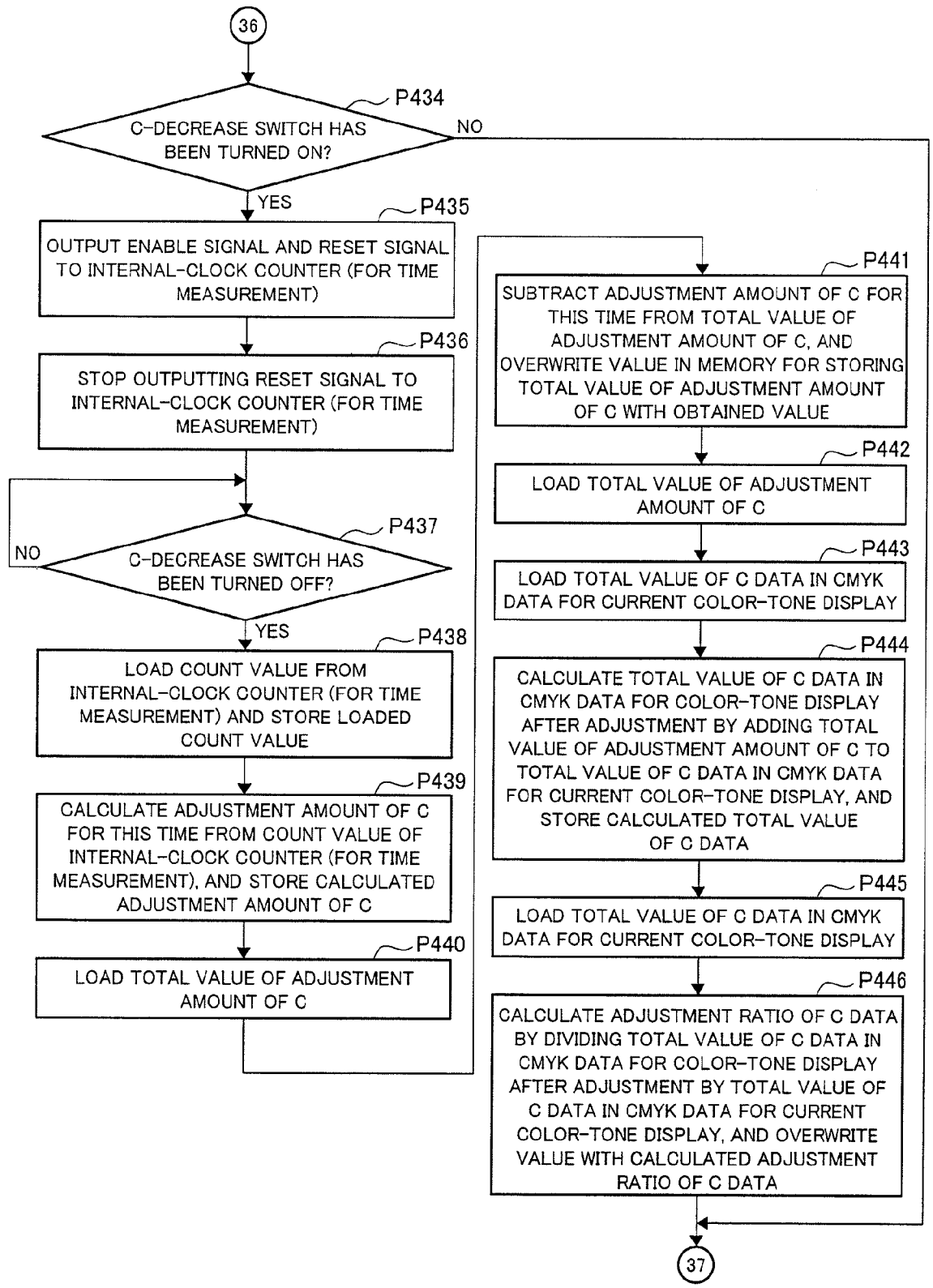
FIG. 15G is a flowchart illustrating an operational flow subsequent to that of FIG. 15F.
Figure 15H:
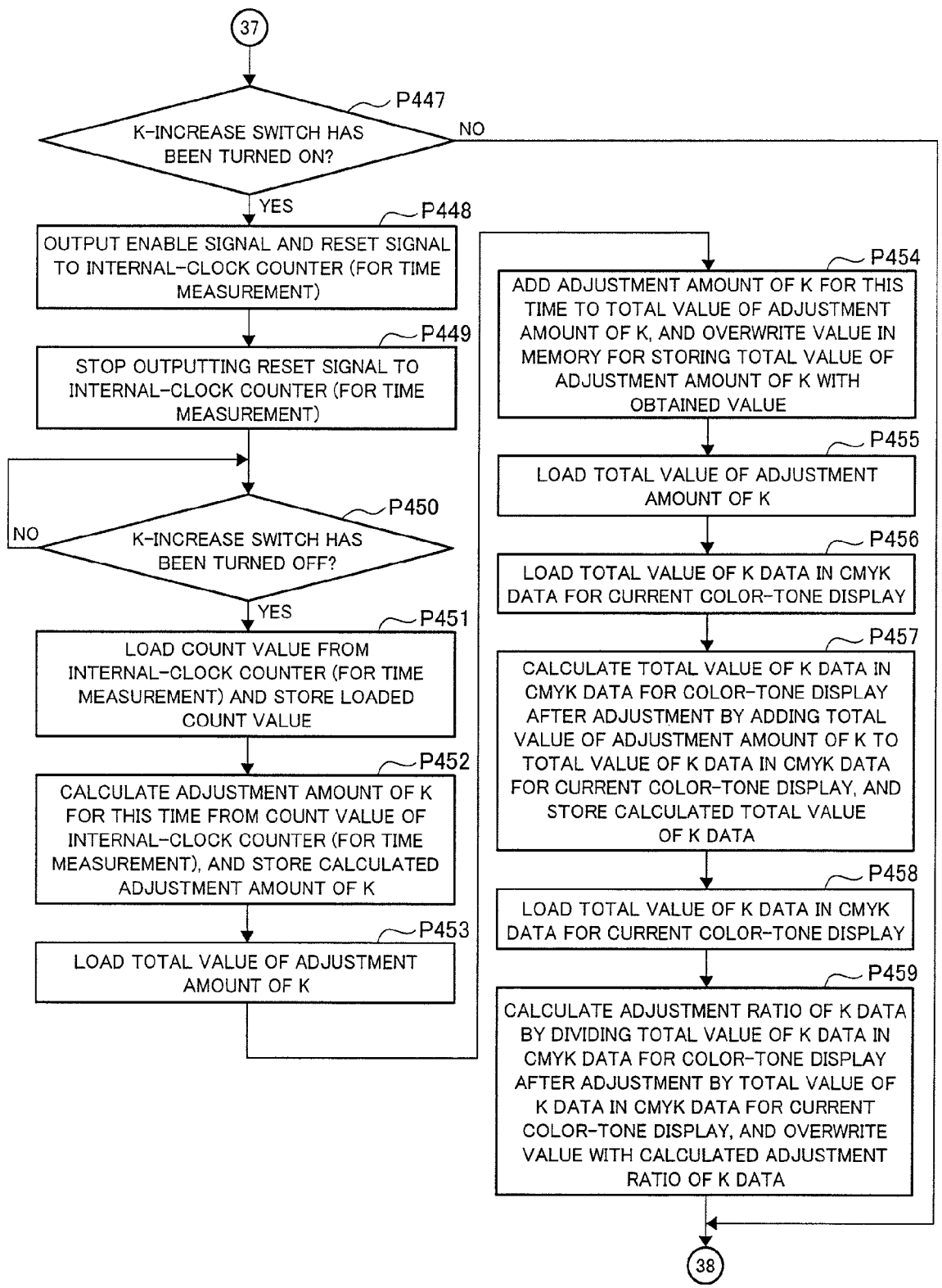
FIG. 15H is a flowchart illustrating an operational flow subsequent to that of FIG. 15G.
Figure 15I:
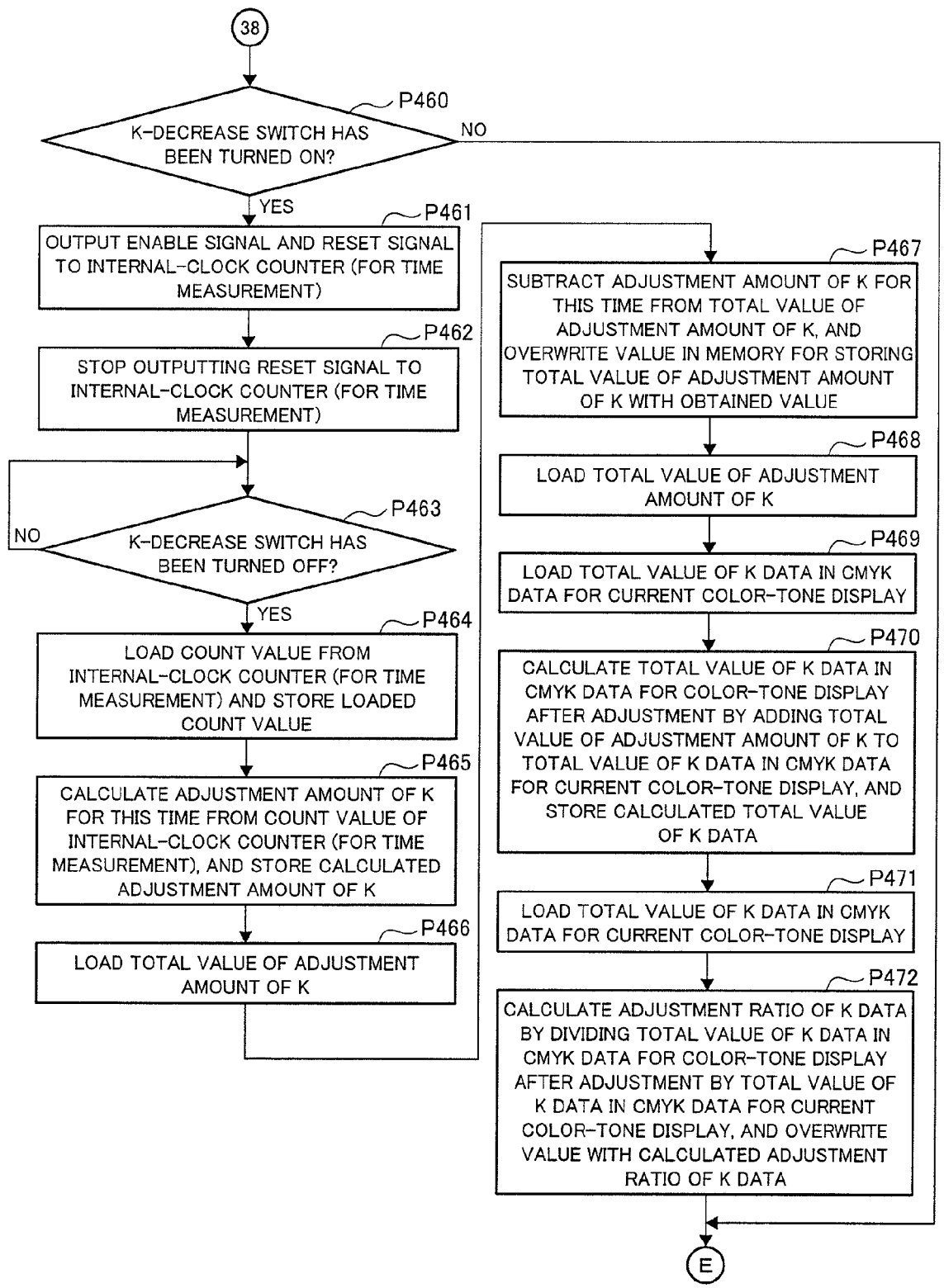
FIG. 15I is a flowchart illustrating an operational flow subsequent to that of FIG. 15H.

As shown in FIGS. 11A to 11C, after the color-tone adjustment apparatus 100 employing the method for adjusting color tones of a printed matter according to the invention starts processing, at step P100, the CPU 101 overwrites the value in the memory M1 for storing count value N with 1. After the process of step P100 is completed, the CPU 101 executes the process of step P101.

At step P101, the CPU 101 overwrites the value in the memory M3 for storing count value Y with 1. After the process of step P101 is completed, the CPU 101 executes the process of step P102.

At step P102, the CPU 101 overwrites the value in the memory M2 for storing count value X with 1. After the process of step P102 is completed, the CPU 101 executes the process of step P103.

At step P103, the CPU 101 loads the count value X from the memory M2 for storing count value X. After the process of step P103 is completed, the CPU 101 executes the process of step P104.

At step P104, the CPU 101 loads the count value Y from the memory M3 for storing count value Y. After the process of step P104 is completed, the CPU 101 executes the process of step P105.

At step P105, the CPU 101 loads the Nth PPF (CMYK) data of the printed matter from the FD drive 120, and writes the loaded data into the address positions (X, Y) in the memory M4 for storing PPF data and in the memory M5 for storing CMYK data for displaying. After the process of step P105 is completed, the CPU 101 executes the process of step P106.

At step P106, the CPU 101 loads the count value N from the memory M1 for storing count value N. After the process of step P106 is completed, the CPU 101 executes the process of step P107.

At step P107, the CPU 101 adds 1 to the count value N, and overwrites the value in the memory M1 for storing count value N with the resultant value. After the process of step P107 is completed, the CPU 101 executes the process of step P108.

At step P108, the CPU 101 loads the count value X from the memory M2 for storing count value X. After the process of step P108 is completed, the CPU 101 executes the process of step P109.

At step P109, the CPU 101 adds 1 to the count value X, and overwrites the value in the memory M2 for storing count value X with the resultant value. After the process of step P109 is completed, the CPU 101 executes the process of step P110.

At step P110, the CPU 101 loads the number of pixels Xmax in the X-direction of a printed matter from the memory M6 for storing the number of pixels Xmax in the X-direction of a printed matter. After the process of step P110 is completed, the CPU 101 executes the process of step P111.

At step P111, the CPU 101 loads the count value X from the memory M2 for storing count value X. After the process of step P111 is completed, the CPU 101 executes the process of step P112.

At step P112, the CPU 101 determines whether the count value X is larger than the number of pixels Xmas in the X-direction of a printed matter. If the count value X is larger than the number of pixels Xmax in the X-direction of a printed matter, the CPU 101 executes the process of step P113. If the count value X is not larger than the number of pixels Xmax in the X-direction of a printed matter, the CPU 101 executes the process of step P103.

At step P113, the CPU 101 loads the count value Y from the memory M3 for storing count value Y. After the process of step P103 is completed, the CPU 101 executes the process of step P114.

At step P114, the CPU 101 adds 1 to the count value Y, and overwrites the value in the memory M3 for storing count value Y with the resultant value. After the process of step P114 is completed, the CPU 101 executes the process of step P115.

At step P115, the CPU 101 loads the number of pixels in the Y-direction of printed matter Ymax from the memory M7 for storing the number of pixels Ymax in the Y-direction of a printed matter. After the process of step P115 is completed, the CPU 101 executes the process of step P116.

At step P116, the CPU 101 loads the count value Y from the memory M3 for storing count value Y. After the process of step P116 is completed, the CPU 101 executes the process of step P117.

At step P117, the CPU 101 determines whether the count value Y is larger than the number of pixels Ymax in the Y-direction of a print matter. If the count value Y is larger than the number of pixels Ymax in the Y-direction of a print matter, the CPU 101 executes the process of step P118. If the count value Y is not larger than the number of pixels Ymax in the Y-direction of a print matter, the CPU 101 executes the process of step P103.

At step P118, the CPU 101 overwrites the value in the memory M3 for storing count value Y with 1. After the process of step P118 is completed, the CPU 101 executes the process of step P119.

At step P119, the CPU 101 overwrites the value in the memory M2 for storing count value X with 1. After the process of step P119 is completed, the CPU 101 executes the process of step P120.

At step P120, the CPU 101 loads the count value X from the memory M2 for storing count value X. After the process of step P120 is completed, the CPU 101 executes the process of step P121.

At step P121, the CPU 101 loads the count value Y from the memory M3 for storing count value Y. After the process of step P121 is completed, the CPU 101 executes the process of step P122.

At step P122, the CPU 101 loads the CMYK data of the position (X, Y) from the address position (X, Y) in the memory M5 for storing CMYK data for displaying. After the process of step P122 is completed, the CPU 101 executes the process of step P123.

At step P123, the CPU 101 obtains RGB data of the position (X, Y) from the CMYK data of the position (X, Y). The CPU 101 then writes the obtained RGB data into the address position (X, Y) in the memory M8 for storing data for displaying a printed matter. After the process of step P123 is completed, the CPU 101 executes the process of step P124.

At step P124, the CPU 101 displays the RGB data of the position (X, Y) at the position (X, Y) in the color-tone adjustment area designation portion 2 of the color-tone adjustment area designation screen 1 of the display apparatus 119. After the process of step P124 is completed, the CPU 101 executes the process of step P125.

At step P125, the CPU 101 loads the count value X from the memory M2 for storing count value X. After the process of step P125 is completed, the CPU 101 executes the process of step P126.

At step P126, the CPU 101 adds 1 to the count value X, and overwrites the value in the memory M2 for storing count value X with the resultant value. After the process of step P126 is completed, the CPU 101 executes the process of step P127.

At step P127, the CPU 101 loads the number of pixels Xmax in the X-direction of a printed matter from the memory M6 for storing the number of pixels Xmax in the X-direction of a printed matter. After the process of step P127 is completed, the CPU 101 executes the process of step P128.

At step P128, the CPU 101 loads the count value X from the memory M2 for storing count value X. After the process of step P128 is completed, the CPU 101 executes the process of step P129.

At step P129, the CPU 101 determines whether the count value X is larger than the number of pixels Xmax in the X-direction of a printed matter. If the count value X is larger than the number of pixels Xmax in the X-direction of a printed matter, the CPU 101 executes the process of step P130. If the count value X is not larger than the number of pixels Xmax in the X-direction of a printed matter, the CPU 101 executes the process of step P120.

At step P130, the CPU 101 loads the count value Y from the memory M3 for storing count value Y. After the process of step P130 is completed, the CPU 101 executes the process of step P131.

At step P131, the CPU 101 adds 1 to the count value Y, and overwrites the value in the memory M3 for storing count value Y with the resultant value. After the process of step P131 is completed, the CPU 101 executes the process of step P132.

At step P132, the CPU 101 loads the number of pixels Ymax in the Y-direction of a printed matter from the memory M7 for storing the number of pixels Ymax in the Y-direction of a printed matter. After the process of step P132 is completed, the CPU 101 executes the process of step P133.

At step P133, the CPU 101 loads the count value Y from the memory M3 for storing count value Y. After the process of step P133 is completed, the CPU 101 executes the process of step P134.

At step P134, the CPU 101 determines whether the count value Y is larger than the number of pixels Ymax in the Y-direction of a printed matter. If the count value Y is larger than the number of pixels Ymax in the Y-direction of a printed matter, the CPU 101 executes the process of step P135. If the count value Y is not larger than the number of pixels Ymax in the Y-direction of a printed matter, the CPU 101 executes the process of step P119.

Through the above-described operational flow, the PPF data is loaded from the FD drive 120, and an image of a printed matter is displayed on the display apparatus 119 on the basis of the loaded PPF data. The X-direction mentioned above is a direction whose reference position is at the left-hand side end of the image in the printed matter, and the value of X becomes larger as the X moves rightwards. Concerning the value Y direction, the upper end of the image is a reference position, and the value of Y becomes larger as the value Y moves downwards.

As shown in FIGS. 12A to 12F, at step P135, the CPU 101 determines whether the operator has turned the mouse pointer on. If the operator has turned the mouse pointer on, the CPU 101 executes the process of step P136. If the operator has not turned the mouse pointer on, the CPU 101 executes the process of step P135 again.

At step P136, the CPU 101 obtains the cursor position (Xs, Ys) on the display apparatus 119. The CPU 101 stores the obtained cursor position (Xs, Ys) in the memory M9 for storing pointer position (Xs, Ys). After the process of step P136 is completed, the CPU 101 executes the process of step P137.

At step P137, the CPU 101 determines whether the mouse 105 has sent the travelling distance in the X-direction and in the Y-direction (Xd, Yd). If the mouse 105 has sent the travelling distance (Xd, Yd) in the X-direction and in the Y-direction, the CPU 101 executes the process of step P138. If the mouse 105 has not sent the travelling distance (Xd, Yd) in the X-direction and in the Y-direction, the CPU 101 executes the process of step P137 again.

At step P138, the CPU 101 receives the distance (Xd, Yd) by which the mouse 105 has been dragged from the mouse 105, and then stores the mouse-dragged distance (Xd, Yd) in the memory M10 for storing mouse-dragged distance (Xd, Yd). After the process of step P138 is completed, the CPU 101 executes the process of step P139.

At step P139, the CPU 101 loads the pointer position Xs in the X-direction from the memory M9 for storing pointer position (Xs, Ys). After the process of step P139 is completed, the CPU 101 executes the process of step P140.

At step P140, the CPU 101 loads the distance Xd in the X-direction by which the mouse 105 has been dragged from the memory M10 for storing mouse-dragged distance (Xd, Yd). After the process of step P140 is completed, the CPU 101 executes the process of step P141.

At step P141, the CPU 101 calculates the selected-area terminal position Xe in the X-direction by adding the distance Xd in the X-direction by which the mouse 105 has been dragged to the pointer position Xs in the X-direction. The CPU 101 then stores the selected-area terminal position Xe in the X-direction in the memory M11 for storing selected-area terminal position (Xe, Ye). After the process of step P141 is completed, the CPU 101 executes the process of step P142.

At step P142, the CPU 101 loads the pointer position Ys in the Y-direction from the memory M9 for storing pointer position (Xs, Ys). After the process of step P142 is completed, the CPU 101 executes the process of step P143.

At step P143, the CPU 101 loads the distance Yd in the Y-direction by which the mouse 105 has been dragged from the memory M10 for storing mouse-dragged distance (Xd, Yd). After the process of step P143 is completed, the CPU 101 executes the process of step P144.

At step P144, the CPU 101 calculates the selected-area terminal position Ye in the Y-direction by adding the distance Yd in the Y-direction by which the mouse 105 has been dragged to the pointer position Ys in the Y-direction. The CPU 101 then stores the selected-area terminal position Ye in the Y-direction in the memory M11 for storing selected-area terminal position (Xe, Ye). After the process of step P144 is completed, the CPU 101 executes the process of step P145.

At step P145, the CPU 101 loads the pointer position Xs in the X-direction from the memory M9 for storing pointer position (Xs, Ys). After the process of step P145 is completed, the CPU 101 executes the process of step P146.

At step P146, the CPU 101 overwrites the value in the memory M2 for storing count value X with the pointer position Xs in the X-direction. After the process of step P146 is completed, the CPU 101 executes the process of step P147.

At step P147, the CPU 101 loads the pointer position Ys in the Y-direction from the memory M9 for storing pointer position (Xs, Ys). After the process of step P147 is completed, the CPU 101 executes the process of step P148.

At step P148, the CPU 101 overwrites the value in the memory M3 for storing count value Y with the pointer position Ys in the Y-direction. After the process of step P148 is completed, the CPU 101 executes the process of step P149.

At step P149, the CPU 101 loads the count value Y from the memory M3 for storing count value Y. After the process of step P149 is completed, the CPU 101 executes the process of step P150.

At step P150, the CPU 101 loads the count value X from the memory M2 for storing count value X. After the process of step P150 is completed, the CPU 101 executes the process of step P151.

At step P151, the CPU 101 displays an image of the selected area at the position (X, Y) in the color-tone adjustment area designation portion 2 of the color-tone adjustment area designation screen 1 of the display apparatus 119. After the process of step P151 is completed, the CPU 101 executes the process of step P152.

At step P152, the CPU 101 loads the count value X from the memory M2 for storing count value X. After the process of step P152 is completed, the CPU 101 executes the process of step P153.

At step P153, the CPU 101 adds 1 to the count value X, and overwrites the value in the memory M2 for storing count value X with the resultant value. After the process of step P153 is completed, the CPU 101 executes the process of step P154.

At step P154, the CPU 101 loads the selected area terminal position Xe in the X-direction from the memory M11 for storing selected-area terminal position (Xe, Ye). After the process of step P154 is completed, the CPU 101 executes the process of step P155.

At step P155, the CPU 101 loads the count value X from the memory M2 for storing count value X. After the process of step P155 is completed, the CPU 101 executes the process of step P156.

At step P156, the CPU 101 determines whether the count value X is larger than the selected area terminal position Xe in the X-direction. If the count value X is larger than the selected area terminal position Xe in the X-direction, the CPU 101 executes the process of step P157. If the count value X is not larger than the selected area terminal position Xe in the X-direction, the CPU 101 executes the process of step P149.

At step P157, the CPU 101 loads the pointer position Xs in the X-direction from the memory M9 for storing pointer position (Xs, Ys). After the process of step P157 is completed, the CPU 101 executes the process of step P158.

At step P158, the CPU 101 overwrites the value in the memory M2 for storing count value X with the Xs. After the process of step P158 is completed, the CPU 101 executes the process of step P159.

At step P159, the CPU 101 loads the pointer position Ys in the Y-direction from the memory M9 for storing pointer position (Xs, Ys) After the process of step P159 is completed, the CPU 101 executes the process of step P160.

At step P160, the CPU 101 overwrites the value in the memory M3 for storing count value Y with the Ys. After the process of step P160 is completed, the CPU 101 executes the process of step P161.

At step P161, the CPU 101 loads the count value Y from the memory M3 for storing count value Y. After the process of step P161 is completed, the CPU 101 executes the process of step P162.

At step P162, the CPU 101 loads the count value X from the memory M2 for storing count value X. After the process of step P162 is completed, the CPU 101 executes the process of step P163.

At step P163, the CPU 101 displays an image of the selected area at the position (X, Y) in the color-tone adjustment area designation portion 2 of the color-tone adjustment area designation screen 1 of the display apparatus 119. After the process of step P163 is completed, the CPU 101 executes the process of step P164.

At step P164, the CPU 101 loads the count value Y from the memory M3 for storing count value Y. After the process of step P164 is completed, the CPU 101 executes the process of step P165.

At step P165, the CPU 101 adds 1 to the count value Y, and overwrites the value in the memory M3 for storing count value Y with the resultant value. After the process of step P165 is completed, the CPU 101 executes the process of step P166.

At step P166, the CPU 101 loads the selected area terminal position Ye in the Y-direction from the memory M11 for storing selected-area terminal position (Xe, Ye). After the process of step P166 is completed, the CPU 101 executes the process of step P167.

At step P167, the CPU 101 leads the count value Y from the memory M3 for storing count value Y. After the process of step P167 is completed, the CPU 101 executes the process of step P168.

At step P168, the CPU 101 determines whether the count value Y is larger than the selected area terminal position Ye in the Y-direction. If the count value Y is larger than the selected area terminal position Ye in the Y-direction, the CPU 101 executes the process of step P169. If the count value Y is not larger than the selected area terminal position Ye in the Y-direction, the CPU 101 executes the process of step P161.

At step P169, the CPU 101 loads the pointer position Xs in the X-direction from the memory M9 for storing pointer position (Xs, Ys). After the process of step P169 is completed, the CPU 101 executes the process of step P170.

At step P170, the CPU 101 overwrites the value in the memory M2 for storing count value X with the pointer position Xs in the X-direction. After the process of step P170 is completed, the CPU 101 executes the process of step P171.

At step P171, the CPU 101 loads the selected area terminal position Ye in the Y-direction from the memory M11 for storing selected-area terminal position (Xe, Ye). After the process of step P171 is completed, the CPU 101 executes the process of step P172.

At step P172, the CPU 101 overwrites the value in the memory M3 for storing count value Y with the selected area terminal position Ye in the Y-direction. After the process of step P172 is completed, the CPU 101 executes the process of step P173.

At step P173, the CPU 101 loads the count value Y from the memory M3 for storing count value Y. After the process of step P173 is completed, the CPU 101 executes the process of step P174.

At step P174, the CPU 101 loads the count value X from the memory M2 for storing count value X. After the process of step P174 is completed, the CPU 101 executes the process of step P175.

At step P175, the CPU 101 displays an image of the selected area at the position (X, Y) in the color-tone adjustment area designation portion 2 of the color-tone adjustment area designation screen 1 of the display apparatus 119. After the process of step P175 is completed, the CPU 101 executes the process of step P176.

At step P176, the CPU 101 loads the count value X from the memory M2 for storing count value X. After the process of step P176 is completed, the CPU 101 executes the process of step P177.

At step P177, the CPU 101 adds 1 to the count value X, and overwrites the value in the memory M2 for storing count value X with the resultant value. After the process of step P177 is completed, the CPU 101 executes the process of step P178.

At step P178, the CPU 101 loads the selected area terminal position Xe in the X-direction from the memory M11 for storing selected-area terminal position (Xe, Ye). After the process of step P178 is completed, the CPU 101 executes the process of step P179.

At step P179, the CPU 101 loads the count value X from the memory M2 for storing count value X. After the process of step P179 is completed, the CPU 101 executes the process of step P180.

At step P180, the CPU 101 determines whether the count value X is larger than the selected area terminal position Xe in the X-direction. If the count value X is larger than the selected area terminal position Xe in the X-direction, the CPU 101 executes the process of step P181. If the count value X is not larger than the selected area terminal position Xe in the X-direction, the CPU 101 executes the process of step P173.

At step P181, the CPU 101 loads the selected area terminal position Xe in the X-direction from the memory M11 for storing selected-area terminal position (Xe, Ye). After the process of step P181 is completed, the CPU 101 executes the process of step P182.

At step P182, the CPU 101 overwrites the value in the memory M2 for storing count value X with the selected area terminal position Xe in the X-direction. After the process of step P182 is completed, the CPU 101 executes the process of step P183.

At step P183, the CPU 101 loads the pointer position Ys in the Y-direction from the memory M9 for storing pointer position (Xs, Ys). After the process of step P183 is completed, the CPU 101 executes the process of step P184.

At step P184, the CPU 101 overwrites the value in the memory M3 for storing count value Y with the pointer position Ys in the Y-direction. After the process of step P184 is completed, the CPU 101 executes the process of step P185.

At step P185, the CPU 101 loads the count value Y from the memory M3 for storing count value Y. After the process of step P185 is completed, the CPU 101 executes the process of step P186.

At step P186, the CPU 101 loads the count value X from the memory M2 for storing count value X. After the process of step P186 is completed, the CPU 101 executes the process of step P187.

At step P187, the CPU 101 displays an image of the selected area at the position (X, Y) in the color-tone adjustment area designation portion 2 of the color-tone adjustment area designation screen 1 of the display apparatus 119. After the process of step P187 is completed, the CPU 101 executes the process of step P188.

At step P188, the CPU 101 loads the count value Y from the memory M3 for storing count value Y. After the process of step P188 is completed, the CPU 101 executes the process of step P189.

At step P189, the CPU 101 adds 1 to the count value Y, and overwrites the value in the memory M3 for storing count value Y with the resultant value. After the process of step P189 is completed, the CPU 101 executes the process of step P190.

At step P190, the CPU 101 loads the selected area terminal position Ye in the Y-direction from the memory M11 for storing selected-area terminal position (Xe, Ye). After the process of step P190 is completed, the CPU 101 executes the process of step P191.

At step P191, the CPU 101 loads the count value Y from the memory M3 for storing count value Y. After the process of step P191 is completed, the CPU 101 executes the process of step P192.

At step P192, the CPU 101 determines whether the count value Y is larger than the selected area terminal position Ye in the Y-direction. If the count value Y is larger than the selected area terminal position Ye in the Y-direction, the CPU 101 executes the process of step P193. If the count value Y is not larger than the selected area terminal position Ye in the Y-direction, the CPU 101 executes the process of step P185.

At step P193, the CPU 101 determines whether the operator has turned the selected area confirmation switch 107 on. If the selected area confirmation switch 107 has been turned on, the CPU 101 executes the process of step P194. If the selected area confirmation switch 107 has not been turned on, the CPU 101 executes the process of step P135.

Through the above-described operational flow, the area selected by use of the mouse 105 is indicated in the color-tone adjustment area designation portion 2 by the cursor 10 as shown in FIG. 1, and the section of a color-tone adjustment area is made. The selected area confirmation switch 107 corresponds to the set switch 12 shown in FIG. 1.

At step P194, the CPU 101 loads the pointer position (Xs, Ys) from the memory M9 for storing pointer position (Xs, Ys). After the process of step P194 is completed, the CPU 101 executes the process of step P195.

At step P195, the CPU 101 writes the pointer position (Xs, Ys) into the memory M12 for storing color-tone adjustment display start position (Xs, Ys). After the process of step P195 is completed, the CPU 101 executes the process of step P196.

At step P196, the CPU 101 loads the selected area terminal position (Xe, Ye) from the memory M11 for storing selected-area terminal position (Xe, Ye). After the process of step P196 is completed, the CPU 101 executes the process of step P197.

At step P197, the CPU 101 writes the selected area terminal position (Xe, Ye) into the memory M13 for storing color-tone adjustment display end position (Xe, Ye). After the process of step P197 is completed, the CPU 101 executes the process of step P198.

At step P198, the CPU 101 loads the color-tone adjustment display start position Ys in the Y-direction from the memory M12 for storing color-tone adjustment display start position (Xs, Ys). After the process of step P198 is completed, the CPU 101 executes the process of step P199.

At step P199, the CPU 101 loads the color-tone adjustment display end position Ye in the Y-direction from the memory M13 for storing color-tone adjustment display end position (Xe, Ye). After the process of step P199 is completed, the CPU 101 executes the process of step P200.

At step P200, the CPU 101 obtains the number of pixels of the color-tone adjustment display area in the Y-direction by subtracting the color-tone adjustment display start position Ys in the Y-direction from the color-tone adjustment display end position Ye in the Y-direction. The CPU 101 then stores the obtained number of pixels in the memory M14 for storing the number of pixels in the Y-direction of color-tone adjustment display area. After the process of step P201 is completed, the CPU 101 executes the process of step P201.

At step P201, the CPU 101 loads the color-tone adjustment display start position Xs in the X-direction from the memory M12 for storing color-tone adjustment display start position (Xs, Ys). After the process of step P201 is completed, the CPU 101 executes the process of step P202.

At step P202, the CPU 101 loads the color-tone adjustment display end position Xe in the X-direction from the memory M13 for storing color-tone adjustment display end position (Xe, Ye). After the process of step P202 is completed, the CPU 101 executes the process of step P203.

At step P203, the CPU 101 obtains the number of pixels of the color-tone adjustment display area in the X-direction by subtracting the color-tone adjustment display start position Xs in the X-direction from the color-tone adjustment display end position Xe in the X-direction. The CPU 101 then stores the obtained number of pixels in the memory M15 for storing the number of pixels in the X-direction of color-tone adjustment display area. After the process of step P203 is completed, the CPU 101 executes the process of step P204.

As shown in FIGS. 13A to 13G, at step P204, the CPU loads the color-tone adjustment display start position Xs in the X-direction from the memory M12 for storing color-tone adjustment display start position (Xs, Ys). After the process of step P204 is completed, the CPU 101 executes the process of step P205.

At step P205, the CPU 101 overwrites the value in the memory M2 for storing count value X with the color-tone adjustment display start position Xs in the X-direction. After the process of step P205 is completed, the CPU 101 executes the process of step P206.

At step P206, the CPU 101 loads the color-tone adjustment display start position Ys in the Y-direction from the memory M12 for storing color-tone adjustment display start position (Xs, Ys). After the process of step P206 is completed, the CPU 101 executes the process of step P207.

At step P207, the CPU 101 overwrites the value in the memory M3 for storing count value Y with the color-tone adjustment display start position Ys in the Y-direction. After the process of step P207 is completed, the CPU 101 executes the process of step P208.

At step P208, the CPU 101 overwrites the value in the memory M16 for storing count value L with 1. After the process of step P208 is completed, the CPU 101 executes the process of step P209.

At step P209, the CPU 101 overwrites the value in the memory M1 for storing count value N with 1. After the process of step P209 is completed, the CPU 101 executes the process of step P210.

At step P210, the CPU 101 loads the count value Y from the memory M3 for storing count value Y. After the process of step P210 is completed, the CPU 101 executes the process of step P211.

At step P211, the CPU 101 loads the count value X from the memory M2 for storing count value X. After the process of step P211 is completed, the CPU 101 executes the process of step P211a.

At step P211a, the CPU 101 loads the count value N from the memory M1 for storing count value N. After the process of step P211a is completed, the CPU 101 executes the process of step P211b.

At step P211b, the CPU 101 loads the count value L from the memory M16 for storing count value L. After the process of step P211b is completed, the CPU 101 executes the process of step P212.

At step P212, the CPU 101 loads the CMYK data of the position (X, Y) from the address position (X, Y) in the memory M5 for storing CMYK data for displaying, and writes the loaded data into the address position (L, N) in the memory M17 for storing CMYK data for current color-tone display.

After the process of step P212 is completed, the CPU 101 executes the process of step P213.

At step P213, the CPU 101 loads the count value N from the memory M1 for storing count value N. After the process of step P213 is completed, the CPU 101 executes the process of step P214.

At step P214, the CPU 101 adds 1 to the count value N, and overwrites the value in the memory M1 for storing count value N with the resultant value. After the process of step P214 is completed, the CPU 101 executes the process of step P215.

At step P215, the CPU 101 loads the count value Y from the memory M3 for storing count value Y. After the process of step P215 is completed, the CPU 101 executes the process of step P216.

At step P216, the CPU 101 adds 1 to the count value Y, and overwrites the value in the memory M3 for storing count value Y with the resultant value. After the process of step P216 is completed, the CPU 101 executes the process of step P217.

At step P217, the CPU 101 loads the color-tone adjustment display end position Ye in the Y-direction from the memory M13 for storing color-tone adjustment display end position (Xe, Ye). After the process of step P217 is completed, the CPU 101 executes the process of step P218.

At step P218, the CPU 101 loads the count value Y from the memory M3 for storing count value Y. After the process of step P218 is completed, the CPU 101 executes the process of step P219.

At step P219, the CPU 101 determines whether the count value Y is larger than the color-tone adjustment display end position Ye in the Y-direction. If the count value Y is larger than the color-tone adjustment display end position Ye in the Y-direction, the CPU 101 executes the process of step P220. If the count value Y is not larger than the color-tone adjustment display end position Ye in the Y-direction, the CPU 101 executes the process of step P210.

At step P220, the CPU 101 loads the count value L from the memory M16 for storing count value L. After the process of step P220 is completed, the CPU 101 executes the process of step P221.

At step P221, the CPU 101 adds 1 to the count value L, and overwrites the value in the memory M16 for storing count value L with the resultant value. After the process of step P221 is completed, the CPU 101 executes the process of step P222.

At step P222, the CPU 101 loads the count value X from the memory M2 for storing count value X. After the process of step P222 is completed, the CPU 101 executes the process of step P223.

At step P223, the CPU 101 adds 1 to the count value X, and overwrites the value in the memory M2 for storing count value X with the resultant value. After the process of step P223 is completed, the CPU 101 executes the process of step P224.

At step P224, the CPU 101 loads the color-tone adjustment display end position Xe in the X-direction from the memory M13 for storing color-tone adjustment display end position (Xe, Ye). After the process of step P224 is completed, the CPU 101 executes the process of step P225.

At step P225, the CPU 101 loads the count value X from the memory M2 for storing count value X. After the process of step P225 is completed, the CPU 101 executes the process of step P226.

At step P226, the CPU 101 determines whether the count value X is larger than the color-tone adjustment display end position Xe in the X-direction. If the count value X is larger than the color-tone adjustment display end position Xe in the X-direction, the CPU 101 executes the process of step P227. If the count value X is not larger than the color-tone adjustment display end position Xe in the X-direction, the CPU 101 executes the process of step P209.

At step P227, the CPU 101 overwrites the value in the memory M2 for storing count value X with 1. After the process of step P227 is completed, the CPU 101 executes the process of step P228.

At step P228, the CPU 101 overwrites the value in the memory M3 for storing count value Y with 1. After the process of step P228 is completed, the CPU 101 executes the process of step P229.

At step P229, the CPU 101 loads the count value Y from the memory M3 for storing count value Y. After the process of step P229 is completed, the CPU 101 executes the process of step P230.

At step P230, the CPU 101 loads the count value X from the memory M2 for storing count value X. After the process of step P230 is completed, the CPU 101 executes the process of step P231.

At step P231, the CPU 101 loads the CMYK data of the position (X, Y) from the address position (X, Y) in the memory M17 for storing CMYK data for current color-tone display. After the process of step P231 is completed, the CPU 101 executes the process of step P232.

At step P232, the CPU 101 obtains the RGB data of the position (X, Y) from the CMYK data of the address position (X, Y), and then writes the obtained RGB data of the position (X, Y) into the address position (X, Y) in the memory M18 for storing data for current color-tone display. After the process of step P232 is completed, the CPU 101 executes the process of step P233.

At step P233, the CPU 101 loads the Y data of the position (X, Y) from the address position for the Y data of (X, Y) in the memory M17 for storing CMYK data for current color-tone display. After the process of step P233 is completed, the CPU 101 executes the process of step P234.

At step P234, the CPU 101 loads the plus-direction correction value for the Y data from the memory M19 for storing plus-direction correction value for Y data. After the process of step P234 is completed, the CPU 101 executes the process of step P235.

At step P235, the CPU 101 calculates the Y+ data for Y-up display of the position (X, Y) by adding the plus-direction correction value for Y data to the Y data of the position (X, Y). The CPU 101 then writes the calculated Y+ data into the address position (X, Y) in the memory M20 for storing Y+ data. After the process of step P235 is completed, the CPU 101 executes the process of step P236.

At step P236, the CPU 101 loads the CMK data of the position (X, Y) from the address position for the CMK data of (X, Y) in the memory M17 for storing CMYK data for current color-tone display. After the process of step P236 is completed, the CPU 101 executes the process of step P237.

At step P237, the CPU 101 loads the Y+ data of the position (X, Y) from the address position (X, Y) in the memory M20 for storing Y+ data. After the process of step P237 is completed, the CPU 101 executes the process of step P238.

At step P238, the CPU 101 combines the CMK data of the position (X,Y) and the Y+ data of the position (X,Y), and then writes the (CMY+K) data thus obtained into the address position (X, Y) in the memory M21 for storing CMYK data for Y-up display portion. After the process of step P238 is completed, the CPU 101 executes the process of step P239.

At step P239, the CPU 101 loads the Y data of the position (X,Y) from the address position for the Y data of (X,Y) in the memory M17 for storing CMYK data for current color-tone display. After the process of step P239 is completed, the CPU 101 executes the process of step P240.

At step P240, the CPU 101 loads the minus-direction correction value for the Y data from the memory M22 for storing minus-direction correction value for Y data. After the process of step P240 is completed, the CPU 101 executes the process of step P241.

At step P241, the CPU 101 calculates the Y− data for Y-down display of the position (X, Y) by subtracting the minus-direction correction value for Y data from the Y data of the pixel of the position (X,Y). The CPU 101 then writes the calculated Y− data into the address position (X, Y) in the memory M23 for storing Y− data. After the process of step P241 is complete, the CPU 101 executes the process of step P242.

At step P242, the CPU 101 loads the CMK data of the position (X,Y) from the address position for the CMK data of (X,Y) in the memory M17 for storing CMYK data for current color-tone display. After the process of step P242 is completed, the CPU 101 executes the process of step P233.

At step P243, the CPU 101 loads the Y− data of the position (X,Y) from the address position (X, Y) in the memory M23 for storing Y− data. After the process of step P243 is completed, the CPU 101 executes the process of step P244.

At step P244, the CPU 101 combines the CMK data of the position (X,Y) and the Y− data of the position (X,Y), and then writes the (CMY−K) data thus obtained into the address position (X, Y) in the memory M24 for storing CMYK data for Y-down display portion. After the process of step P244 is completed, the CPU 101 executes the process of step P245.

A series of processes similar to the ones executed by the CPU 101 for Y at steps P233 to P244 are executed for M at steps P245 to P256, for C at steps P257 to P268, and for K at steps P269 to P280. After the process of step P280 is completed, the CPU 101 executes the process of step P281.

At step P281, the CPU 101 loads the count value Y from the memory M3 for storing count value Y. After the process of step P281 is completed, the CPU 101 executes the process of step P282.

At step P282, the CPU 101 adds 1 to the count value Y, and overwrites the value in the memory M3 for storing count value Y with the resultant value. After the process of step P282 is completed, the CPU 101 executes the process of step P283.

At step P283, the CPU 101 loads the number of pixels in the Y-direction of color-tone adjustment display area from the memory M14 for storing the number of pixels in the Y-direction of color-tone adjustment display area. After the process of step P283 is completed, the CPU 101 executes the process of step P284.

At step P284, the CPU 101 loads the count value Y from the memory M3 for storing count value Y. After the process of step P284 is completed, the CPU 101 executes the process of step P285.

At step P285, the CPU 101 determines whether the count value Y is larger than the number of pixels in the Y-direction of color-tone adjustment display area. If the count value Y is larger than the number of pixels in the Y-direction of color-tone adjustment display area, the CPU 101 executes the process of step P286. If the count value Y is not larger than the number of pixels in the Y-direction of color-tone adjustment display area, the CPU 101 executes the process of step P229.

At step P286, the CPU 101 loads the count value X from the memory M2 for storing count value X. After the process of step P286 is completed, the CPU 101 executes the process of step P287.

At step P287, the CPU 101 adds 1 to the count value X, and overwrites the value in the memory M2 for storing count value X with the resultant value. After the process of step P287 is completed, the CPU 101 executes the process of step P288.

At step P288, the CPU 101 loads the number of pixels in the X-direction of color-tone adjustment display area from the memory M15 for storing the number of pixels in the X-direction of color-tone adjustment display area. After the process of step P288 is completed, the CPU 101 executes the process of step P289.

At step P289, the CPU 101 loads the count value X from the memory M2 for storing count value X. After the process of step P289 is completed, the CPU 101 executes the process of step P290.

At step P290, the CPU 101 determines whether the count value X is larger than the number of pixels in the X-direction of color-tone adjustment display area. If the count value X is larger than the number of pixels in the X-direction of color-tone adjustment display area, the CPU 101 executes the process of step P291. If the count value X is not larger than the number of pixels in the X-direction of color-tone adjustment display area, the CPU 101 executes the process of step P228.

As shown in FIGS. 14A to 14G, at step P291, the CPU 101 overwrites the value in the memory M2 for storing count value X with 1. After the process of step P291 is completed, the CPU 101 executes the process of step P292.

At step P292, the CPU 101 overwrites the value in the memory M3 for storing count value Y with 1. After the process of step P292 is completed, the CPU 101 executes the process of step P293.

At step P293, the CPU 101 loads the count value Y from the memory M3 for storing count value Y. After the process of step P293 is completed, the CPU 101 executes the process of step P294.

At step P294, the CPU 101 loads the count value X from the memory M2 for storing count value X. After the process of step P294 is completed, the CPU 101 executes the process of step P295.

At step P295, the CPU 101 loads the RGB data of the position (X, Y) from the address position (X, Y) in the memory M18 for storing data for current color-tone display. After the process of step P295 is completed, the CPU 101 executes the process of step P296.

At step P296, the CPU 101 displays the RGB data of the position (X, Y) at the position (X, Y) in the current color-tone display portion 16 of the color-tone adjustment screen 5 of the display apparatus 119. After the process of step P296 is completed, the CPU 101 executes the process of step P297.

At step P297, the CPU 101 loads the (CMY+K) data of the position (X, Y) from the address position (X, Y) in the memory M21 for storing CMYK data for Y-up display portion. After the process of step P297 is completed, the CPU 101 executes the process of step P298.

At step P298, the CPU 101 calculates the RGB data of the position (X,Y) in the Y-up display portion from the (CMY+K) data of the position (X, Y). The CPU 101 then writes the calculated RGB data of the position (X, Y) into the address position (X, Y) in the memory M43 for storing data for Y-up display portion. After the process of step P298 is completed, the CPU 101 executes the process of step P299.

At step P299, the CPU 101 displays the RGB data of the position (X, Y) in the Y-up display portion at the position (X, Y) in the Y-up display portion 18 of the color-tone adjustment screen 5 of the display apparatus 119. After the process of step P299 is completed, the CPU 101 executes the process of step P300.

At step P300, the CPU 101 loads the (CMY−K) data of the position (X, Y) from the address position (X, Y) in the memory M24 for storing CMYK data for Y-down display portion. After the process of step P300 is completed, the CPU 101 executes the process of step P301.

At step P301, the CPU 101 calculates the RGB data of the position (X, Y) in the Y-down display portion from the (CMY−K) data of the position (X, Y). The CPU 101 then writes the calculated RGB data of the position (X, Y) into the address position (X, Y) in the memory M44 for storing data for Y-down display portion. After the process of step P301 is completed, the CPU 101 executes the process of step P302.

At step P302, the CPU 101 displays the RGB data of the position (X, Y) in the Y-down display portion at the position (X, Y) in the Y-down display portion 22 of the color-tone adjustment screen 5 of the display apparatus 119. After the process of step P302 is completed, the CPU 101 executes the process of step P303.

A series of processes similar to the ones executed by the CPU 101 for Y at steps P297 to P302 are executed for M at steps P303 to P308, for C at steps P309 to P314, and for K at steps P315 to P320. After the process of step P320 is completed, the CPU 101 executes the process of step P321.

At step P321, the CPU 101 loads the count value Y from the memory M3 for storing count value Y. After the process of step P321 is completed, the CPU 101 executes the process of step P322.

At step P322, the CPU 101 adds 1 to the count value Y, and overwrites the value in the memory M3 for storing count value Y with the resultant value. After the process of step P322 is completed, the CPU 101 executes the process of step P323.

At step P323, the CPU 101 loads the number of pixels in the Y-direction of color-tone adjustment display area from the memory M14 for storing the number of pixels in the Y-direction of color-tone adjustment display area. After the process of step P323 is completed, the CPU 101 executes the process of step P324.

At step P324, the CPU 101 loads the count value Y from the memory M3 for storing count value Y. After the process of step P324 is completed, the CPU 101 executes the process of step P325.

At step P325, the CPU 101 determines whether the count value Y is larger than the number of pixels in the Y-direction of color-tone adjustment display area. If the count value Y is larger than the number of pixels in the Y-direction of color-tone adjustment display area, the CPU 101 executes the process of step P326. If the count value Y is not larger than the number of pixels in the Y-direction of color-tone adjustment display area, the CPU 101 executes the process of step P293.

At step P326, the CPU 101 loads the count value X from the memory M2 for storing count value X. After the process of step P326 is completed, the CPU 101 executes the process of step P327.

At step P327, the CPU 101 adds 1 to the count value X, and overwrites the value in the memory M2 for storing count value X with the resultant value. After the process of step P327 is completed, the CPU 101 executes the process of step P328.

At step P328, the CPU 101 loads the number of pixels in the X-direction of color-tone adjustment display area from the memory M15 for storing the number of pixels in the X-direction of color-tone adjustment display area. After the process of step P328 is completed, the CPU 101 executes the process of step P329.

At step P329, the CPU 101 loads the count value X from the memory M2 for storing count value X. After the process of step P329 is completed, the CPU 101 executes the process of step P330.

At step P330, the CPU 101 determines whether the count value X is larger than the number of pixels in the X-direction of color-tone adjustment display area. If the count value X is larger than the number of pixels in the X-direction of color-tone adjustment display area, the CPU 101 executes the process of step P331. If the count value X is not larger than the number of pixels in the X-direction of color-tone adjustment display area, the CPU 101 executes the process of step P292.

Through the above-described operational flow, the image of the selected area of the printed matter is displayed in the current color-tone display portion 16 of the color-tone adjustment screen 5 shown in FIG. 2. In addition, as a guideline to the operator to adjust the ink supply amounts, images of the selected area each with the corresponding one of CMYK adjusted by a certain amount are shown in the Y-up display portion 18, the M-up display portion 19, the C-up display portion 20, the K-up display portion 21, the Y-down display portion 22, the M-down display portion 23, the C-down display portion 24, and the K-down display portion 25, respectively.

At step P331, the CPU 101 writes 0 into the memory M51 for storing total value of Y data in CMYK data for current color-tone display. After the process of step P331 is completed, the CPU 101 executes the process of step P332.

At step P332, the CPU 101 writes 0 into the memory M52 for storing total value of M data in CMYK data for current color-tone display. After the process of step P332 is completed, the CPU 101 executes the process of step P333.

At step P333, the CPU 101 writes 0 into the memory M53 for storing total value of C data in CMYK data for current color-tone display. After the process of step P333 is completed, the CPU 101 executes the process of step P334.

At step P334, the CPU 101 writes 0 into the memory M54 for storing total value of K data in CMYK data for current color-tone display. After the process of step P334 is completed, the CPU 101 executes the process of step P335.

At step P335, the CPU 101 overwrites the value in the memory M2 for storing count value X with 1. After the process of step P335 is completed, the CPU 101 executes the process of step P336.

At step P336, the CPU 101 overwrites the value in the memory M3 for storing count value Y with 1. After the process of step P336 is completed, the CPU 101 executes the process of step P337.

At step P337, the CPU 101 loads the count value Y from the memory M3 for storing count value Y. After the process of step P337 is completed, the CPU 101 executes the process of step P338.

At step P338, the CPU 101 loads the count value X from the memory M2 for storing count value X. After the process of step P338 is completed, the CPU 101 executes the process of step P339.

At step P339, the CPU 101 loads the total value of Y data in CMYK data for current color-tone display from the memory M51 for storing total value of Y data in CMYK data for current color-tone display. After the process of step P339 is completed, the CPU 101 executes the process of step P340.

At step P340, the CPU 101 loads the Y data of the position (X, Y) from the address position for Y data of (X, Y) in the memory M17 for storing CMYK data for current color-tone display. After the process of step P340 is completed, the CPU 101 executes the process of step P341.

At step P341, the CPU 101 adds the Y data of the position (X, Y) to the total value of the Y data in the CMYK data for current color-tone display. The CPU 101 then overwrites the value in the memory M51 for storing total value of Y data in CMYK data for current color-tone display with the value thus obtained. After the process of step P341 is completed, the CPU 101 executes the process of step P342.

At step P342, the CPU 101 loads the total value of M data in CMYK data for current color-tone display from the memory M52 for storing total value of M data in CMYK data for current color-tone display. After the process of step P342 is completed, the CPU 101 executes the process of step P343.

At step P343, the CPU 101 loads the M data of the position (X, Y) from the address position for M data of (X, Y) in the memory M17 for storing CMYK data for current color-tone display. After the process of step P343 is completed, the CPU 101 executes the process of step P344.

At step P344, the CPU 101 adds the M data of the position (X, Y) to the total value of the M data in the CMYK data for current color-tone display. The CPU 101 then overwrites the value in the memory M52 for storing total value of M data in CMYK data for current color-tone display with the value thus obtained. After the process of step P344 is completed, the CPU 101 executes the process of step P345.

At step P345, the CPU 101 loads the total value of C data in CMYK data for current color-tone display from the memory M53 for storing total value of C data in CMYK data for current color-tone display. After the process of step P345 is completed, the CPU 101 executes the process of step P346.

At step P346, the CPU 101 loads the C data of the position (X, Y) from the address position for C data of (X, Y) in the memory M17 for storing CMYK data for current color-tone display. After the process of step P346 is completed, the CPU 101 executes the process of step P347.

At step P347, the CPU 101 adds the C data of the position (X, Y) to the total value of the C data in the CMYK data for current color-tone display. The CPU 101 then overwrites the value in the memory M53 for storing total value of C data in CMYK data for current color-tone display with the value thus obtained. After the process of step P347 is completed, the CPU 101 executes the process of step P348.

At step P348, the CPU 101 loads the total value of K data in CMYK data for current color-tone display from the memory M54 for storing total value of K data in CMYK data for current color-tone display. After the process of step P348 is completed, the CPU 101 executes the process of step P349.

At step P349, the CPU 101 loads the K data of the position (X, Y) from the address position for K data of (X, Y) in the memory M17 for storing CMYK data for current color-tone display. After the process of step P349 is completed, the CPU 101 executes the process of step P350.

At step P350, the CPU 101 adds the K data of the position (X, Y) to the total value of the K data in the CMYK data for current color-tone display. The CPU 101 then overwrites the value in the memory M54 for storing total value of K data in CMYK data for current color-tone display with the value thus obtained. After the process of step P350 is completed, the CPU 101 executes the process of step P351.

At step P351, the CPU 101 loads the count value Y from the memory M3 for storing count value Y. After the process of step P351 is completed, the CPU 101 executes the process of step P352.

At step P352, the CPU 101 adds 1 to the count value Y, and overwrites the value in the memory M3 for storing count value Y value with the resultant value. After the process of step P352 is completed, the CPU 101 executes the process of step P353.

At step P353, the CPU 101 loads the number of pixels in the Y-direction of color-tone adjustment display area from the memory M14 for storing the number of pixels in the Y-direction of color-tone adjustment display area. After the process of step P353 is completed, the CPU 101 executes the process of step P354.

At step P354, the CPU 101 loads the count value Y from the memory M3 for storing count value Y. After the process of step P354 is completed, the CPU 101 executes the process of step P355.

At step P355, the CPU 101 determines whether the count value Y is larger than the number of pixels in the Y-direction of color-tone adjustment display area. If the count value Y is larger than the number of pixels in the Y-direction of color-tone adjustment display area, the CPU 101 executes the process of step P356. If the count value Y is not larger than the number of pixels in the Y-direction of color-tone adjustment display area, the CPU 101 executes the process of step P337.

At step P356, the CPU 101 loads the count value X from the memory M2 for storing count value X. After the process of step P356 is completed, the CPU 101 executes the process of step P357.

At step P357, the CPU 101 adds 1 to the count value X, and overwrites the value in the memory M2 for storing count value X with the resultant value. After the process of step P357 is completed, the CPU 101 executes the process of step P358.

At step P358, the CPU 101 loads the number of pixels in the X-direction of color-tone adjustment display area from the memory M15 for storing the number of pixels in the X-direction of color-tone adjustment display area. After the process of step P358 is completed, the CPU 101 executes the process of step P359.

At step P359, the CPU 101 loads the count value X from the memory M2 for storing count value X. After the process of step P359 is completed, the CPU 101 executes the process of step P360.

At step P360, the CPU 101 determines whether the count value X is larger than the number of pixels in the X-direction of color-tone adjustment display area. If the count value X is larger than the number of pixels in the X-direction of color-tone adjustment display area, the CPU 101 executes the process of step P361. If the count value X is not larger than the number of pixels in the X-direction of color-tone adjustment display area, the CPU 101 executes the process of step P336.

As shown in FIGS. 15A to 15I, at step P361, the CPU 101 writes 1 into the memory M55 for storing adjustment ratio of Y data in CMYK data for color-tone display. After the process of step P361 is completed, the CPU 101 executes the process of step P362.

At step P362, the CPU 101 writes 1 into the memory M56 for storing adjustment ratio of M data in CMYK data for color-tone display. After the process of step P362 is completed, the CPU 101 executes the process of step P363.

At step P363, the CPU 101 writes 1 into the memory M57 for storing adjustment ratio of C data in CMYK data for color-tone display. After the process of step P363 is completed, the CPU 101 executes the process of step P364.

At step P364, the CPU 101 writes 1 into the memory M58 for storing adjustment ratio of K data in CMYK data for color-tone display. After the process of step P364 is completed, the CPU 101 executes the process of step P365.

At step P365, the CPU 101 writes 0 into the memory M59 for storing total value of adjustment amount of Y. After the process of step P365 is completed, the CPU 101 executes the process of step P366.

At step P366, the CPU 101 writes 0 into the memory M60 for storing total value of adjustment amount for M. After the process of step P366 is completed, the CPU 101 executes the process of step P367.

At step P367, the CPU 101 writes 0 into the memory M61 for storing total value of adjustment amount for C. After the process of step P367 is completed, the CPU 101 executes the process of step P368.

At step P368, the CPU 101 writes 0 into the memory M62 for storing total value of adjustment amount for K. After the process of step P368 is completed, the CPU 101 executes the process of step P369.

At step P369, the CPU 101 determines whether the operator has turned the Y-increase switch 108 on. If the Y-increase switch 108 has been turned on, the CPU 101 executes the process of step P370. If Y-increase switch 108 has not been turned on, the CPU 101 executes the process of step P382, which will be described later. The Y-increase switch 108 corresponds to the Y-up switch 26 shown in FIG. 2.

At step P370, the CPU 101 outputs an enable signal and a reset signal to the internal-clock counter 123 for time measurement. After the process of step P370 is completed, the CPU 101 executes the process of step P371.

At step P371, the CPU 101 stops the output of the reset signal to the internal-clock counter 123 for time measurement. After the process of step P371 is completed, the CPU 101 executes the process of step P372.

At step P372, the CPU 101 determines whether the operator has turned the Y-increase switch 108 off. If the Y-increase switch 108 has been turned off, the CPU 101 executes the process of step P373. If Y-increase switch 108 has not been turned off, the CPU 101 executes the process of step P372 again.

At step P373, the CPU 101 loads the count value from the internal-clock counter 123 for time measurement, and stores the loaded count value in the memory M63 for storing count value of internal-clock counter for time measurement. After the process of step P373 is completed, the CPU 101 executes the process of step P374.

At step P374, the CPU 101 calculates the adjustment amount of Y for this time by using the count value of the internal-clock counter 123 for time measurement, and stores the calculated adjustment amount of Y for this time in the memory M64 for storing adjustment amount of Y for this time. After the process of step P374 is completed, the CPU 101 executes the process of step P375.

At step P375, the CPU 101 loads the total value of the adjustment amount of Y from the memory M59 for storing total value of adjustment amount of Y. After the process of step P375 is completed, the CPU 101 executes the process of step P376.

At step P376, the CPU 101 adds the adjustment amount of Y for this time to the total value of the adjustment amount of Y, and overwrites the value in the memory M59 for storing total value of adjustment amount of Y with the value thus obtained. After the process of step P376 is completed, the CPU 101 executes the process of step P377.

At step P377, the CPU 101 loads the total value of the adjustment amount of Y from the memory M59 for storing total value of adjustment amount of Y. After the process of step P377 is completed, the CPU 101 executes the process of step P378.

At step P378, the CPU 101 loads the total value of Y data in CMYK data for current color-tone display from the memory M51 for storing total value of Y data in CMYK data for current color-tone display. After the process of step P378 is completed, the CPU 101 executes the process of step P379.

At step P379, the CPU 101 calculates the total value of Y data in the CMYK data for color-tone display after adjustment by adding the total value of the adjustment amount of Y to the total value of Y data in the CMYK data for current color-tone display. The CPU 101 then stores the calculated total value of Y data in the CMYK data for color-tone display after adjustment in the memory M65 for storing total value of Y data in CMYK data for color-tone display after adjustment. After the process of step P379 is completed, the CPU 101 executes the process of step P380.

At step P380, the CPU 101 loads the total value of Y data in CMYK data for current color-tone display from the memory M51 for storing total value of Y data in CMYK data for current color-tone display. After the process of step P380 is completed, the CPU 101 executes the process of step P381.

At step P381, the CPU 101 calculates the adjustment ratio of Y data by dividing the total value of Y data in CMYK data for color-tone display after adjustment by the total value of Y data in CMYK data for current color-tone display. The CPU 101 then overwrites the value in the memory M55 for storing adjustment ratio of Y data in CMYK data for color-tone display with the calculated adjustment ratio of Y data. After the process of step P381 is completed, the CPU 101 executes the process of step P382.

At step P382, the CPU 101 determines whether the operator has turned the Y-decrease switch 109 on. If the Y-decrease switch 109 has been turned on, the CPU 101 executes the process of step P383. If Y-decrease switch 109 has not been turned on, the CPU 101 executes the process of step P395, which will be described later. The Y-decrease switch 109 corresponds to the Y-down switch 30 shown in FIG. 2.

At step P383, the CPU 101 outputs the enable signal and the reset signal to the internal-clock counter 123 for time measurement. After the process of step P383 is completed, the CPU 101 executes the process of step P384.

At step P384, the CPU 101 stops the output of the reset signal to the internal-clock counter 123 for time measurement. After the process of step P384 is completed, the CPU 101 executes the process of step P385.

At step P385, the CPU 101 determines whether the operator has turned the Y-decrease switch 109 off. If the Y-decrease switch 109 has been turned off, the CPU 101 executes the process of step P386. If Y-decrease switch 109 has not been turned off, the CPU 101 executes the process of step P385 again.

At step P386, the CPU 101 loads the count value from the internal-clock counter 123 for time measurement, and stores the loaded count value in the memory M63 for storing count value of internal-clock counter for time measurement. After the process of step P386 is completed, the CPU 101 executes the process of step P387.

At step P387, the CPU 101 calculates the adjustment amount of Y for this time by using the count value of the internal-clock counter 123 for time measurement, and stores the calculated adjustment amount of Y for this time in the memory M64 for storing adjustment amount of Y for this time. After the process of step P387 is completed, the CPU 101 executes the process of step P388.

At step P388, the CPU 101 loads the total value of the adjustment amount of Y from the memory M59 for storing total value of adjustment amount of Y. After the process of step P388 is completed, the CPU 101 executes the process of step P389.

At step P389, the CPU 101 subtracts the adjustment amount of Y for this time from the total value of the adjustment amount of Y, and overwrites the value in the memory M59 for storing total value of adjustment amount of Y with the value thus obtained. After the process of step P389 is completed, the CPU 101 executes the process of step P390.

At step P390, the CPU 101 loads the total value of the adjustment amount of Y from the memory M59 for storing total value of adjustment amount of Y. After the process of step P390 is completed, the CPU 101 executes the process of step P391.

At step P391, the CPU 101 loads the total value of Y data in CMYK data for current color-tone display from the memory M51 for storing total value of Y data in CMYK data for current color-tone display. After the process of step P391 is completed, the CPU 101 executes the process of step P392.

At step P392, the CPU 101 calculates the total value of Y data in the CMYK data for color-tone display after adjustment by subtracting the total value of the adjustment amount of Y from the total value of Y data in the CMYK data for current color-tone display. The CPU 101 then stores the calculated total value of Y data in the CMYK data for color-tone display after adjustment in the memory M65 for storing total value of Y data in CMYK data for color-tone display after adjustment. After the process of step P392 is completed, the CPU 101 executes the process of step P393.

At step P393, the CPU 101 loads the total value of Y data in CMYK data for current color-tone display from the memory M51 for storing total value of Y data in CMYK data for current color-tone display. After the process of step P393 is completed, the CPU 101 executes the process of step P394.

At step P394, the CPU 101 calculates the adjustment ratio of Y data by dividing the total value of Y data in CMYK data for color-tone display after adjustment by the total value of Y data in CMYK data for current color-tone display. The CPU 101 then overwrites the value in the memory M55 for storing adjustment ratio of Y data in CMYK data for color-tone display with the calculated adjustment ratio of Y data. After the process of step P394 is completed, the CPU 101 executes the process of step P395.

A series of processes similar to the ones executed by the CPU 101 for Y at steps P369 to P394 are executed for M at steps P395 to P420, for C at steps P421 to P446, and for K at steps P447 to P472. After the process of step P472 is completed, the CPU 101 executes the process of step P473.

Figure 16A:
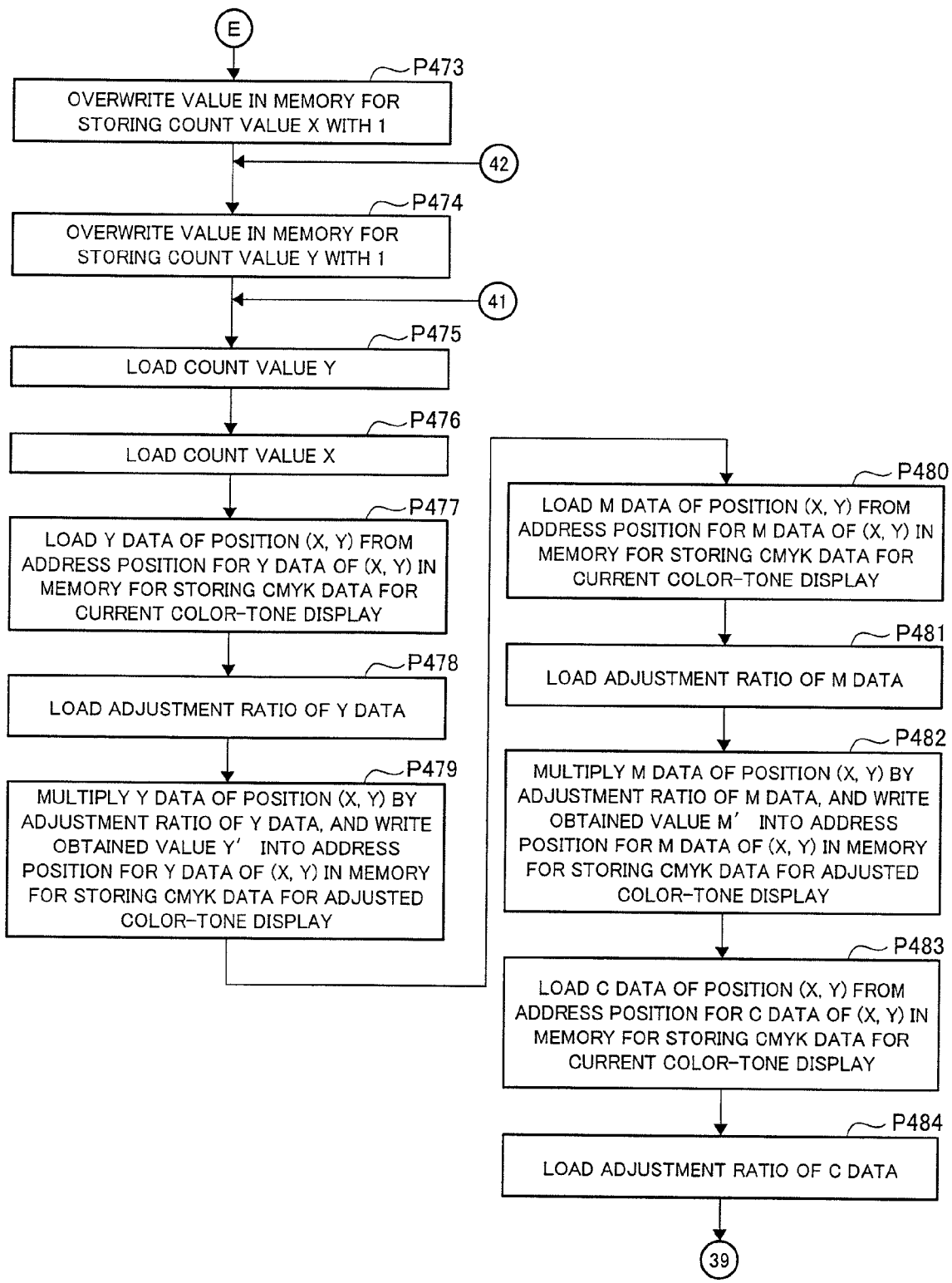
FIG. 16A is a flowchart illustrating an operational flow subsequent to that of FIG. 15I.
Figure 16B:
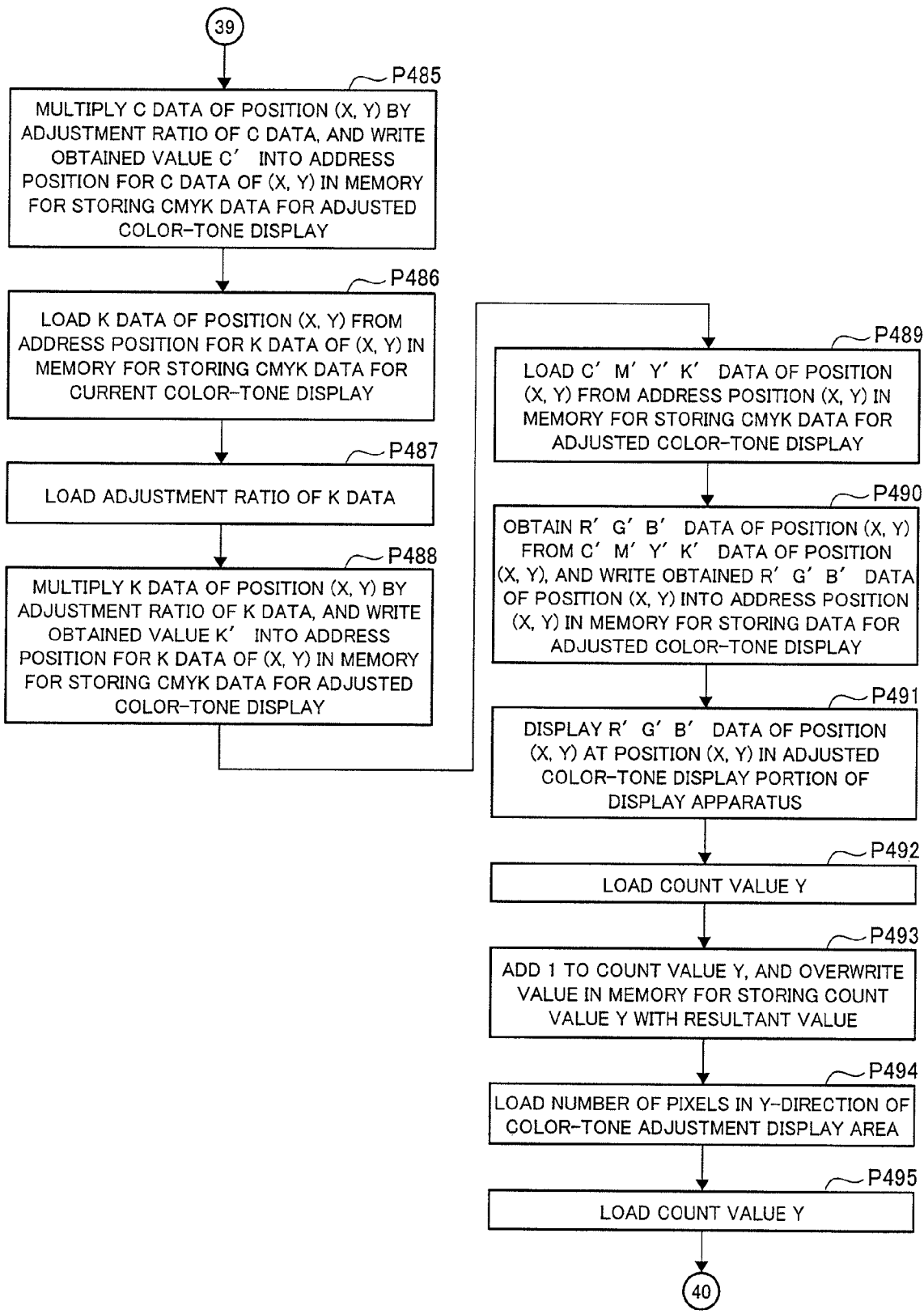
FIG. 16B is a flowchart illustrating an operational flow subsequent to that of FIG. 16A.
Figure 16C:
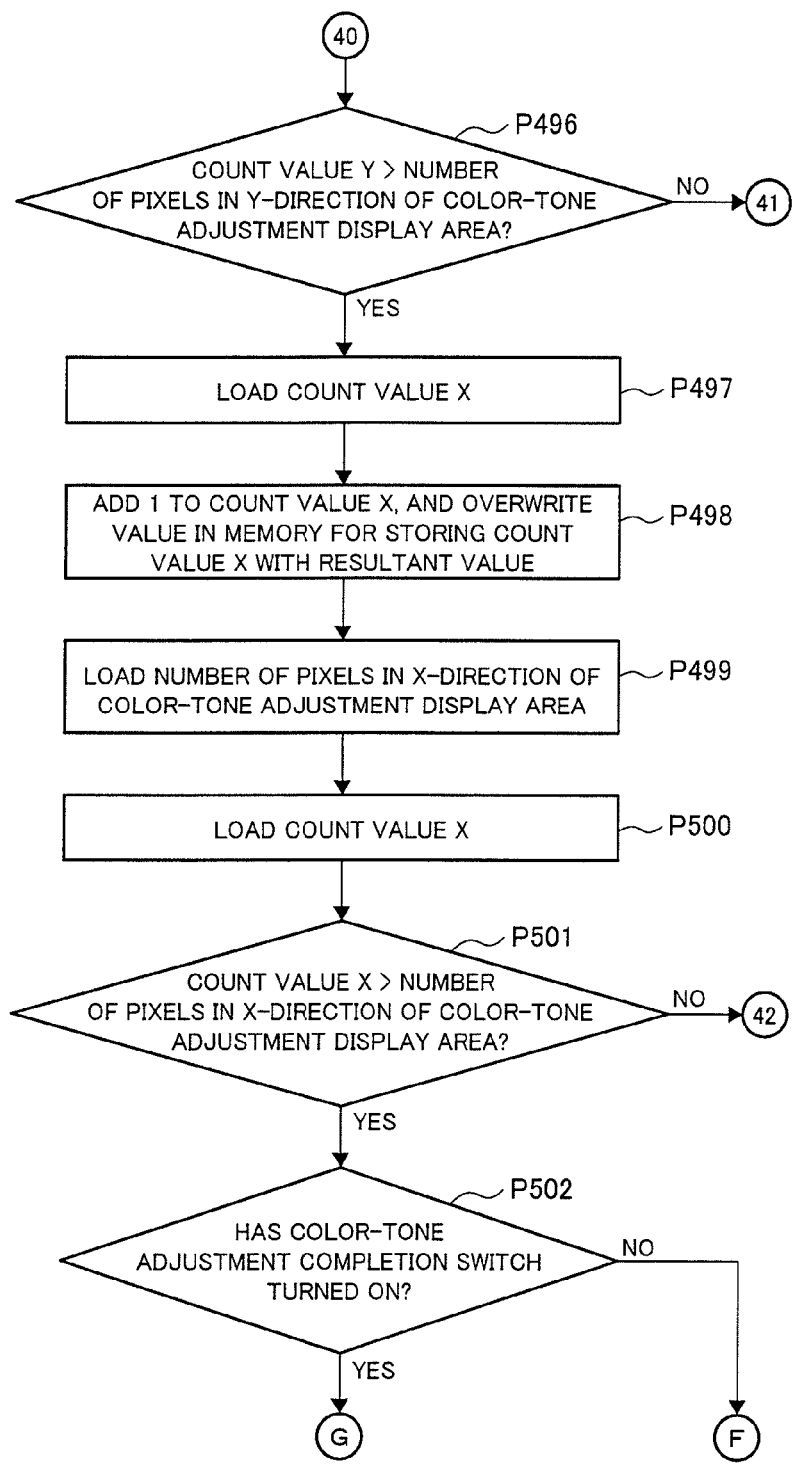
FIG. 16C is a flowchart illustrating an operational flow subsequent to that of FIG. 16B.
Figure 17A:
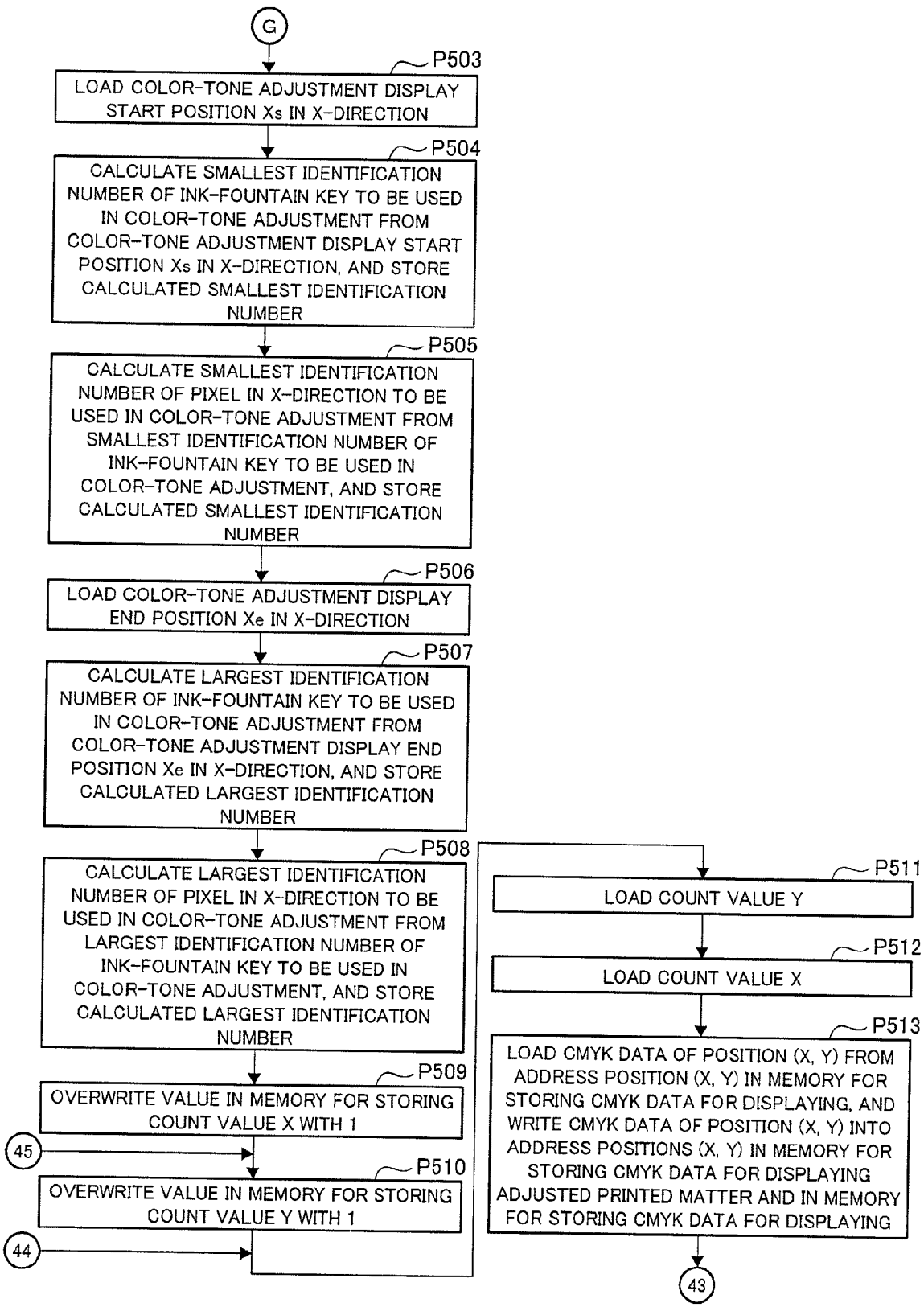
FIG. 17A is a flowchart illustrating an operational flow subsequent to that of FIG. 16C.
Figure 17B:
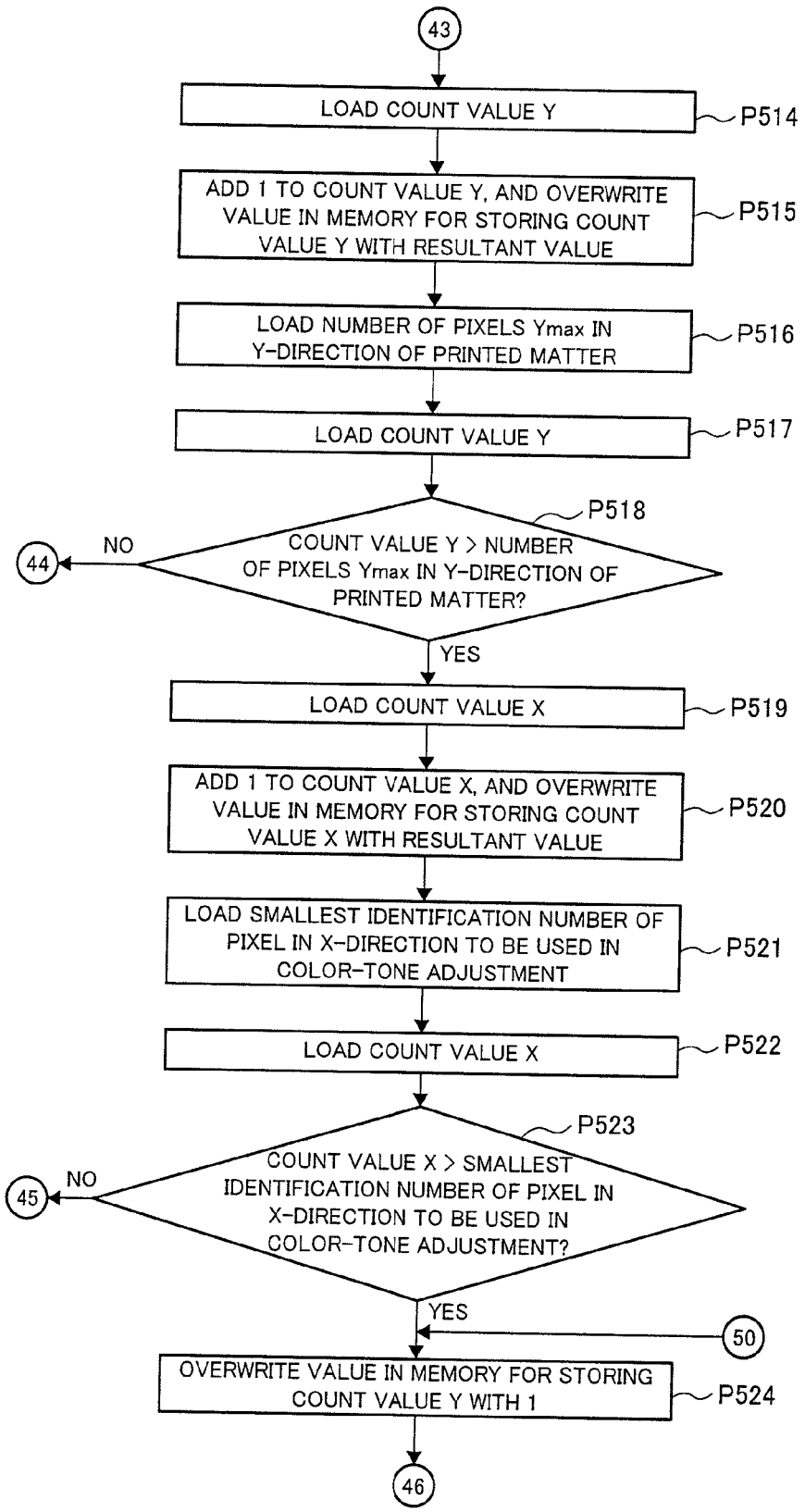
FIG. 17B is a flowchart illustrating an operational flow subsequent to that of FIG. 17A.
Figure 17C:
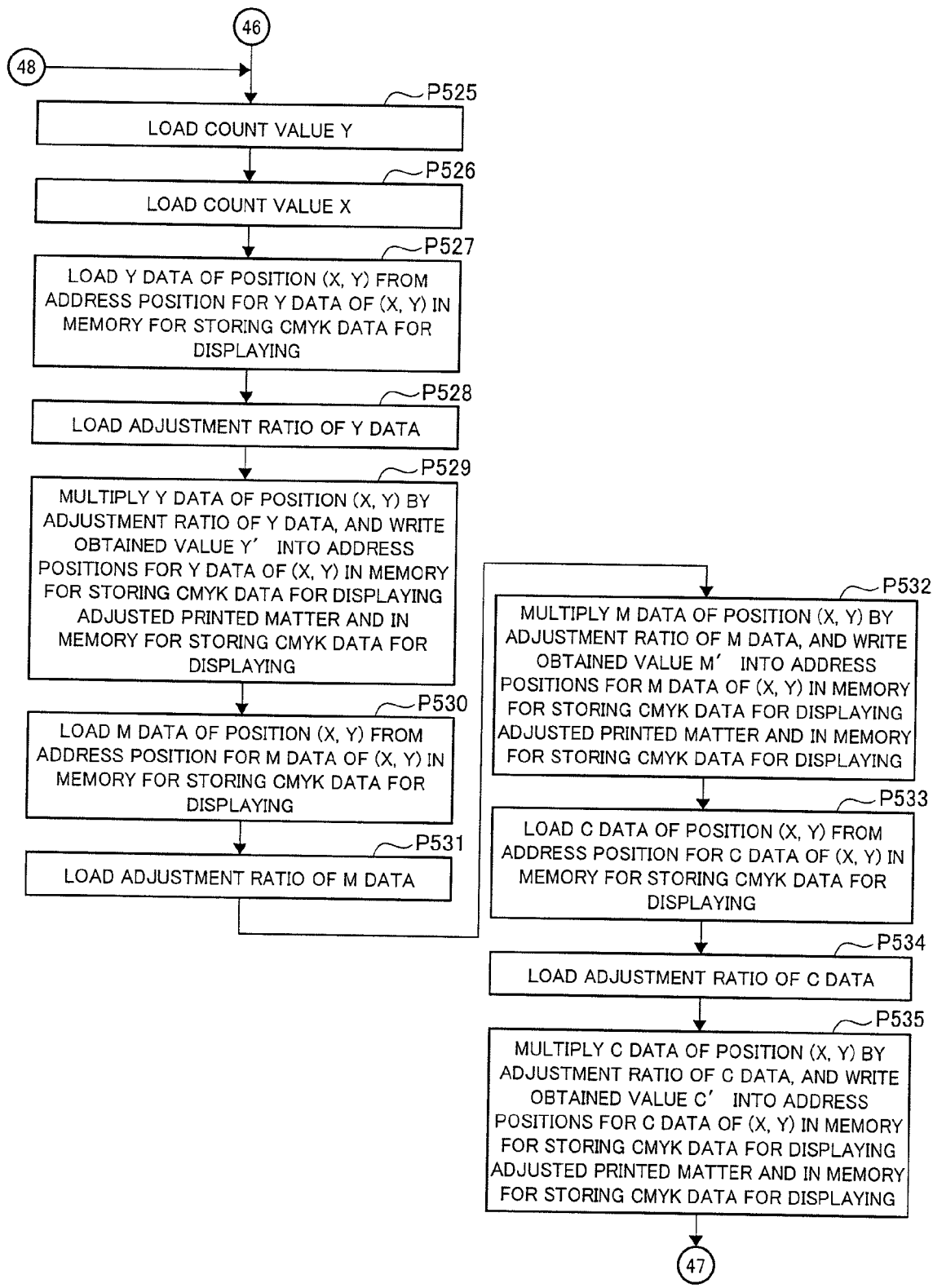
FIG. 17C is a flowchart illustrating an operational flow subsequent to that of FIG. 17B.
Figure 17D:
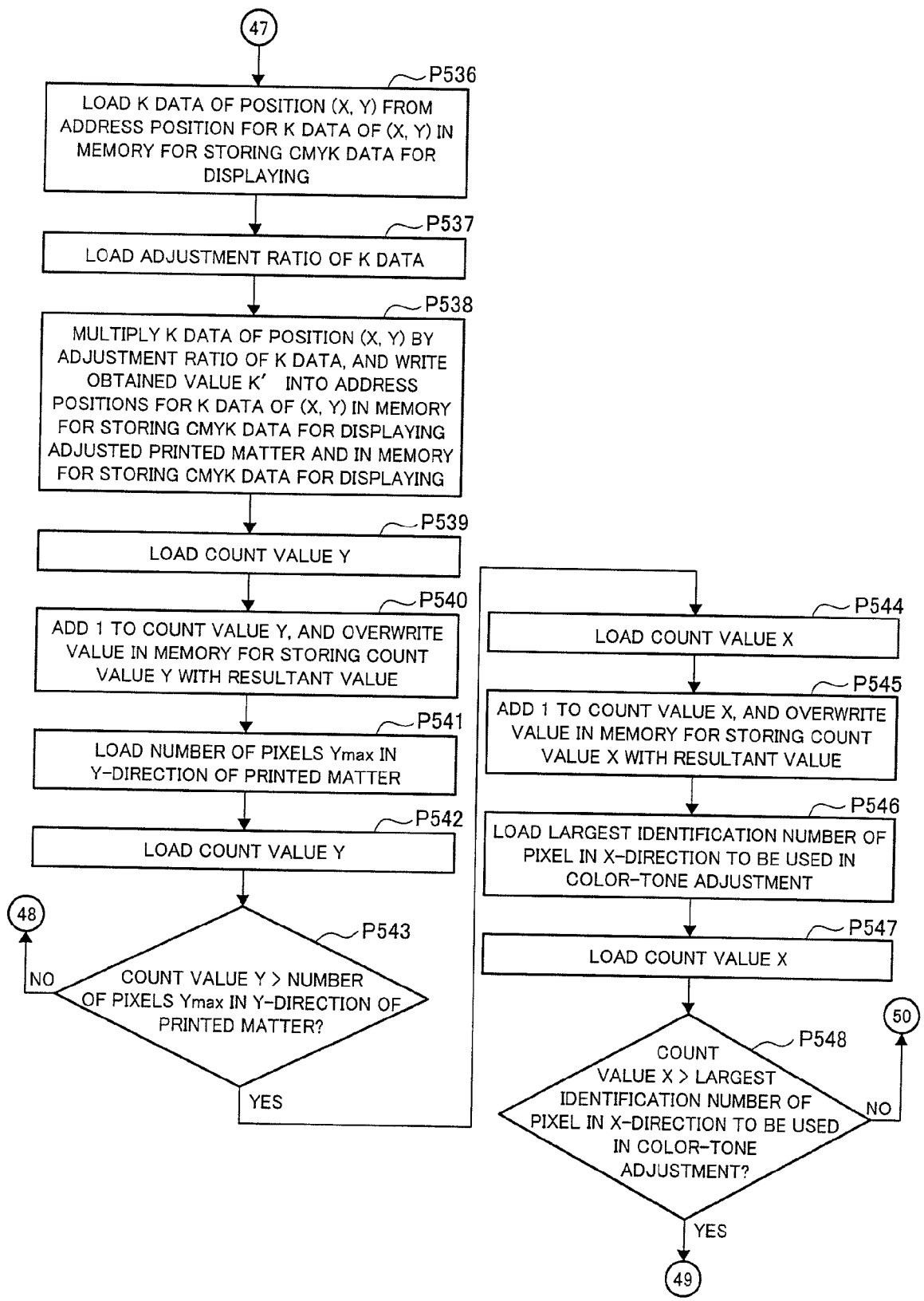
FIG. 17D is a flowchart illustrating an operational flow subsequent to that of FIG. 17C.
Figure 17E:
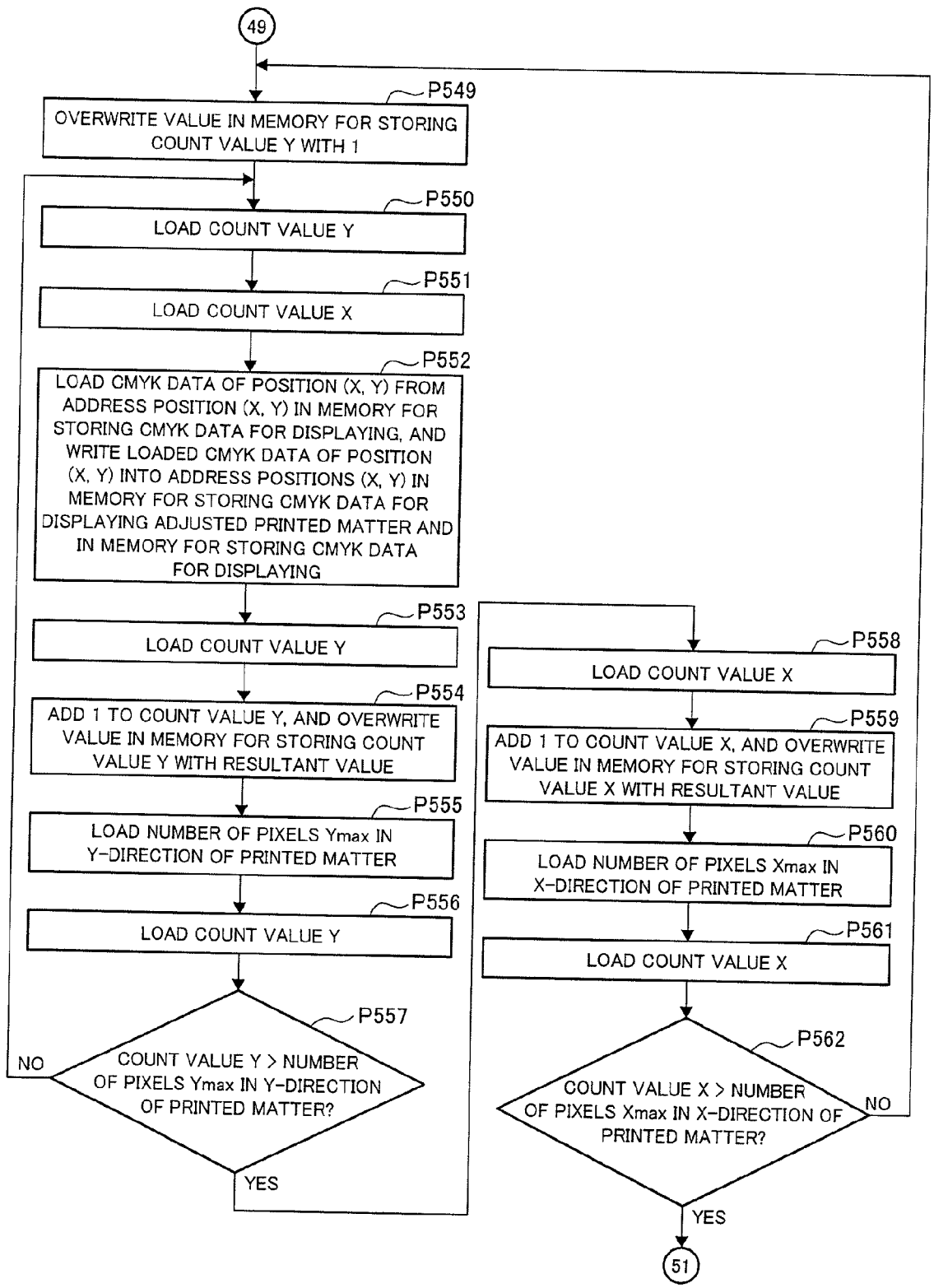
FIG. 17E is a flowchart illustrating an operational flow subsequent to that of FIG. 17D.
Figure 17F:
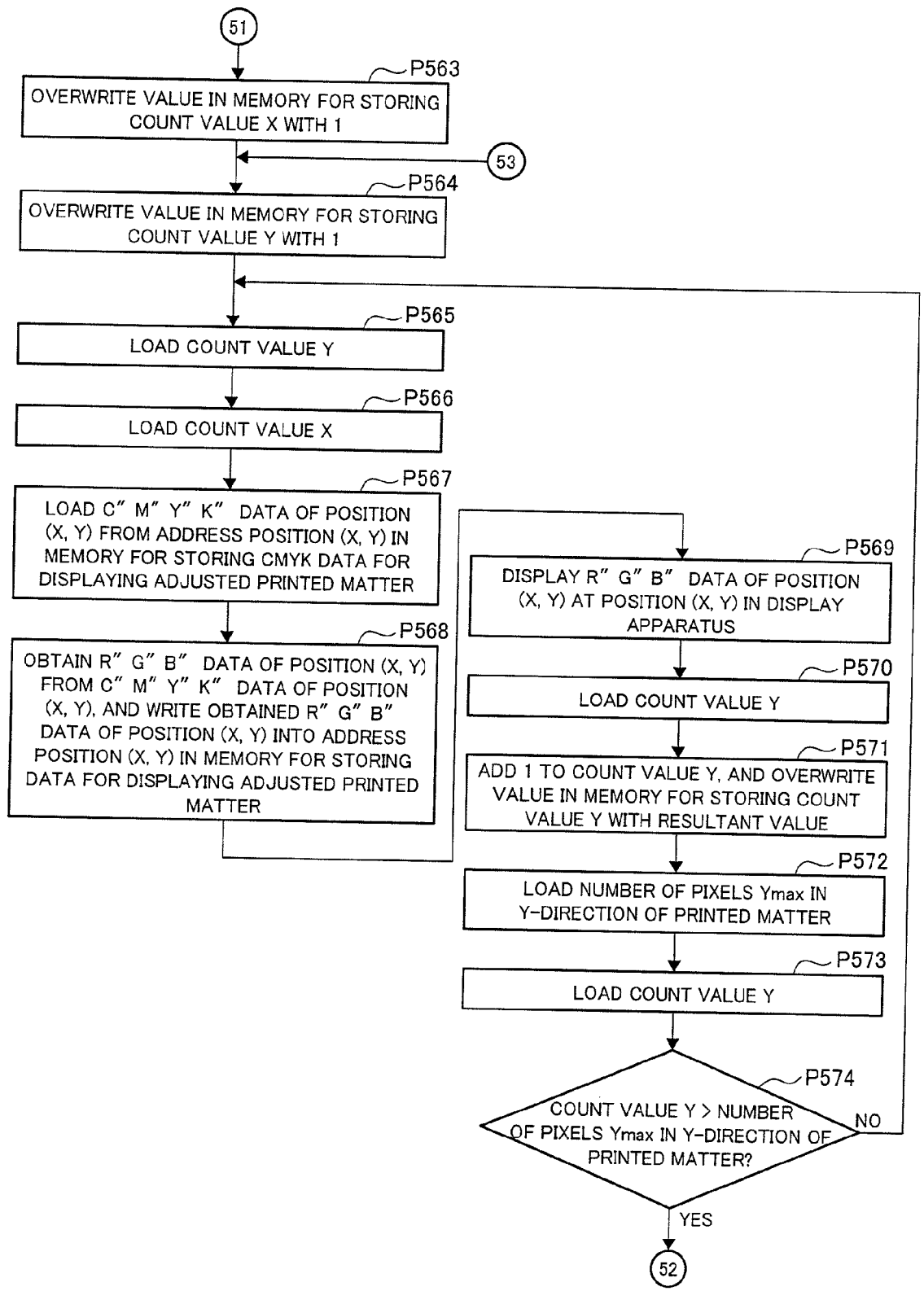
FIG. 17F is a flowchart illustrating an operational flow subsequent to that of FIG. 17E.
Figure 17G:
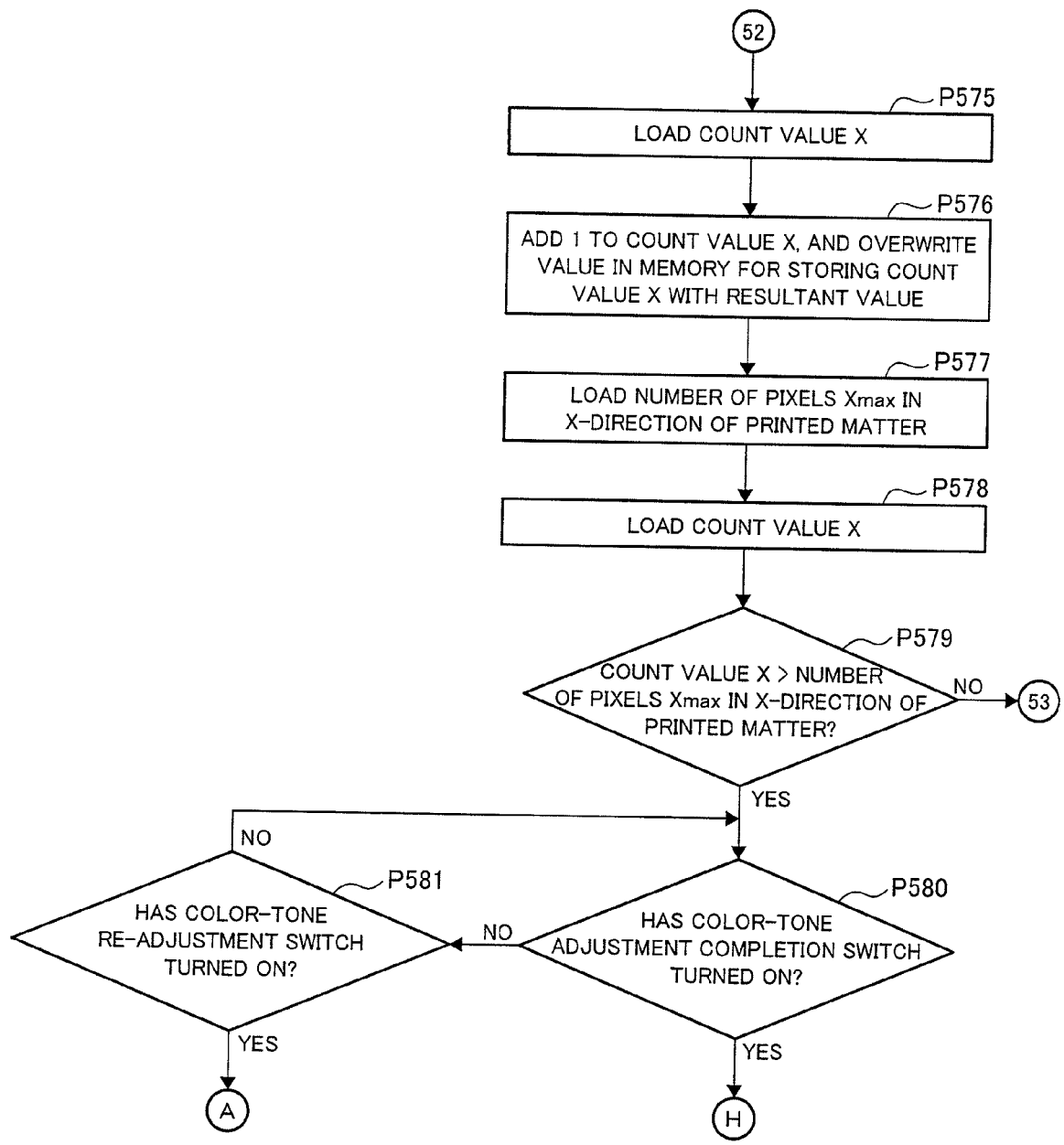
FIG. 17G is a flowchart illustrating an operational flow subsequent to that of FIG. 17F.
Figure 18A:
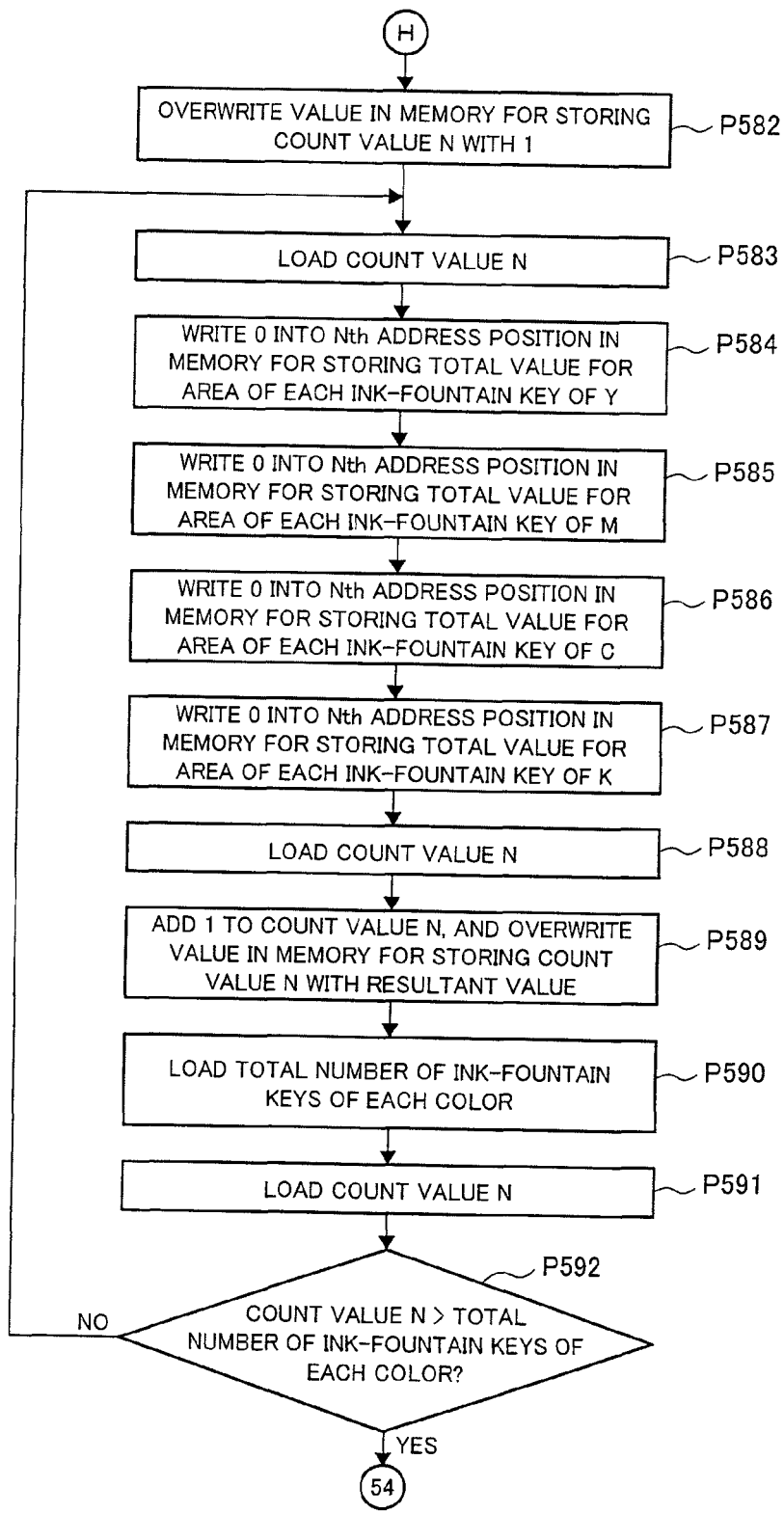
FIG. 18A is a flowchart illustrating an operational flow subsequent to that of FIG. 17G.
Figure 18B:
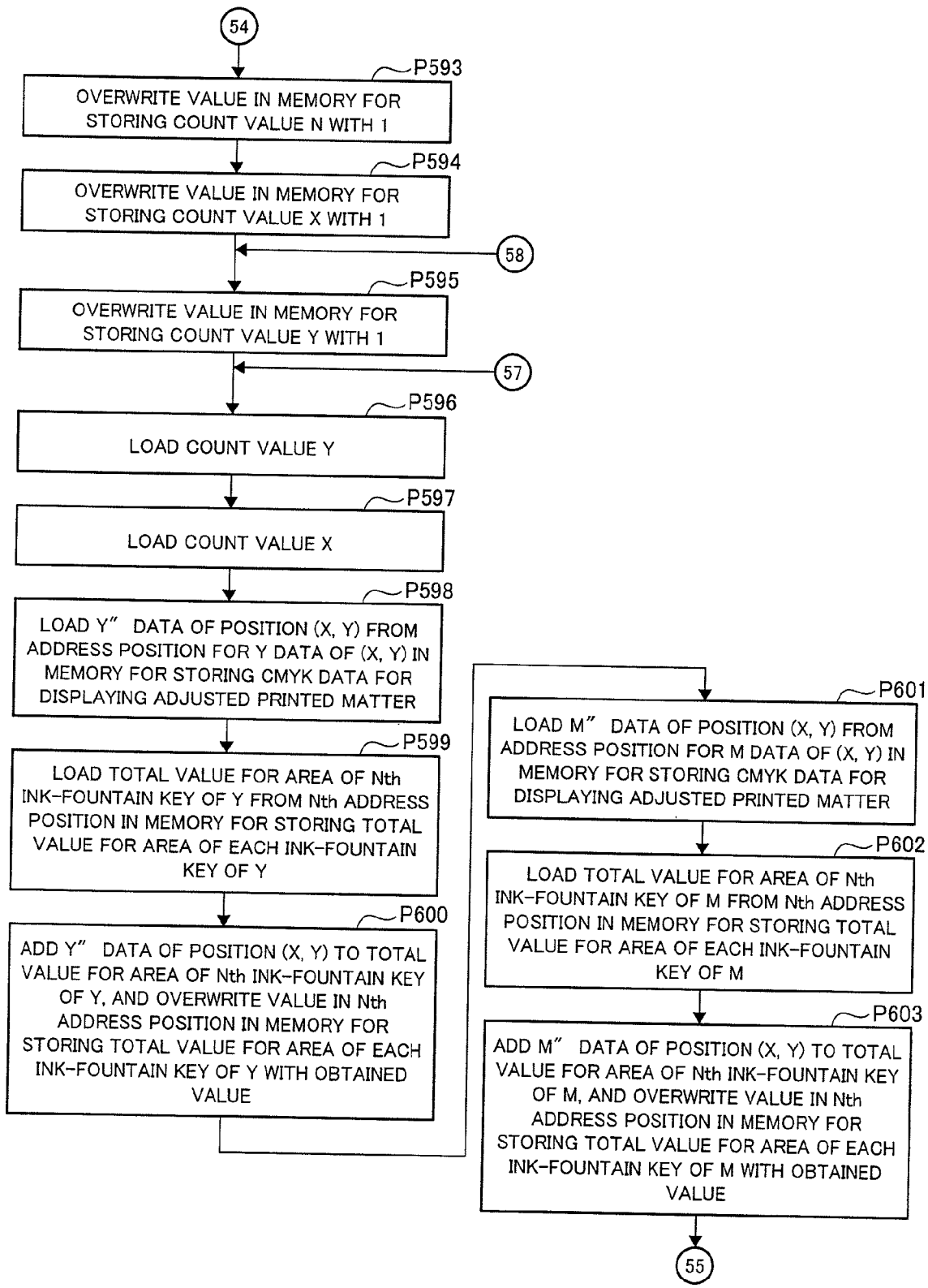
FIG. 18B is a flowchart illustrating an operational flow subsequent to that of FIG. 18A.
Figure 18C:
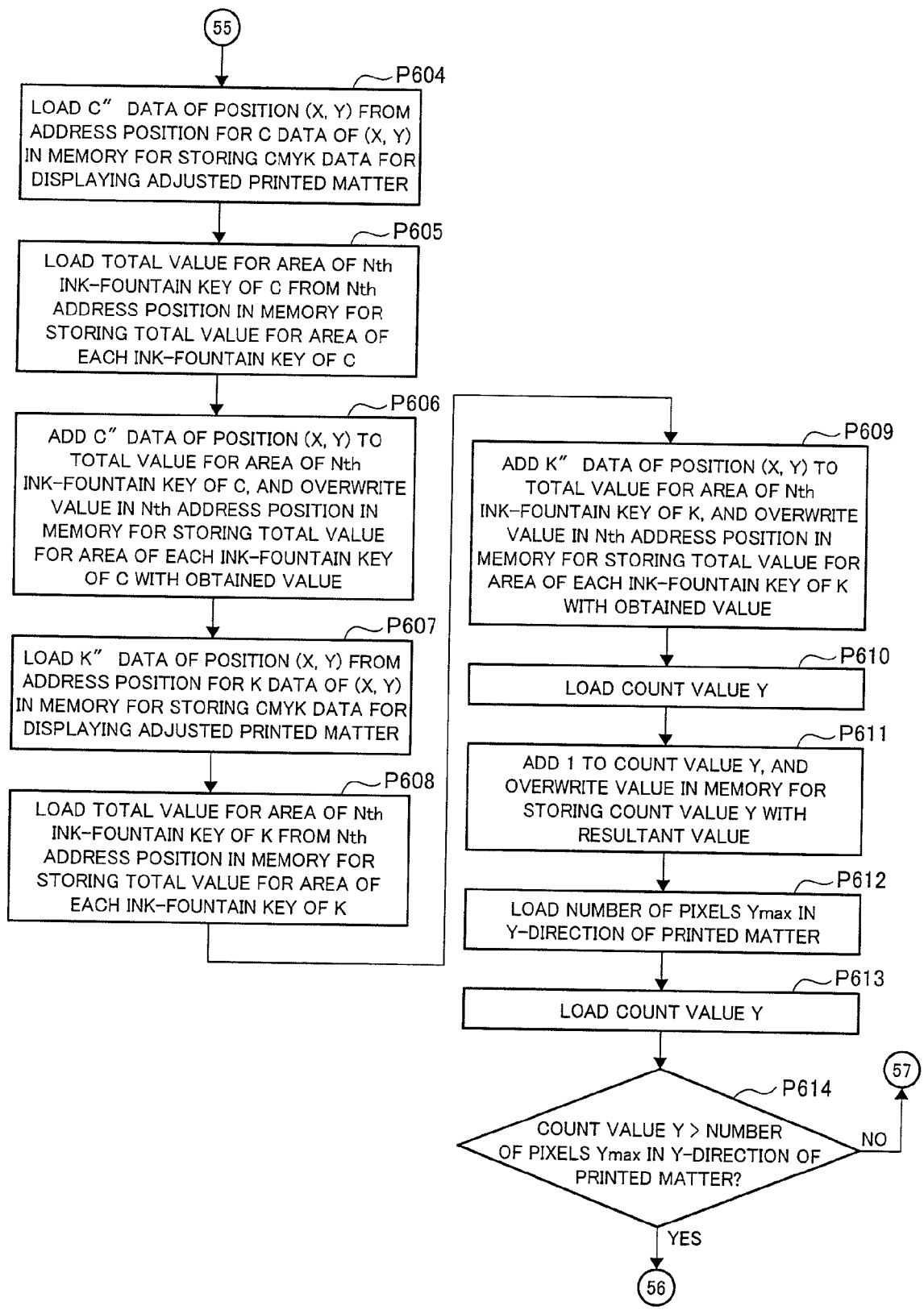
FIG. 18C is a flowchart illustrating an operational flow subsequent to that of FIG. 18B.
Figure 18D:
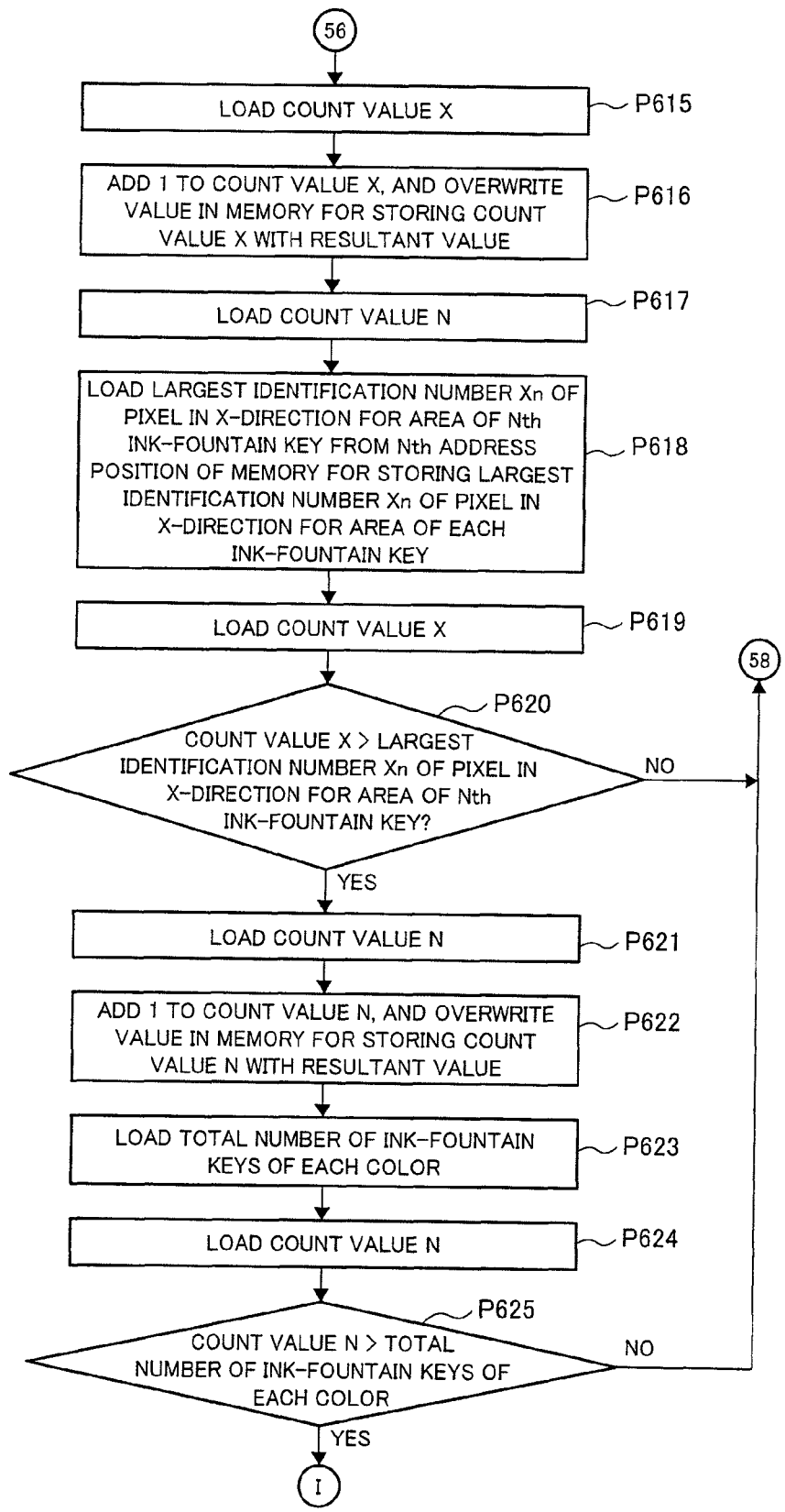
FIG. 18D is a flowchart illustrating an operational flow subsequent to that of FIG. 18C.
Figure 19A:
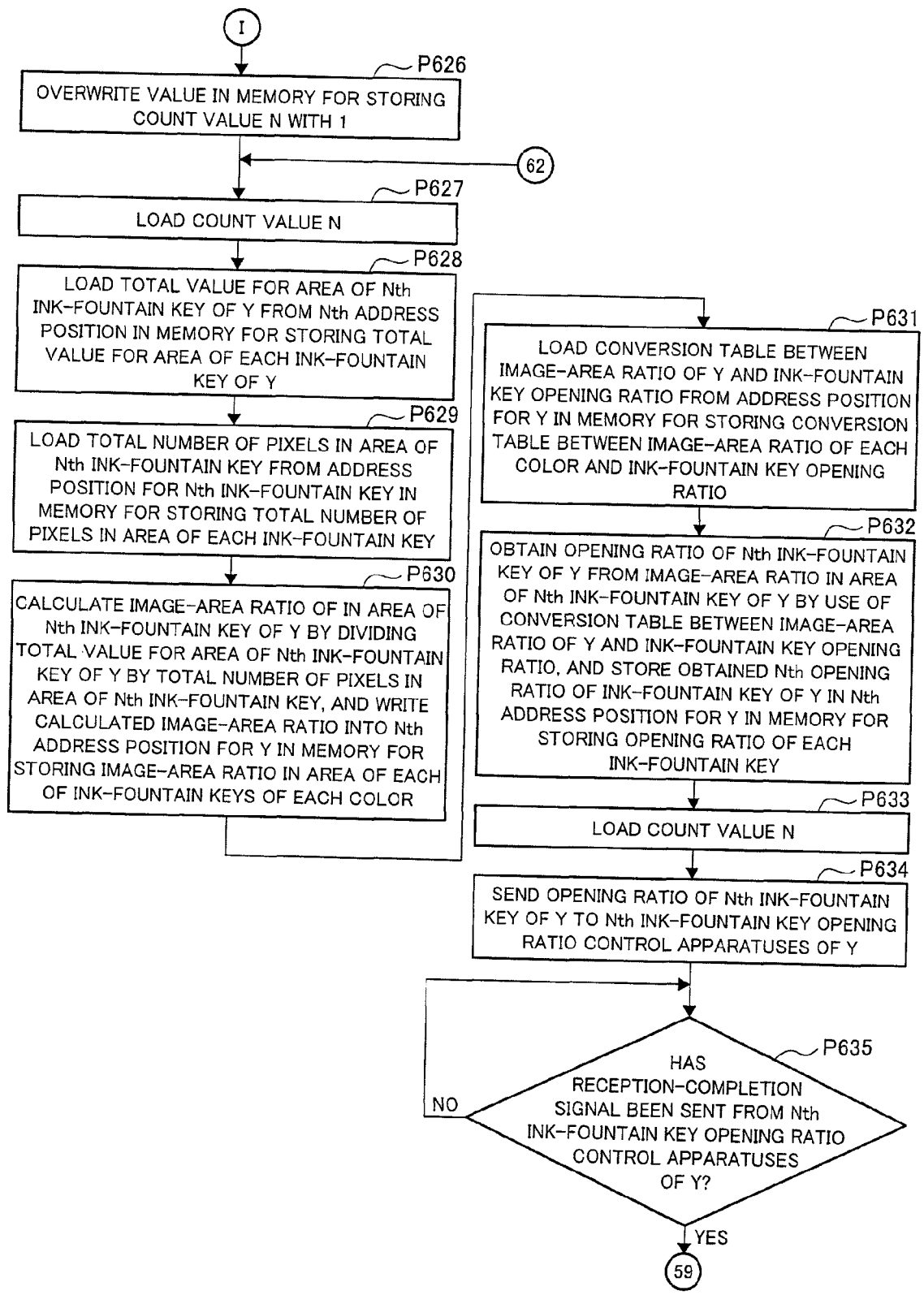
FIG. 19A is a flowchart illustrating an operational flow subsequent to that of FIG. 18D.
Figure 19B:
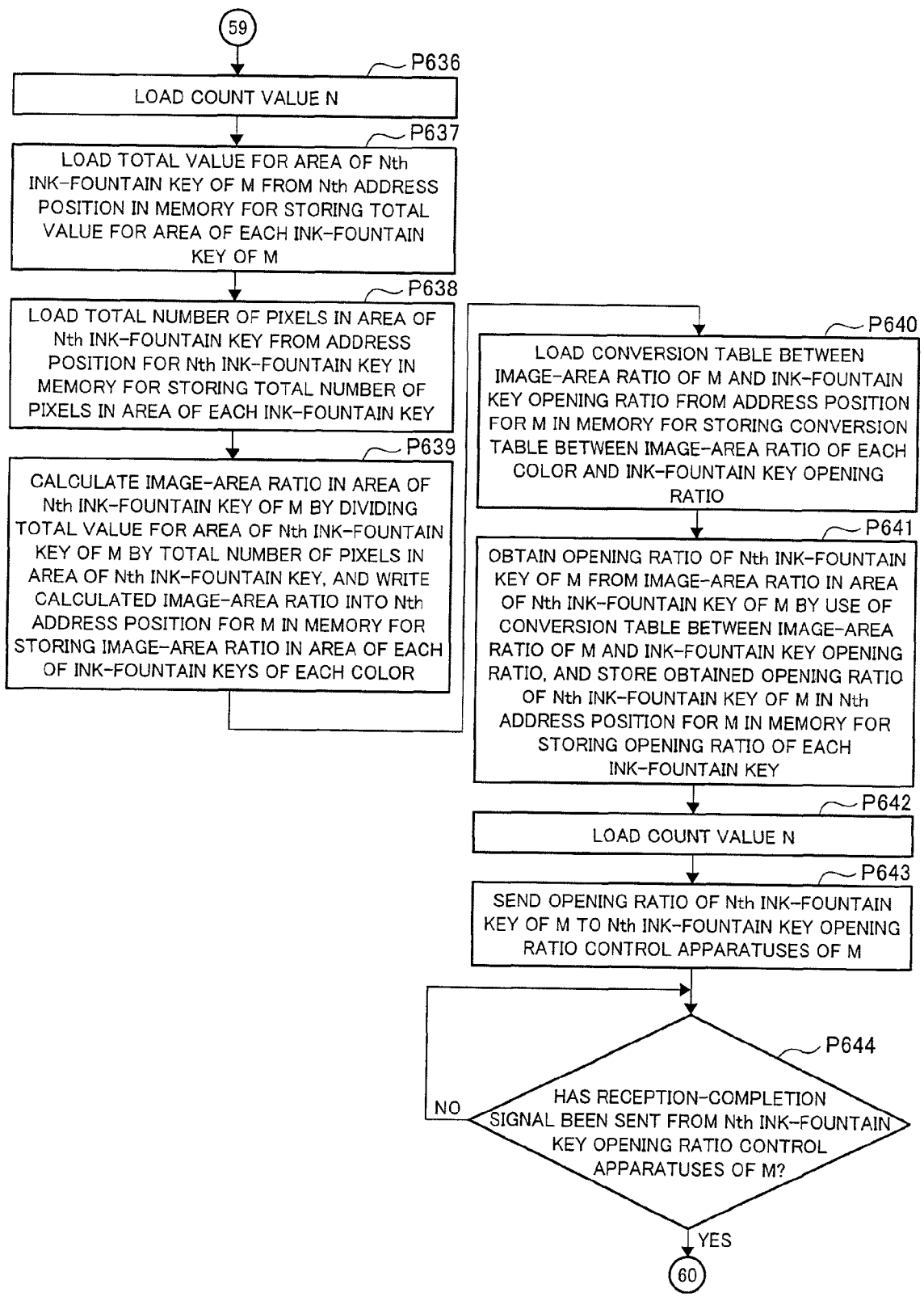
FIG. 19B is a flowchart illustrating an operational flow subsequent to that of FIG. 19A.
Figure 19C:
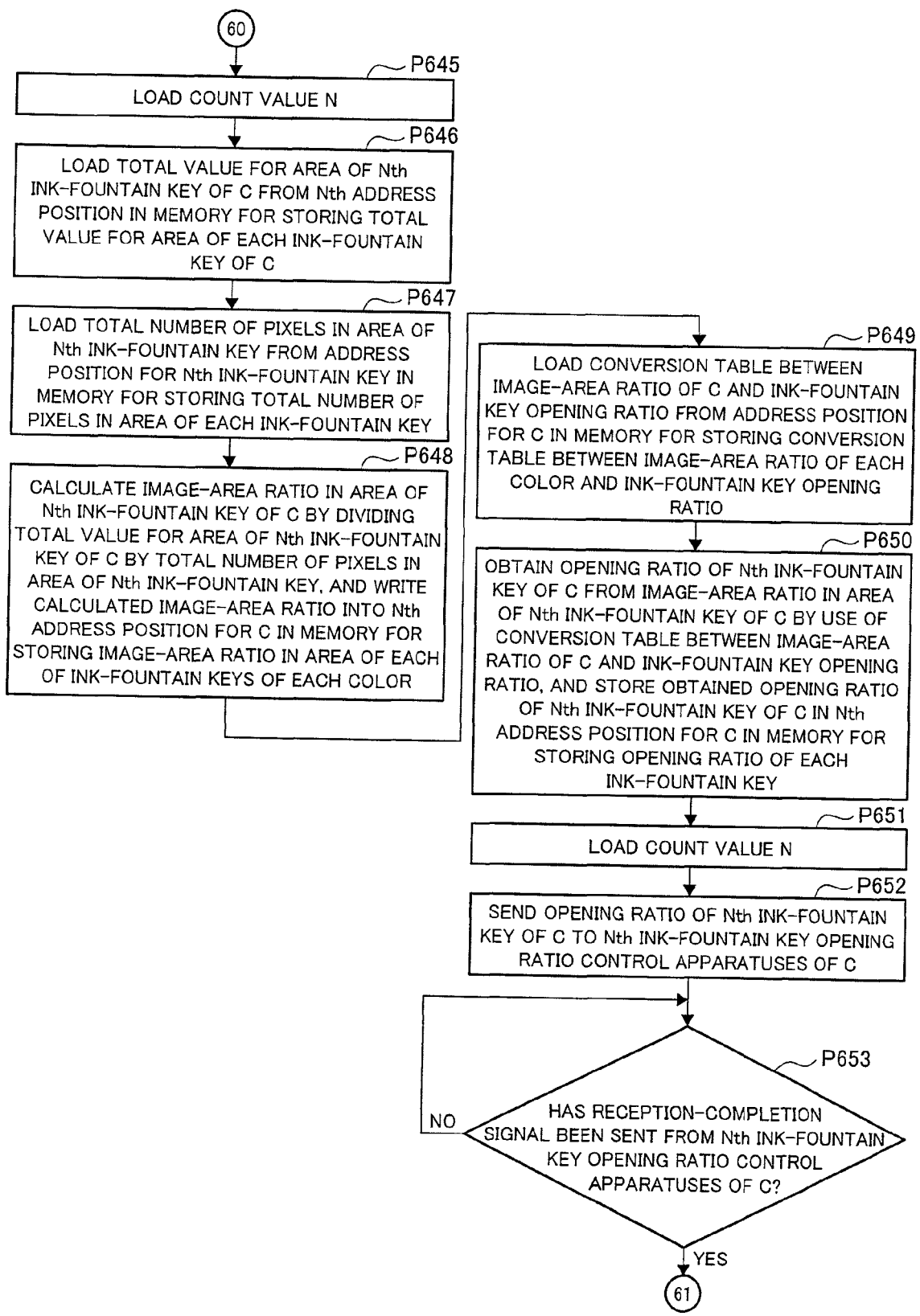
FIG. 19C is a flowchart illustrating an operational flow subsequent to that of FIG. 19B.
Figure 19D:
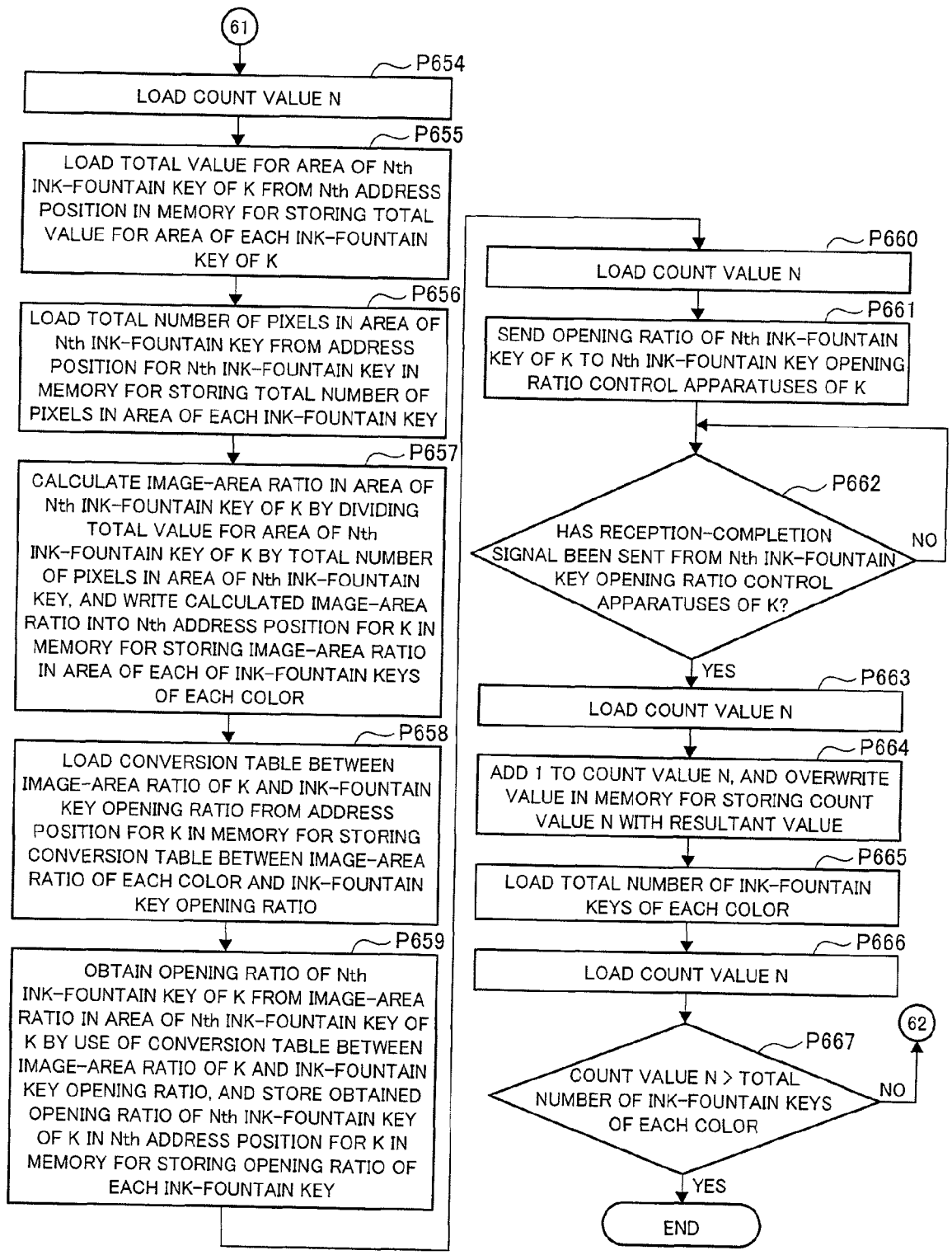
FIG. 19D is a flowchart illustrating an operational flow subsequent to that of FIG. 19C.

As shown in FIGS. 16A to 16C, at step P473, the CPU 101 overwrites the value in the memory M2 for storing count value X with 1. After the process of step P473 is completed, the CPU 101 executes the process of step P474.

At step P474, the CPU 101 overwrites the value in the memory M3 for storing count value Y with 1. After the process of step P474 is completed, the CPU 101 executes the process of step P475.

At step P475, the CPU 101 loads the count value Y from the memory M3 for storing count value Y. After the process of step P475 is completed, the CPU 101 executes the process of step P476.

At step P476, the CPU 101 loads the count value X from the memory M2 for storing count value X. After the process of step P476 is completed, the CPU 101 executes the process of step P477.

At step P477, the CPU 101 loads the Y data of the position (X, Y) from the address position for Y data of (X, Y) in the memory M17 for storing CMYK data for current color-tone display. After the process of step P477 is completed, the CPU 101 executes the process of step P478.

At step P478, the CPU 101 loads the adjustment ratio of Y data from the memory M55 for storing adjustment ratio of Y data in CMYK data for color-tone display. After the process of step P478 is completed, the CPU 101 executes the process of step P479.

At step P479, the CPU 101 multiplies Y data of the position (X, Y) by the adjustment ratio of Y data, and writes a value Y' thus obtained into the address position for Y data of (X, Y) in the memory M72 for storing CMYK data for adjusted color-tone display. After the process of step P479 is completed, the CPU 101 executes the process of step P480.

At step P480, the CPU 101 loads the M data of the position (X, Y) from the address position for M data of (X, Y) in the memory M17 for storing CMYK data for current color-tone display. After the process of step P480 is completed, the CPU 101 executes the process of step P481.

At step P481, the CPU 101 loads the adjustment ratio of M data from the memory M56 for storing adjustment ratio of M data in CMYK data for color-tone display. After the process of step P481 is completed, the CPU 101 executes the process of step P482.

At step P482, the CPU 101 multiplies M data of the position (X, Y) by the adjustment ratio of M data, and writes a value M' thus obtained into the address position for M data of (X, Y) in the memory M72 for storing CMYK data for adjusted color-tone display. After the process of step P482 is completed, the CPU 101 executes the process of step P483.

At step P483, the CPU 101 loads the C data of the position (X, Y) from the address position for C data of (X, Y) in the memory M17 for storing CMYK data for current color-tone display. After the process of step P483 is completed, the CPU 101 executes the process of step P484.

At step P484, the CPU 101 loads the adjustment ratio of C data from the memory M57 for storing adjustment ratio of C data in CMYK data for color-tone display. After the process of step P484 is completed, the CPU 101 executes the process of step P485.

At step P485, the CPU 101 multiplies C data of the position (X, Y) by the adjustment ratio of C data, and writes a value C' thus obtained into the address position for C data of (X, Y) in the memory M72 for storing CMYK data for adjusted color-tone display. After the process of step P485 is completed, the CPU 101 executes the process of step P486.

At step P486, the CPU 101 loads the K data of the position (X, Y) from the address position for K data of (X, Y) in the memory M17 for storing CMYK data for current color-tone display. After the process of step P486 is completed, the CPU 101 executes the process of step P487.

At step P487, the CPU 101 loads the adjustment ratio of K data from the memory M58 for storing adjustment ratio of K data in CMYK data for color-tone display. After the process of step P487 is completed, the CPU 101 executes the process of step P488.

At step P488, the CPU 101 multiplies K data of the position (X, Y) by the adjustment ratio of K data, and writes a value K' thus obtained into the address position for K data of (X, Y) in the memory M72 for storing CMYK data for adjusted color-tone display. After the process of step P488 is completed, the CPU 101 executes the process of step P489.

At step P489, the CPU 101 loads the C'M'Y'K' data of the position (X, Y) from the address position (X, Y) in the memory M72 for storing CMYK data for adjusted color-tone display. After the process of step P489 is completed, the CPU 101 executes the process of step P490.

At step P490, the CPU 101 calculates the R'G'B' data of the position (X,Y) from the C'M'Y'K' data of the position (X,Y). The CPU 101 then writes the calculated R'G'B' data of the position (X,Y) into the address position (X,Y) in the memory M73 for storing data for adjusted color-tone display. After the process of step P490 is completed, the CPU 101 executes the process of step P491.

At step P491, the CPU 101 displays the R'G'B' data of the position (X,Y) at the position (X,Y) in the adjusted color-tone display portion 17 of the color-tone adjustment screen 5 of the display apparatus 119. After the process of step P491 is completed, the CPU 101 executes the process of step P492.

At step P492, the CPU 101 loads the count value Y from the memory M3 for storing count value Y. After the process of step P492 is completed, the CPU 101 executes the process of step P493.

At step P493, the CPU 101 adds 1 to the count value Y, and overwrites the value in the memory M3 for storing count value Y with the resultant value. After the process of step P493 is completed, the CPU 101 executes the process of step P494.

At step P494, the CPU 101 loads the number of pixels in the Y-direction of color-tone adjustment display area from the memory M14 for storing the number of pixels in the Y-direction of color-tone adjustment display area. After the process of step P494 is completed, the CPU 101 executes the process of step P495.

At step P495, the CPU 101 loads the count value Y from the memory M3 for storing count value Y. After the process of step P495 is completed, the CPU 101 executes the process of step P496.

At step P496, the CPU 101 determines whether the count value Y is larger than the number of pixels in the Y-direction of color-tone adjustment display area. If the count value Y is larger than the number of pixels in the Y-direction of color-tone adjustment display area, the CPU 101 executes the process of step P497. If the count value Y is not larger than the number of pixels in the Y-direction of color-tone adjustment display area, the CPU 101 executes the process of step P475.

At step P497, the CPU 101 loads the count value X from the memory M2 for storing count value X. After the process of step P497 is completed, the CPU 101 executes the process of step P498.

At step P498, the CPU 101 adds 1 to the count value X, and overwrites the value in the memory M2 for storing count value X with the resultant value. After the process of step P498 is completed, the CPU 101 executes the process of step P499.

At step P499, the CPU 101 loads the number of pixels in the X-direction of color-tone adjustment display area from the memory M15 for storing the number of pixels in the X-direction of color-tone adjustment display area. After the process of step P499 is completed, the CPU 101 executes the process of step P500.

At step P500, the CPU 101 loads the count value X from the memory M2 for storing count value X. After the process of step P500 is completed, the CPU 101 executes the process of step P501.

At step P501, the CPU 101 determines whether the count value X is larger than the number of pixels in the X-direction of color-tone adjustment display area. If the count value X is larger than the number of pixels in the X-direction of color-tone adjustment display area, the CPU 101 executes the process of step P502. If the count value X is not larger than the number of pixels in the X-direction of color-tone adjustment display area, the CPU 101 executes the process of step P474.

At step P502, the CPU 101 determines whether the operator has turned the color-tone adjustment completion switch 116 on. If the color-tone adjustment completion switch 116 has been turned on, the CPU 101 executes the process of step P503. If the color-tone adjustment completion switch 116 has not been turned on, the CPU 101 executes the process of step P369.

In the processes included in the above-described operational flow, the ink supply amounts to the color-tone adjustment area are adjusted by the operator's action on the switches shown in FIG. 2, namely, Y-up switch (Y-increase switch) 108, Y-down switch (Y-decrease switch) 109, M-up switch (M-increase switch) 110, M-down switch (M-decrease switch) 111, C-up switch (C-increase switch) 112, C-down switch (C-decrease switch) 113, K-up switch (K-increase switch) 114, and K-down switch (K-decrease switch) 115. Hence, the image of the color-tone adjustment area with the adjusted color tones is displayed in the adjusted color-tone display portion 17.

As shown in FIGS. 17A to 17G, at step P503, the CPU 101 loads the color-tone adjustment display start position Xs in the X-direction from the memory M12 for storing color-tone adjustment display start position (Xs,Ys). After the process of step P503 is completed, the CPU 101 executes the process of step P504.

At step P504, the CPU 101 calculates the smallest identification number of ink-fountain key to be used in color-tone adjustment from the color-tone adjustment display start position Xs in the X-direction. The CPU 101 then stores the calculated smallest identification number of ink-fountain key in the memory M74 for storing the smallest identification number of ink-fountain key to be used in color-tone adjustment. Note that the identification numbers of ink-fountain keys are assigned in a manner similar to the images of the printed matter. Specifically, the ink-fountain key located at the left-hand side end position is the reference point, and a larger identification number is assigned to an ink-fountain key located on a more right-hand side position. After the process of step P504 is completed, the CPU 101 executes the process of step P505.

At step P505, the CPU 101 calculates the smallest identification number of pixel in the X-direction to be used in color-tone adjustment from the smallest identification number of ink-fountain key to be used in color-tone adjustment. The CPU 101 then stores the calculated smallest identification number of pixel in the X-direction in the memory M75 for storing the smallest identification number of pixel in the X-direction to be used in color-tone adjustment. Note that the pixel identification numbers in the X-direction correspond respectively to the positions X whose reference point is the left-hand side end of the image of the printed matter. After the process of step P505 is completed, the CPU 101 executes the process of step P506.

At step P506, the CPU 101 loads the color-tone adjustment display end position Xe in the X-direction from the memory M13 for storing color-tone adjustment display end position (Xe,Ye). After the process of step P506 is completed, the CPU 101 executes the process of step P507.

At step P507, the CPU 101 calculates the largest identification number of ink-fountain key to be used in color-tone adjustment from the color-tone adjustment display end position Xe in the X-direction. The CPU 101 then stores the calculated largest identification number of ink-fountain key in the memory M76 for storing the largest identification number of ink-fountain key to be used in color-tone adjustment.

After the process of step P507 is completed, the CPU 101 executes the process of step P505.

At step P508, the CPU 101 calculates the largest identification number of pixel in the X-direction to be used in color-tone adjustment from the largest identification number of ink-fountain key to be used in color-tone adjustment. The CPU 101 then stores the calculated largest identification number of pixel in the X-direction in the memory M77 for storing the largest identification number of pixel in the X-direction to be used in color-tone adjustment. After the process of step P508 is completed, the CPU 101 executes the process of step P509.

At step P509, the CPU 101 overwrites the value in the memory M2 for storing count value X with 1. After the process of step P509 is completed, the CPU 101 executes the process of step P510.

At step P510, the CPU 101 overwrites the value in the memory M3 for storing count value Y with 1. After the process of step P510 is completed, the CPU 101 executes the process of step P511.

At step P511, the CPU 101 loads the count value Y from the memory M3 for storing count value Y. After the process of step P511 is completed, the CPU 101 executes the process of step P512.

At step P512, the CPU 101 loads the count value X from the memory M2 for storing count value X. After the process of step P512 is completed, the CPU 101 executes the process of step P513.

At step P513, the CPU 101 loads the CMYK data of the position (X, Y) from the address position (X, Y) in the memory M5 for storing CMYK data for displaying, and writes the loaded data into the address positions (X, Y) in the memory M78 for storing CMYK data for displaying an adjusted printed matter and in the memory M5 for storing CMYK data for displaying. After the process of step P513 is completed, the CPU 101 executes the process of step P514.

At step P514, the CPU 101 loads the count value Y from the memory M3 for storing count value Y. After the process of step P514 is completed, the CPU 101 executes the process of step P515.

At step P515, the CPU 101 adds 1 to the count value Y, and overwrites the value in the memory M3 for storing count value Y with the resultant value. After the process of step P515 is completed, the CPU 101 executes the process of step P516.

At step P516, the CPU 101 loads the number of pixels Ymax in the Y-direction of a printed matter from the memory M7 for storing the number of pixels Ymax in the Y-direction of a printed matter. After the process of step P516 is completed, the CPU 101 executes the process of step P517.

At step P517, the CPU 101 loads the count value Y from the memory M3 for storing count value Y. After the process of step P517 is completed, the CPU 101 executes the process of step P518.

At step P518, the CPU 101 determines whether the count value Y is larger than the number of pixels Ymax in the Y-direction of a printed matter. If the count value Y is larger than the number of pixels Ymax in the Y-direction of a printed matter, the CPU 101 executes the process of step P519. If the count value Y is not larger than the number of pixels Ymax in the Y-direction of a printed matter, the CPU 101 executes the process of step P511.

At step P519, the CPU 101 loads the count value X from the memory M2 for storing count value X. After the process of step P519 is completed, the CPU 101 executes the process of step P520.

At step P520, the CPU 101 adds 1 to the count value X, and overwrites the value in the memory M2 for storing count value X with the resultant value. After the process of step P520 is completed, the CPU 101 executes the process of step P521.

At step P521, the CPU 101 loads the smallest identification number of pixel in the X-direction to be used in color-tone adjustment from the memory M75 for storing the smallest identification number of pixel in the X-direction to be used in color-tone adjustment. After the process of step P521 is completed, the CPU 101 executes the process of step P522.

At step P522, the CPU 101 loads the count value X from the memory M2 for storing count value X. After the process of step P522 is completed, the CPU 101 executes the process of step P523.

At step P523, the CPU 101 determines whether the count value X is larger than the smallest identification number of pixel in the X-direction to be used in color-tone adjustment. If the count value X is larger than the smallest identification number of pixel in the X-direction to be used in color-tone adjustment, the CPU 101 executes the process of step P524. If the count value X is not larger than the smallest identification number of pixel in the X-direction to be used in color-tone adjustment, the CPU 101 executes the process of step P510.

At step P524, the CPU 101 overwrites the value in the memory M3 for storing count value Y with 1. After the process of step P524 is completed, the CPU 101 executes the process of step P525.

At step P525, the CPU 101 loads the count value Y from the memory M3 for storing count value Y. After the process of step P525 is completed, the CPU 101 executes the process of step P526.

At step P526, the CPU 101 loads the count value X from the memory M2 for storing count value X. After the process of step P526 is completed, the CPU 101 executes the process of step P527.

At step P527, the CPU 101 loads the Y data of the position (X, Y) from the address position for the Y data of (X, Y) in the memory M5 for storing CMYK data for displaying. After the process of step P527 is completed, the CPU 101 executes the process of step P528.

At step P528, the CPU 101 loads the adjustment ratio of Y data from the memory M55 for storing adjustment ratio of Y data in CMYK data for color-tone display. After the process of step P528 is completed, the CPU 101 executes the process of step P529.

At step P529, the CPU 101 multiplies Y data of the position (X, Y) by the adjustment ratio of Y data, and writes a value Y' thus obtained into the address positions for the Y data of (X, Y) in the memory M78 for storing CMYK data for displaying an adjusted printed matter and in the memory M5 for storing CMYK data for displaying. After the process of step P529 is completed, the CPU 101 executes the process of step P530.

At step P530, the CPU 101 loads the M data of the position (X, Y) from the address position for the M data of (X, Y) in the memory M5 for storing CMYK data for displaying. After the process of step P530 is completed, the CPU 101 executes the process of step P531.

At step P531, the CPU 101 loads the adjustment ratio of M data from the memory M56 for storing adjustment ratio of M data in CMYK data for color-tone display. After the process of step P531 is completed, the CPU 101 executes the process of step P532.

At step P532, the CPU 101 multiplies M data of the position (X, Y) by the adjustment ratio of M data, and writes a value M' thus obtained into the address positions for the M data of (X, Y) in the memory M78 for storing CMYK data for displaying an adjusted printed matter and in the memory M5 for storing CMYK data for displaying. After the process of step P532 is completed, the CPU 101 executes the process of step P533.

At step P533, the CPU 101 loads the C data of the position (X, Y) from the address position for the C data of (X, Y) in the memory M5 for storing CMYK data for displaying. After the process of step P533 is completed, the CPU 101 executes the process of step P534.

At step P534, the CPU 101 loads the adjustment ratio of C data from the memory M57 for storing adjustment ratio of C data in CMYK data for color-tone display. After the process of step P534 is completed, the CPU 101 executes the process of step P535.

At step P535, the CPU 101 multiplies C data of the position (X, Y) by the adjustment ratio of C data, and writes a value C' thus obtained into the address positions for the C data of (X, Y) in the memory M78 for storing CMYK data for displaying an adjusted printed matter and in the memory M5 for storing CMYK data for displaying. After the process of step P535 is completed, the CPU 101 executes the process of step P536.

At step P536, the CPU 101 loads the K data of the position (X, Y) from the address position for the K data of (X, Y) in the memory M5 for storing CMYK data for displaying. After the process of step P536 is completed, the CPU 101 executes the process of step P537.

At step P537, the CPU 101 loads the adjustment ratio of K data from the memory M58 for storing adjustment ratio of K data in CMYK data for color-tone display. After the process of step P537 is completed, the CPU 101 executes the process of step P538.

At step P538, the CPU 101 multiplies K data of the position (X, Y) by the adjustment ratio of K data, and writes a value K' thus obtained into the address positions for the K data of (X, Y) in the memory M78 for storing CMYK data for displaying an adjusted printed matter and in the memory M5 for storing CMYK data for displaying. After the process of step P538 is completed, the CPU 101 executes the process of step P539.

At step P539, the CPU 101 loads the count value Y from the memory M3 for storing count value Y. After the process of step P539 is completed, the CPU 101 executes the process of step P540.

At step P540, the CPU 101 adds 1 to the count value Y, and overwrites the value in the memory M3 for storing count value Y with the resultant value. After the process of step P540 is completed, the CPU 101 executes the process of step P541.

At step P541, the CPU 101 loads the number of pixels Ymax in the Y-direction of a printed matter from the memory M7 for storing the number of pixels Ymax in the Y-direction of a printed matter. After the process of step P541 is completed, the CPU 101 executes the process of step P542.

At step P542, the CPU 101 loads the count value Y from the memory M3 for storing count value Y. After the process of step P542 is completed, the CPU 101 executes the process of step P543.

At step P543, the CPU 101 determines whether the count value Y is larger than the number of pixels Ymax in the Y-direction of a printed matter. If the count value Y is larger than the number of pixels Ymax in the Y-direction of a printed matter, the CPU 101 executes the process of step P544. If the count value Y is not larger than the number of pixels Ymax in the Y-direction of a printed matter, the CPU 101 executes the process of step P525.

At step P544, the CPU 101 loads the count value X from the memory M2 for storing count value X. After the process of step P544 is completed, the CPU 101 executes the process of step P545.

At step P545, the CPU 101 adds 1 to the count value X, and overwrites the value in the memory M2 for storing count value X with the resultant value. After the process of step P545 is completed, the CPU 101 executes the process of step P546.

At step P546, the CPU 101 loads the largest identification number of pixel in the X-direction to be used in color-tone adjustment from the memory M77 for storing the largest identification number of pixel in the X-direction to be used in color-tone adjustment. After the process of step P546 is completed, the CPU 101 executes the process of step P547.

At step P547, the CPU 101 loads the count value X from the memory M2 for storing count value X. After the process of step P547 is completed, the CPU 101 executes the process of step P548.

At step P548, the CPU 101 determines whether the count value X is larger than the largest identification number of pixel in the X-direction to be used in color-tone adjustment. If the count value X is larger than the largest identification number of pixel in the X-direction to be used in color-tone adjustment, the CPU 101 executes the process of step P549. If the count value X is not larger than the largest identification number of pixel in the X-direction to be used in color-tone adjustment, the CPU 101 executes the process of step P524.

At step P549, the CPU 101 overwrites the value in the memory M3 for storing count value Y with 1. After the process of step P549 is completed, the CPU 101 executes the process of step P550.

At step P550, the CPU 101 loads the count value Y from the memory M3 for storing count value Y. After the process of step P550 is completed, the CPU 101 executes the process of step P551.

At step P551, the CPU 101 loads the count value X from the memory M2 for storing count value X. After the process of step P551 is completed, the CPU 101 executes the process of step P552.

At step P552, the CPU 101 loads the CMYK data of the position (X, Y) from the address position (X, Y) in the memory M5 for storing CMYK data for displaying, and writes the loaded data into the address positions (X, Y) in the memory M78 for storing CMYK data for displaying an adjusted printed matter and in the memory M5 for storing CMYK data for displaying. After the process of step P552 is completed, the CPU 101 executes the process of step P553.

At step P553, the CPU 101 loads the count value Y from the memory M3 for storing count value Y. After the process of step P553 is completed, the CPU 101 executes the process of step P554.

At step P554, the CPU 101 adds 1 to the count value Y, and overwrites the value in the memory M3 for storing count value Y with the resultant value. After the process of step P554 is completed, the CPU 101 executes the process of step P555.

At step P555, the CPU 101 loads the number of pixels Ymax in the Y-direction of a printed matter from the memory M7 for storing the number of pixels Ymax in the Y-direction of a printed matter. After the process of step P555 is completed, the CPU 101 executes the process of step P556.

At step P556, the CPU 101 loads the count value Y from the memory M3 for storing count value Y. After the process of step P556 is completed, the CPU 101 executes the process of step P557.

At step P557, the CPU 101 determines whether the count value Y is larger than the number of pixels Ymax in the Y-direction of a printed matter. If the count value Y is larger than the number of pixels Ymax in the Y-direction of a printed matter, the CPU 101 executes the process of step P558. If the count value Y is not larger than the number of pixels Ymax in the Y-direction of a printed matter, the CPU 101 executes the process of step P550.

At step P558, the CPU 101 loads the count value X from the memory M2 for storing count value X. After the process of step P558 is completed, the CPU 101 executes the process of step P559.

At step P559, the CPU 101 adds 1 to the count value X, and overwrites the value in the memory M2 for storing count value X with the resultant value. After the process of step P559 is completed, the CPU 101 executes the process of step P560.

At step P560, the CPU 101 loads the number of pixels Xmax in the X-direction of a printed matter from the memory M6 for storing the number of pixels Xmax in the X-direction of a printed matter. After the process of step P560 is completed, the CPU 101 executes the process of step P561.

At step P561, the CPU 101 loads the count value X from the memory M2 for storing count value X. After the process of step P561 is completed, the CPU 101 executes the process of step P562.

At step P562, the CPU 101 determines whether the count value X is larger than the number of pixels Xmax in the X-direction of a printed matter. If the count value X is larger than the number of pixels Xmax in the X-direction of a printed matter, the CPU 101 executes the process of step P563. If the count value X is not larger than the number of pixels Xmax in the X-direction of a printed matter, the CPU 101 executes the process of step P549.

At step P563, the CPU 101 overwrites the value in the memory M2 for storing count value X with 1. After the process of step P563 is completed, the CPU 101 executes the process of step P564.

At step P564, the CPU 101 overwrites the value in the memory M3 for storing count value Y with 1. After the process of step P564 is completed, the CPU 101 executes the process of step P565.

At step P565, the CPU 101 loads the count value Y from the memory M3 for storing count value Y. After the process of step P565 is completed, the CPU 101 executes the process of step P566.

At step P566, the CPU 101 loads the count value X from the memory M2 for storing count value X. After the process of step P566 is completed, the CPU 101 executes the process of step P567.

At step P567, the CPU 101 loads the C"M"Y"K" data of the position (X, Y) from the address position (X, Y) in the memory M78 for storing CMYK data for displaying an adjusted printed matter. After the process of step P567 is completed, the CPU 101 executes the process of step P568.

At step P568, the CPU 101 calculates the R"G"B" data of the position (X, Y) from the C"M"Y"K" data of the position (X, Y). The CPU 101 then writes the calculated R"G"B" data of the position (X, Y) into the address position (X, Y) in the memory M79 for storing data for displaying an adjusted printed matter. After the process of step P568 is completed, the CPU 101 executes the process of step P569.

At step P569, the CPU 101 displays the R"G"B" data of the position (X, Y) at the position (X, Y) in the color-tone adjustment area designation portion 2 of the color-tone adjustment area designation screen 1 of the display apparatus 119. After the process of step P569 is completed, the CPU 101 executes the process of step P570.

At step P570, the CPU 101 loads the count value Y from the memory M3 for storing count value Y. After the process of step P570 is completed, the CPU 101 executes the process of step P571.

At step P571, the CPU 101 adds 1 to the count value Y, and overwrites the value in the memory M3 for storing count value Y value with the resultant value. After the process of step P571 is completed, the CPU 101 executes the process of step P572.

At step P572, the CPU 101 loads the number of pixels Ymax in the Y-direction of a printed matter from the memory M7 for storing the number of pixels Ymax in the Y-direction of a printed matter. After the process of step P572 is completed, the CPU 101 executes the process of step P573.

At step P573, the CPU 101 loads the count value Y from the memory M3 for storing count value Y. After the process of step P573 is completed, the CPU 101 executes the process of step P574.

At step P574, the CPU 101 determines whether the count value Y is larger than the number of pixels Ymax in the Y-direction of a printed matter. If the count value Y is larger than the number of pixels Ymax in the Y-direction of a printed matter, the CPU 101 executes the process of step P575. If the count value Y is not larger than the number of pixels Ymax in the Y-direction of a printed matter, the CPU 101 executes the process of step P565.

At step P575, the CPU 101 loads the count value X from the memory M2 for storing count value X. After the process of step P575 is completed, the CPU 101 executes the process of step P576.

At step P576, the CPU 101 adds 1 to the count value X, and overwrites the value in the memory M2 for storing count value X with the resultant value. After the process of step P576 is completed, the CPU 101 executes the process of step P577.

At step P577, the CPU 101 loads the number of pixels Xmax in the X-direction of a printed matter from the memory M6 for storing the number of pixels Xmax in the X-direction of a printed matter. After the process of step P577 is completed, the CPU 101 executes the process of step P578.

At step P578, the CPU 101 loads the count value X from the memory M2 for storing count value X. After the process of step P578 is completed, the CPU 101 executes the process of step P579.

At step P579, the CPU 101 determines whether the count value X is larger than the number of pixels Xmax in the X-direction of a printed matter. If the count value X is larger than the number of pixels Xmax in the X-direction of a printed matter, the CPU 101 executes the process of step P580. If the count value X is not larger than the number of pixels Xmax in the X-direction of a printed matter, the CPU 101 executes the process of step P564.

Through the processes included in the above-described operational flow, an entire image of a printed matter including the selected area whose color tones have been changed to the adjusted ones is displayed in the color-tone adjustment area designation portion 2 of the color-tone adjustment area designation screen 1 shown in FIG. 1.

At step P580, the CPU 101 determines whether the operator has turned the color-tone adjustment completion switch 116 on. If the color-tone adjustment completion switch 116 has been turned on, the CPU 101 executes the process of step P582. If the color-tone adjustment completion switch 116 has not been turned on, the CPU 101 executes the process of step P581. To put it differently, if the adjusted color tones are satisfactory, the operator presses the color-tone adjustment completion switch 116 on to finish the color-tone adjustment. The color-tone adjustment completion switch 116 corresponds to the set switch 12 shown in FIG. 1.

At step P581, the CPU 101 determines whether the operator has turned the color-tone re-adjustment switch 117 on. If the color-tone re-adjustment switch 117 has been turned on, the CPU 101 executes the process of step P135. If the color-tone re-adjustment switch 117 has not been turned on, the CPU 101 executes the process of step P580. To put it differently, if the adjusted color tones are not satisfactory, the operator presses the color-tone re-adjustment switch 117 on to perform the color-tone adjustment again. The color-tone re-adjustment switch 117 corresponds to the re-display switch 11 shown in FIG. 1.

As shown in FIGS. 18A to 18D, at step P582, the CPU 101 overwrites the value in the memory M1 for storing count value N with 1. After the process of step P582 is completed, the CPU 101 executes the process of step P583.

At step P583, the CPU 101 loads the count value N from the memory M1 for storing count value N. After the process of step P583 is completed, the CPU 101 executes the process of step P584.

At step P584, the CPU 101 writes 0 into the Nth address position in the memory M80 for storing total value for area of each ink-fountain key of Y. After the process of step P584 is completed, the CPU 101 executes the process of step P585.

At step P585, the CPU 101 writes 0 into the Nth address position in the memory M81 for storing total value for area of each ink-fountain key of M. After the process of step P585 is completed, the CPU 101 executes the process of step P586.

At step P586, the CPU 101 writes 0 into the Nth address position in the memory M82 for storing total value for area of each ink-fountain key of C. After the process of step P586 is completed, the CPU 101 executes the process of step P587.

At step P587, the CPU 101 writes 0 into the Nth address position in the memory M83 for storing total value for area of each ink-fountain key of K. After the process of step P587 is completed, the CPU 101 executes the process of step P588.

At step P588, the CPU 101 loads the count value N from the memory M1 for storing count value N. After the process of step P588 is completed, the CPU 101 executes the process of step P589.

At step P589, the CPU 101 adds 1 to the count value N, and overwrites the value in the memory M1 for storing count value N with the resultant value. After the process of step P589 is completed, the CPU 101 executes the process of step P590.

At step P590, the CPU 101 loads the total number of ink-fountain keys of each color from the memory M84 for storing total number of ink-fountain keys of each color. After the process of step P590 is complete, the CPU 101 executes the process of step P591.

At step P591, the CPU 101 loads the count value N from the memory M1 for storing count value N. After the process of step P591 is completed, the CPU 101 executes the process of step P592.

At step P592, the CPU 101 determines whether the count value N is larger than the total number of the ink-fountain keys of each color. If the count value N is larger than the total number of the ink-fountain keys of each color, the CPU 101 executes the process of step P593. If the count value N is not larger than the total number of the ink-fountain keys of each color, the CPU 101 executes the process of step P583.

At step P593, the CPU 101 overwrites the value in the memory M1 for storing count value N with 1. After the process of step P593 is completed, the CPU 101 executes the process of step P594.

At step P594, the CPU 101 overwrites the value in the memory M2 for storing count value X with 1. After the process of step P594 is completed, the CPU 101 executes the process of step P595.

At step P595, the CPU 101 overwrites the value in the memory M3 for storing count value Y with 1. After the process of step P595 is completed, the CPU 101 executes the process of step P596.

At step P596, the CPU 101 loads the count value Y from the memory M3 for storing count value Y. After the process of step P596 is completed, the CPU 101 executes the process of step P597.

At step P597, the CPU 101 loads the count value X from the memory M2 for storing count value X. After the process of step P597 is completed, the CPU 101 executes the process of step P598.

At step P598, the CPU 101 loads the Y" data of the position (X, Y) from the address position for the Y data of (X, Y) in the memory M78 for storing CMYK data for displaying an adjusted printed matter. After the process of step P598 is completed, the CPU 101 executes the process of step P599.

At step P599, the CPU 101 loads the total value for the area of the Nth ink-fountain key of Y from the Nth address position in the memory M80 for storing total value for area of each ink-fountain key of Y. After the process of step P599 is completed, the CPU 101 executes the process of step P600.

At step P600, the CPU 101 adds Y" data of the position (X, Y) to the total value for the area of the Nth ink-fountain key of Y. The CPU 101 then overwrites the value in the Nth address position in the memory M80 for storing total value for area of each ink-fountain key of Y with the value thus obtained. After the process of step P600 is completed, the CPU 101 executes the process of step P601.

At step P601, the CPU 101 loads the M" data of the position (X, Y) from the address position for the M data of (X, Y) in the memory M78 for storing CMYK data for displaying an adjusted printed matter. After the process of step P601 is completed, the CPU 101 executes the process of step P602.

At step P602, the CPU 101 loads the total value for the area of the Nth ink-fountain key of M from the Nth address position in the memory M81 for storing total value for area of each ink-fountain key of M. After the process of step P602 is completed, the CPU 101 executes the process of step P603.

At step 2603, the CPU 101 adds M" data of the position (X, Y) to the total value for the area of the Nth ink-fountain key of M. The CPU 101 then overwrites the value in the Nth address position in the memory M81 for storing total value for area of each ink-fountain key of M with the value thus obtained. After the process of step 2603 is completed, the CPU 101 executes the process of step P604.

At step P604, the CPU 101 loads the C" data of the position (X, Y) from the address position for the C data of (X, Y) in the memory M78 for storing CMYK data for displaying an adjusted printed matter. After the process of step P604 is completed, the CPU 101 executes the process of step P605.

At step P605, the CPU 101 loads the total value for the area of the Nth ink-fountain key of C from the Nth address position in the memory M82 for storing total value for area of each ink-fountain key of C. After the process of step P605 is completed, the CPU 101 executes the process of step P606.

At step P606, the CPU 101 adds C" data of the position (X, Y) to the total value for the area of the Nth ink-fountain key of C. The CPU 101 then overwrites the value in the Nth address position in the memory M82 for storing total value for area of each ink-fountain key of C with the value thus obtained. After the process of step P606 is completed, the CPU 101 executes the process of step P607.

At step P607, the CPU 101 loads the K" data of the position (X,Y) from the address position for the K data of (X, Y) in the memory M78 for storing CMYK data for displaying an adjusted printed matter. After the process of step P607 is completed, the CPU 101 executes the process of step P608.

At step P608, the CPU 101 loads the total value for the area of the Nth ink-fountain key of K from the Nth address position in the memory M83 for storing total value for area of each ink-fountain key of K. After the process of step P608 is completed, the CPU 101 executes the process of step P609.

At step P609, the CPU 101 adds K" data of the position (X, Y) to the total value for the area of the Nth ink-fountain key of K. The CPU 101 then overwrites the value in the Nth address position in the memory M83 for storing total value for area of each ink-fountain key of K with the value thus obtained. After the process of step P609 is completed, the CPU 101 executes the process of step P610.

At step P610, the CPU 101 loads the count value Y from the memory M3 for storing count value Y. After the process of step P610 is completed, the CPU 101 executes the process of step P611.

At step P611, the CPU 101 adds 1 to the count value Y, and overwrites the value in the memory M3 for storing count value Y with the resultant value. After the process of step P611 is completed, the CPU 101 executes the process of step P612.

At step P612, the CPU 101 loads the number of pixels Ymax in the Y-direction of a printed matter from the memory M7 for storing the number of pixels Ymax in the Y-direction of a printed matter. After the process of step P612 is completed, the CPU 101 executes the process of step P613.

At step P613, the CPU 101 loads the count value Y from the memory M3 for storing count value Y. After the process of step P613 is completed, the CPU 101 executes the process of step P614.

At step P614, the CPU 101 determines whether the count value Y is larger than the number of pixels Ymax in the Y-direction of a printed matter. If the count value Y is larger than the number of pixels Ymax in the Y-direction of a printed matter, the CPU 101 executes the process of step P615. If the count value Y is not larger than the number of pixels Ymax in the Y-direction of a printed matter, the CPU 101 executes the process of step P596.

At step P615, the CPU 101 loads the count value X from the memory M2 for storing count value X. After the process of step P615 is completed, the CPU 101 executes the process of step P616.

At step P616, the CPU 101 adds 1 to the count value X, and overwrites the value in the memory M2 for storing count value X with the resultant value. After the process of step P616 is completed, the CPU 101 executes the process of step P617.

At step P617, the CPU 101 loads the count value N from the memory M1 for storing count value N. After the process of step P617 is completed, the CPU 101 executes the process of step P618.

At step P618, the CPU 101 loads the largest identification number Xn of pixel in the X-direction for area of the Nth ink-fountain key from the Nth address position of the memory M85 for storing the largest identification number Xn of pixel in the X-direction for area of each ink-fountain key. After the process of step P618 is completed, the CPU 101 executes the process of step P619.

At step P619, the CPU 101 loads the count value X from the memory M2 for storing count value X. After the process of step P619 is completed, the CPU 101 executes the process of step P620.

At step P620, the CPU 101 determines whether the count value X is larger than the largest identification number Xn of pixel in the X-direction for area of the Nth ink-fountain key. If the count value X is larger than the largest identification number Xn of pixel in the X-direction for area of the Nth ink-fountain key, the CPU 101 executes the process of step P621. If the count value X is not larger than the largest identification number Xn of pixel in the X-direction for area of the Nth ink-fountain key, the CPU 101 executes the process of step P595.

At step P621, the CPU 101 loads the count value N from the memory M1 for storing count value N. After the process of step P621 is completed, the CPU 101 executes the process of step P622.

At step P622, the CPU 101 adds 1 to the count value N, and overwrites the value in the memory M1 for storing count value N with the resultant value. After the process of step P622 is completed, the CPU 101 executes the process of step P623.

At step P623, the CPU 101 loads the total number of ink-fountain keys of each color from the memory M84 for storing total number of ink-fountain keys of each color. After the process of step P623 is complete, the CPU 101 executes the process of step P624.

At step P624, the CPU 101 loads the count value N from the memory M1 for storing count value N. After the process of step P624 is completed, the CPU 101 executes the process of step P625.

At step P625, the CPU 101 determines whether the count value N is larger than the total number of the ink-fountain keys of each color. If the count value N is larger than the total number of the ink-fountain keys of each color, the CPU 101 executes the process of step P626. If the count value N is not larger than the total number of the ink-fountain keys of each color, the CPU 101 executes the process of step P595.

As shown in FIGS. 19A to 19D, at step P626, the CPU 101 overwrites the value in the memory M1 for storing count value N with 1. After the process of step P626 is completed, the CPU 101 executes the process of step P627.

At step P627, the CPU 101 loads the count value N from the memory M1 for storing count value N. After the process of step P627 is completed, the CPU 101 executes the process of step P628.

At step P628, the CPU 101 loads the total value for the area of the Nth ink-fountain key of Y from the Nth address position in the memory M80 for storing total value for area of each ink-fountain key of Y. After the process of step P628 is completed, the CPU 101 executes the process of step P629.

At step P629, the CPU 101 loads the total number of pixels in the area of the Nth ink-fountain key from the address position for the Nth ink-fountain key in the memory M86 for storing total number of pixels in area of each ink-fountain key. After the process of step P629 is completed, the CPU 101 executes the process of step P630.

At step P630, the CPU 101 calculates the image-area ratio in the area of the Nth ink-fountain key of Y by dividing the total value for the area of the Nth ink-fountain key of Y by the total number of pixels in the area of the Nth ink-fountain key. The CPU 101 then writes the calculated image-area ratio in the area of the Nth ink-fountain key of Y into the Nth address position for Y in the memory M87 for storing image-area ratio in area of each of the ink-fountain keys of each color. After the process of step P630 is completed, the CPU 101 executes the process of step P631.

At step P631, the CPU 101 loads the conversion table between the image-area ratio of Y and the ink-fountain key opening ratio from the address position for Y in the memory M88 for storing conversion table between image-area ratio of each color and ink-fountain key opening ratio. After the process of step P631 is completed, the CPU 101 executes the process of step P632.

At step P632, the CPU 101 obtains the opening ratio of the Nth ink-fountain key of Y from the image-area ratio in the area of the Nth ink-fountain key of Y by using the conversion table between the image-area ratio of Y and the ink-fountain key opening ratio. The CPU 101 then stores the obtained opening ratio of Nth ink-fountain key of Y in the Nth address position for Y in the memory M89 for storing opening ratio of each ink-fountain key. After the process of step P632 is completed, the CPU 101 executes the process of step P633.

At step P633, the CPU 101 loads the count value N from the memory M1 for storing count value N. After the process of step P633 is completed, the CPU 101 executes the process of step P634.

At step P634, the CPU 101 sends the opening ratio of the Nth ink-fountain of Y to the ink-fountain key opening ratio control apparatuses 200 of each color. After the process of step P634 is completed, the CPU 101 executes the process of step P635.

At step P635, the CPU 101 determines whether the reception-completion signal has been sent from the ink-fountain key opening ratio control apparatuses 200 of each color. If the reception-completion signal has been sent from the ink-fountain key opening ratio control apparatuses 200 of each color, the CPU 101 executes the process of step P636. If the reception-completion signal has not been sent from the ink-fountain key opening ratio control apparatuses 200 of each color, the CPU 101 executes the process of step P635 again.

A series of processes similar to the ones executed by the CPU 101 for Y at steps P627 to P635 are executed for M at steps P636 to P644, for C at steps P645 to P653, and for K at steps P654 to P662. After the process of step P662 is completed, the CPU 101 executes the process of step P663.

At step P633, the CPU 101 loads the count value N from the memory M1 for storing count value N. After the process of step P663 is completed, the CPU 101 executes the process of step P664.

At step P664, the CPU 101 adds 1 to the count value N, and overwrites the value in the memory M1 for storing count value N with the resultant value. After the process of step P664 is completed, the CPU 101 executes the process of step P665.

At step P665, the CPU 101 loads the total number of ink-fountain keys of each color from the memory M84 for storing total number of ink-fountain keys of each color. After the process of step P665 is complete, the CPU 101 executes the process of step P666.

At step P666, the CPU 101 loads the count value N from the memory M1 for storing count value N. After the process of step P666 is completed, the CPU 101 executes the process of step P667.

At step P667, the CPU 101 determines whether the count value N is larger than the total number of the ink-fountain keys of each color. If the count value N is larger than the total number of the ink-fountain keys of each color, the color-tone adjustment apparatus employing the method for adjusting color tones of a printed matter according to the invention finishes the processing. If the count value N is not larger than the total number of the ink-fountain keys of each color, the CPU 101 executes the process of step P627. The description has been given thus far of the operational flow of the color-tone adjustment apparatus 100 employing the method for adjusting color tones of a printed matter according to the invention.

Next, detailed description will be given of the operational flow of the ink-fountain key opening ratio control apparatuses 200 of each color which are controlled by the color-tone adjustment apparatus employing the method for adjusting color tones of a printed matter according to the invention.

Figure 20A:
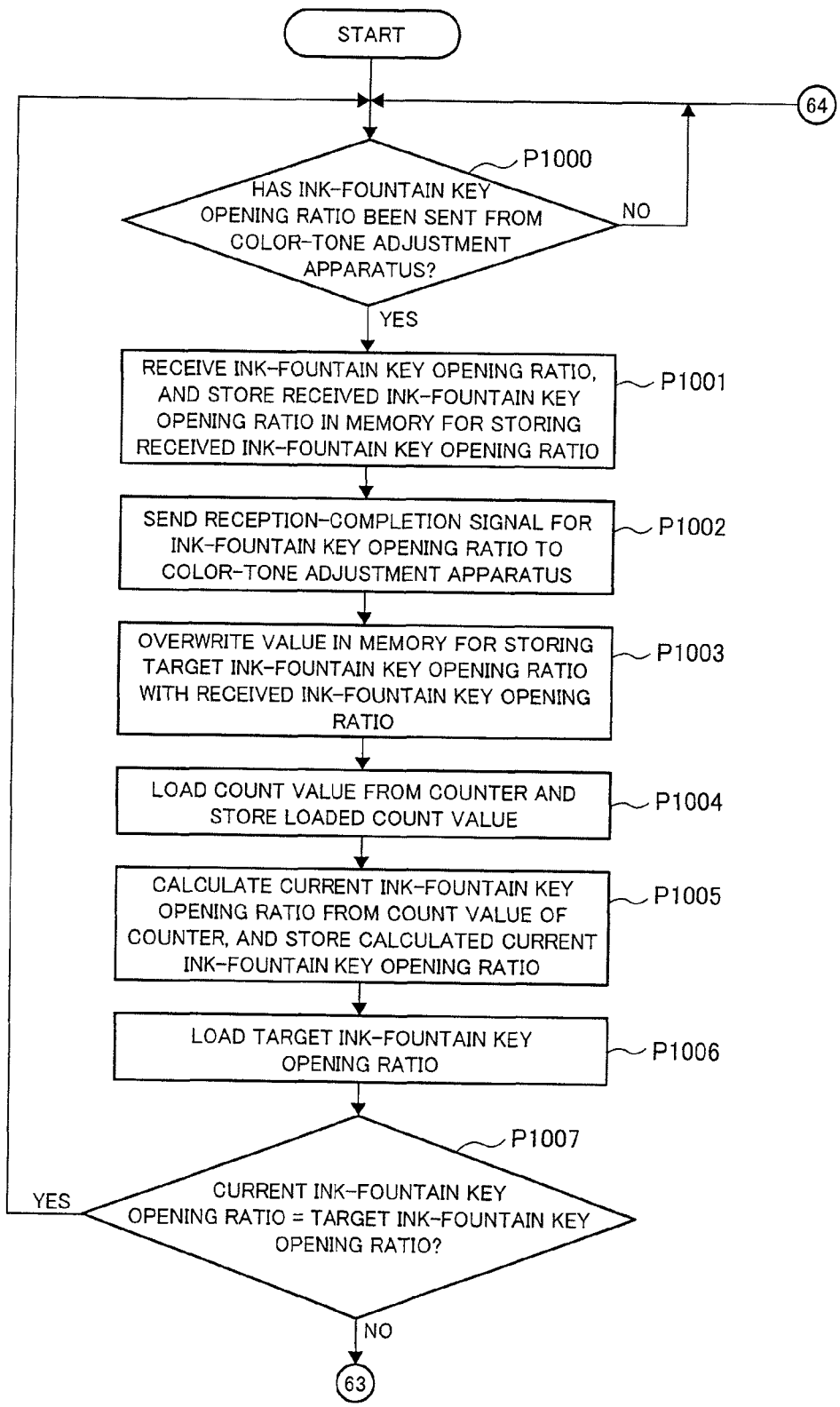
FIG. 20A is a flowchart illustrating an operational flow of the ink-fountain key opening ratio control apparatus of each color, which is a peripheral device of the color-tone adjustment apparatus employing the method for adjusting color tones of a printed matter according to the invention.
Figure 20B:
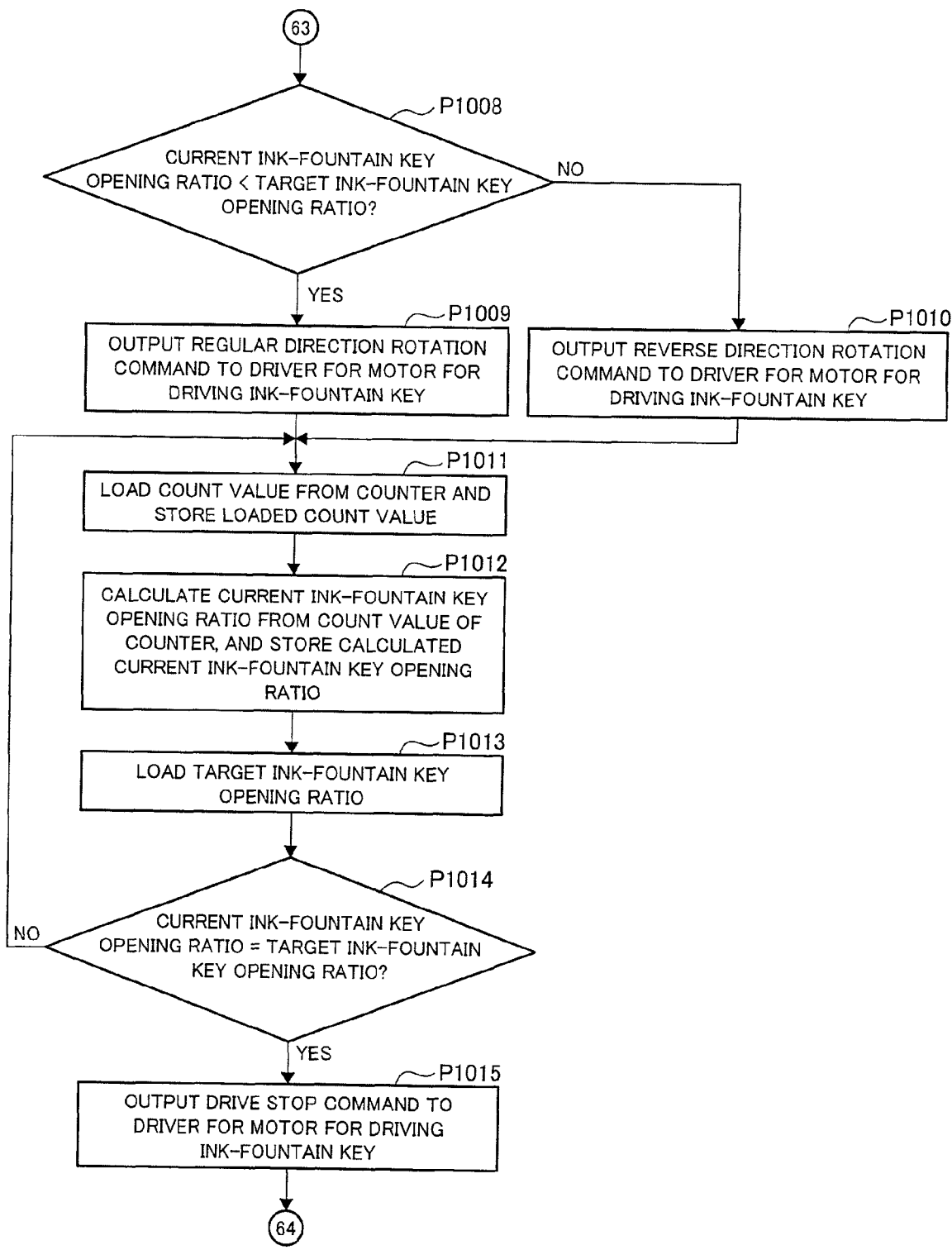
FIG. 20B is a flowchart illustrating an operational flow subsequent to that of in FIG. 20A.

As shown in FIGS. 20A and 20B, after the ink-fountain key opening ratio control apparatuses 200 of each color, which are controlled by the color-tone adjustment apparatus employing the method for adjusting color tones of a printed matter according to the invention, starts the processing, the CPU 201 determines whether the ink-fountain key opening ratio has been sent from the color-tone adjustment apparatus 100 at step P1000. If the ink-fountain key opening ratio has been sent from the color-tone adjustment apparatus 100, the CPU 201 executes the process of step P1001. If the ink-fountain key opening ratio has not been sent from the color-tone adjustment apparatus 100, the CPU 201 executes the process of step P1000.

At step P1001, the CPU 201 receives the ink-fountain key opening ratio, and stores the received ink-fountain key opening ratio in the memory M100 for storing received ink-fountain key opening ratio. After the process of step P1001 is completed, the CPU 201 executes the process of step P1002.

At step P1002, the CPU 201 sends, to the color-tone adjustment apparatus 100, the reception-completion signal for the ink-fountain key opening ratio. After the process of step P1002 is completed, the CPU 201 executes the process of step P1003.

At step P1003, the CPU 201 overwrites the value in the memory M101 for storing target ink-fountain key opening ratio with the received ink-fountain key opening ratio. After the process of step P1003 is completed, the CPU 201 executes the process of step P1004.

At step P1004, the CPU 201 loads the count value from the counter 207, and stores the loaded count value in the memory M102 for storing count value of counter. After the process of step P1004 is completed, the CPU 201 executes the process of step P1005.

At step P1005, the CPU 201 calculates the current ink-fountain key opening ratio from the count value of the counter 207, and stores the calculated current ink-fountain key opening ratio in the memory M103 for storing current ink-fountain key opening ratio. After the process of step P1005 is completed, the CPU 201 executes the process of step P1006.

At step P1006, the CPU 201 loads the target ink-fountain key opening ratio from the memory M101 for storing target ink-fountain key opening ratio. After the process of step P1006 is completed, the CPU 201 executes the process of step P1007.

At step P1007, the CPU 201 determines whether the current ink-fountain key opening ratio is equal to the target ink-fountain key opening ratio. If the current ink-fountain key opening ratio is equal to the target ink-fountain key opening ratio, the CPU 201 executes the process of step P1000. If the current ink-fountain key opening ratio is not equal to the target ink-fountain key opening ratio, the CPU 201 executes the process of step P1008.

At step P1008, the CPU 201 determines whether the current ink-fountain key opening ratio is smaller than the target ink-fountain key opening ratio. If the current ink-fountain key opening ratio is smaller than the target ink-fountain key opening ratio, the CPU 201 executes the process of step P1009. If the current ink-fountain key opening ratio is not smaller than the target ink-fountain key opening ratio, the CPU 201 executes the process of step P1010.

At step P1009, the CPU 201 outputs a regular direction rotation command to the driver 205 for a motor for driving ink-fountain key. After the process of step P1009 is completed, the CPU 201 executes the process of step P1011.

At step P1010, the CPU 201 outputs a reverse direction rotation command to the driver 205 for a motor for driving ink-fountain key. After the process of step P1010 is completed, the CPU 201 executes the process of step P1011.

At step P1011, the CPU 201 loads the count value from the counter 207, and stores the loaded count value in the memory M102 for storing count value of counter. After the process of step P1011 is completed, the CPU 201 executes the process of step P1012.

At step P1012, the CPU 201 calculates the current ink-fountain key opening ratio from the count value of the counter 207, and stores the calculated current ink-fountain key opening ratio in the memory M103 for storing current ink-fountain key opening ratio. After the process of step P1012 is completed, the CPU 201 executes the process of step P1013.

At step P1013, the CPU 201 loads the target ink-fountain key opening ratio from the memory M101 for storing target ink-fountain key opening ratio. After the process of step P1013 is completed, the CPU 201 executes the process of step P1014.

At step P1014, the CPU 201 determines whether the current ink-fountain key opening ratio is equal to the target ink-fountain key opening ratio. If the current ink-fountain key opening ratio is equal to the target ink-fountain key opening ratio, the CPU 201 executes the process of step P1015. If the current ink-fountain key opening ratio is not equal to the target ink-fountain key opening ratio, the CPU 201 executes the process of step P1011.

At step P1015, the CPU 201 outputs a drive stop command to the driver 205 for a motor for driving ink-fountain key. After the process of step P1015 is completed, the CPU 201 executes the process of step P1000.

The description has been given thus far of the processes included in the operational flow of the ink-fountain key opening ratio control apparatuses 200 of each color, which are controlled by the color-tone adjustment apparatus employing the method for adjusting color tones of a printed matter according to the invention.

Through the above-described operational flow, the opening ratio of each ink-fountain key of each color of the printing press is set at an opening ratio corresponding to the adjusted color tones. Hence, a printing plate with a design corresponding to the PPF data is mounted on the printing press, and the printing is done with the ink-fountain key opening ratios set as in the above-described way. As a consequence, a printed matter with adjusted color tones can be printed immediately.

As has been described thus far, the method for adjusting color tones of a printed matter according to the invention has the following advantageous effects. Small separate images with color tones to be achieved if the supply amounts of inks of individual colors are increased or decreased are displayed as reference images on the display apparatus. The small separate images serve as guidelines to the operator. Accordingly, the operator can refer to the guideline images when adjusting the supply amounts of inks. As a consequence, color tones of a printed matter can be adjusted easily.

INDUSTRIAL APPLICABILITY

The invention can be used, for example, as a method for adjusting color tones of a printed matter in various types of printing presses.

DESCRIPTION OF SYMBOLS 1 color-tone adjustment area designation screen
2 color-tone adjustment area designation portion
3 ink-supply amount adjustment portion
4 switch arrangement portion
5 color-tone adjustment screen
6 image-change display portion
10 cursor
11 re-display switch
12 set switch
13 ink-supply display portion
14 ink-supply increasing switch
15 ink-supply decreasing switch
16 current color-tone display portion
17 adjusted color-tone display portion
18 Y-up display portion
19 M-up display portion
20 C-up display portion
21 K-up display portion
22 Y-down display portion
23 M-down display portion
24 C-down display portion
25 K-down display portion
26 Y-up switch
27 M-up switch
28 C-up switch
29 K-up switch
30 Y-down switch
31 M-down switch
32 C-down switch
33 K-down switch
100 color-tone adjustment apparatus
101 CPU
102 RAM
103 ROM
104, 106, 122 input-output devices (I/O)
124 interface (I/F)
105 mouse
107 selected area confirmation switch
108 Y-increase switch
109 Y-decrease switch
110 M-increase switch
111 M-decrease switch
112 C-increase switch
113 C-decrease switch
114 K-increase switch
115 K-decrease switch
116 color-tone adjustment completion switch
117 color-tone re-adjustment switch
118 input device
119 display apparatus
120 FD drive
121 output device such as printer
123 internal-clock counter
200 ink-fountain key opening ratio control apparatus of each color
201 CPU
202 ROM
203 RAM
204 I/O

209 I/F
205 driver for a motor for driving ink-fountain key
206 motor for driving ink-fountain key
207 counter
208 rotary encoder for a motor for driving ink-fountain key

The invention claimed is:

1. A method for adjusting color tones of a printed matter, comprising:
   a displaying step of displaying an image of a printed matter on a display apparatus by use of data of a printing plate used in printing performed by a printing press;
   an adjusting step in which an operator adjusts color tones of the printed matter while referring to the printed matter displayed on the display apparatus;
   a first reference-image displaying step of automatically displaying by a control device, before a manual adjustment by the operator, an image of the printed matter obtained if the supply amount of the ink to be used in the printing is increased by a first predetermined certain amount stored in advance and an image of the printed matter that is obtained if the supply of ink is decreased by a second predetermined certain amount stored in advance, for reference; and
   a second reference-image displaying step of displaying an image of the printed matter on the basis of the supply amounts of the inks in the printing press that have been adjusted by the operator,
   wherein, in the adjusting step, the operator adjusts the color tones of the printed matter on the basis of the supply amount of the ink in the printing press while referring to the image of the printed matter displayed in the first reference-image displaying step.

2. The method for adjusting color tones of a printed matter according to claim 1, wherein, in the first reference-image displaying step, images of the printed matter that are obtained if the supply amounts of cyan, magenta, yellow, and black inks to be used in the printing are increased and images of the printed matter that are obtained if the supply amounts of cyan, magenta, yellow, and black inks are decreased are displayed for reference.

* * * * *